United States Patent [19]
Thomas et al.

[11] Patent Number: 6,061,692
[45] Date of Patent: May 9, 2000

[54] SYSTEM AND METHOD FOR ADMINISTERING A META DATABASE AS AN INTEGRAL COMPONENT OF AN INFORMATION SERVER

[75] Inventors: Michael W. Thomas, Bellevue; James E. Allard, Seattle; Michael Howard; Sophia Chung, both of Redmond; Cameron Ferroni, Seattle; Douglas C. Henbenthal, Redmond; John Ludeman, Redmond; Kim Stebbens, Redmond; Henry L. Sanders, II, Kirkland; David R. Treadwell, III, Woodinville, all of Wash.

[73] Assignee: Microsoft Corporation, Redmond, Wash.

[21] Appl. No.: 08/963,894

[22] Filed: Nov. 4, 1997

[51] Int. Cl.[7] .................................................. G06F 17/30
[52] U.S. Cl. ................................... 707/200; 707/10
[58] Field of Search .................. 707/1–2, 10, 102, 707/103, 200–204; 345/356

[56] References Cited

U.S. PATENT DOCUMENTS

| | | | |
|---|---|---|---|
| 5,745,752 | 4/1998 | Hurvig et al. | 707/200 |
| 5,758,154 | 5/1998 | Qureshi | 709/302 |
| 5,878,415 | 3/1999 | Olds | 707/6 |
| 5,991,777 | 11/1999 | Momoh et al. | 707/205 |

OTHER PUBLICATIONS

"Exploring the Windows 95 Registry: the new way of storing system and application preferences," Jeff Prosise, PC Magazine, v14, n20, pp. 277–280, Nov. 1995.

*Primary Examiner*—Hosain T. Alam
*Attorney, Agent, or Firm*—Workman, Nydegger & Seeley

[57] ABSTRACT

An information server adapted to service requests for information has an integral database containing configuration information, application information, and/or content information. The information in the database is stored in a hierarchical fashion with elements that correspond, in some degree, with physical storage structure or individual information objects on the information server. Path names received in information requests are broken into constituent components and are used to retrieve configuration information, application information, and/or content information from the database and information objects from physical storage. In the database properties stored at one hierarchical level may be inherited by lower hierarchical levels. The database is preferably provided with a programmatic interface that allows concurrent access to and administration of the database. Mechanisms to notify registered users of changes or events that occur with respect to the database are implemented.

38 Claims, 15 Drawing Sheets

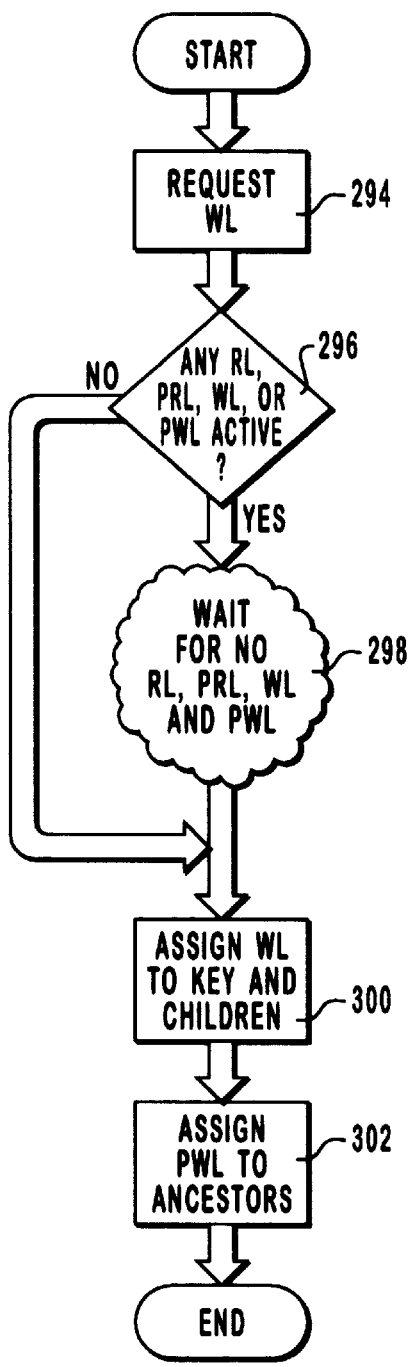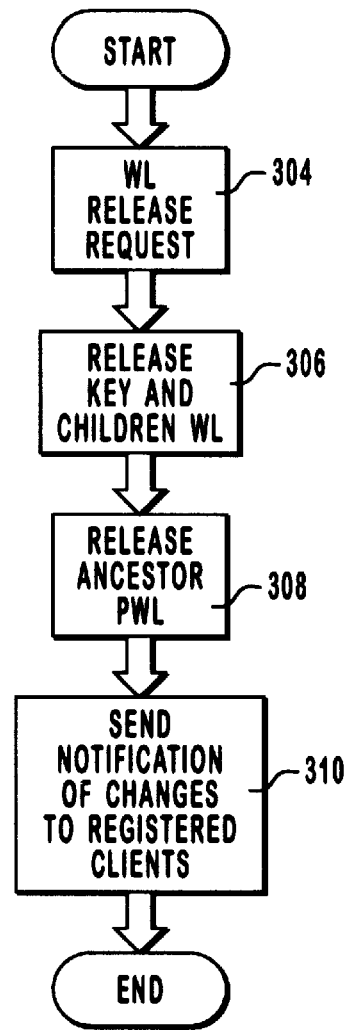
FIG. 10A
FIG. 10B

SYSTEM AND METHOD FOR ADMINISTERING A META DATABASE AS AN INTEGRAL COMPONENT OF AN INFORMATION SERVER

BACKGROUND OF THE INVENTION

1. The Field of the Invention

This invention relates to information servers, and, more specifically, this invention relates to a mechanism for administering and configuring an information server that dramatically reduces the administrative burden.

2. The Prior State of the Art

Today, business and technology trends are changing the way we use computers and information. The personal computer of PC has become the standard business information tool as prices have decreased and computing power has increased. In record numbers, business are re-engineering their organizational structure and processes to become faster and more competitive, in addition to being better able to use the wealth of information resources available today. Never before has there been so much information so readily available nor such high expectations for how much the individual will be able to accomplish by utilizing this information. The result is that people today need access to information everywhere, anytime.

The need for access to information and the widespread availability of information has been aided and encouraged by the growth of large-scale computer networks such as the Internet. Through the Internet, users can access a wide variety of information and have the information delivered and displayed to their screens almost immediately. With the proliferation of the Internet and Internet related and inspired technologies, many businesses and corporations are modeling in-house information networks, called intranets, after the model used by the Internet. The result is that users today have more access to more different types of information than ever before.

To supply information over these networks, various types of information servers have been developed. These information servers are designed to receive a request for information from a client, retrieve the desired information, and pass the information back to the requesting client. In the case if the Internet and/or intranets, information is generally stored in a variety of standard formats that may be retrieved and provided to the requesting client. The type of format used to store the data depends in large measure upon the type of information server and the purpose of the information server. For example, information servers designed to provide information to various web browsers over the Internet often store and provide information in a Hypertext Markup Language (HTML). On the other hand, a server providing information via the Internet File Transfer Protocol (FTP) may store information in a wide variety of formats suitable for downloading by a requesting client. Other types of information servers such as mail servers, news servers, and so forth, also abound.

Although each of these various types of information servers has unique requirements, at some level all such information servers require the ability to retrieve information in a desired format and provide the information to a requesting client. In order to achieve this goal, many information servers must store a wide variety of configuration and other data. For example, many information servers are customizable in a wide variety of ways. The various customization information must be stored for each particular installation. Such configuration information may range from configuration information regarding the specific hardware environment, protocols used to communicate with clients and service client requests, configuration information relating to the specific information stored on the information server, and many other types of configuration information.

Traditionally, such configuration information was stored in text-based files referred to on various systems as "INI" files, "CONF" files, or "RE" files. These INI files were typically formatted according to some identified format, for example, a parameter identifier followed by the value of the parameter. When the information server was initialized, the information server would go to the appropriate INI file, read the text-based information contained therein, parse the text-based information to extract the appropriate configuration information, and apply the configuration information. As explained below, dynamic configuration was rare and the system often had to be restarted as changes were made.

Such an approach worked relatively well for information servers that provided a small amount of information or that were customizable in a limited number of ways. However, as the amount of information available from a particular information server has increased and as the contexts in which an information server must operate has diversified, the amount and type of configuration information has dramatically increased. This dramatic increase has created several problems for traditional configuration mechanisms.

One problem with using text-based INI files to configure and administer an information server is highlighted by the amount of information that must be stored when the amount of information serviced by the server increases. As one example, web servers may provide ratings for each of the web pages accessible from the server. These ratings rate the information content of a web page or other information object so that individuals may screen out objectionable material. An information server that supports ratings must, therefore, maintain rating information on each and every information object that can be accessed via the information server. Such rating information may be compiled into a single large INI file or may be stored in separate INI files, each associated with an appropriate information object. When an administrator wishes to update rating information, the administrator must change the information in the appropriate INI file. For a large number of information objects, this task can be tedious and is fraught with error. For example, if the entire rating of one particular subtree of an information server is changed, then the rating for each and every information object in that subtree must be identified and updated. It would, therefore, be highly desirable to provide a mechanism that reduces the administrative burden in updating configuration information that applies to large groups of information objects. It would also be highly desirable to reduce or eliminate the probability of errors associated with such changes.

Another problem with text-based INI files can be illustrated by the following scenario. Suppose configuration information is stored in a single, large INI file. Now suppose that the administrator wishes to make a modification to a portion of the information in the INI file. After the administrator has completed the desired changes, a mechanism must exist for making the information server aware of the changes that have been made. In some systems, this necessitates stopping the information server and reinitializing the information server. Such a reinitialization may be as simple as stopping and restarting a program or as complicated as shutting down an entire system and rebooting the entire system, causing service outages. Such a mechanism is highly undesirable if configuration information is changed on a relatively frequent basis. It would, therefore, be an advancement in the art to eliminate the necessity of reinitializing an information server when configuration changes are made.

In order to eliminate the need to reinitialize an information server, mechanisms may be put in place that cause the information server to return to the text file and reread all the configuration parameters. The server can reparse the text file and extract the appropriate configuration information. Such an approach may work for certain types of configuration changes. However, such an approach still requires the information server to reread and reparse all entries in the text file in order to identify which information in the file has changed. This still represents a rather cumbersome process. It would be an advancement in the art to obviate the necessity of rereading and reparsing configuration files to determine which configuration parameters have been modified. It would be a further advancement in the art to allow all such configuration changes to be made without reparsing an entire INI file and without requiring any stopping and starting of the information server.

In order to eliminate the need to reread and reparse text-based INI files whenever configuration parameters are needed, most existing information servers keep as much of the configuration information in memory as possible. For example, if rating information is utilized, it is desirable to maintain the rating information for the associated information objects in memory so as to eliminate the necessity of retrieving text from an INI file and parsing the retrieved information to extract the configuration information. As the number of information objects provided by an information server increases and as the variety and type of configuration information proliferates, keeping all such information in memory becomes a difficult task. Furthermore, the amount of non-volatile storage space and the initialization time also increases. It would, therefore, be highly desirable to reduce the amount of information that needs to remain in memory in order to configure an information server while, simultaneously, reducing the necessity of retrieving information from INI files that must be parsed to extract the desired configuration information. It would also be highly desirable to reduce the amount of non-volatile storage required to store such information and to reduce the time required to initialize an information server.

SUMMARY AND OBJECTS OF THE INVENTION

Glossary of Terms

In order to assist in understanding the terminology used in the summary of the invention and detailed description, the following definitions for key terms are provided:

Application Metadata

Properties stored by an application or extension configured as part of the information server. Examples of such applications or extensions may be a content indexing component which indexes the content of various objects administered and served by the information server, a component that issues stock quotes, or other active content provider. Application metadata is generally used at initialization time or at run time to affect the behavior of the associated application. Examples of application metadata include a property that identifies a directory as requiring indexing and the server name to connect to in order to retrieve stock quote data. Application metadata is sometime referred to application information.

Children

In a hierarchy, progeny below the identified level. Includes not only direct children but also progeny of greater degree (e.g. grandchildren, great grandchildren, etc.).

Client

A general term used to refer to a requesting entity or an entity that is served by another entity. Clients can include both entities making requests of the information server and entities accessing the metabase of the present invention.

Configuration Metadata

Properties and settings which apply to information server operating system services such as HTTP, FTP, etc. Examples include http port and enabling of certain features for the type of service. Configuration metadata is sometimes referred to as configuration information.

Content Metadata

Properties which apply to the objects served and managed by an information server. Examples include ratings on files, and execute access for an object or location. Content Metadata is sometimes referred to as content information.

Information Object

A broad term that incorporates any and all types of information served by an information server. Information objects may include, but are not limited to, documents, software components or objects that provide a result or information, files, data, and so forth.

Key Location

A storage location in a metabase where one or more properties containing metadata are stored. Key locations are also sometime referred to as keys. A key location is somewhat analogous to a directory on a storage device.

Metabase

A database used for the storing of metadata including, but not limited to, configuration metadata, content metadata, and application metadata.

Metadata

Configuration of other information that is helpful to or required by a system in managing and administering information objects. Examples include configuration metadata, content metadata, and application metadata.

Parent

In a hierarchy, the levels above the identified level. Parents include not only the immediate progenitor but all other progenitors as well (e.g. grandparents, great grandparents, etc.).

Programmatic Interface

An interface through which something is accessed typically consisting of series of functions, interfaces, or entry points that are called by an entity in order to achieve a certain result. A programmatic interface implies a software component on each side of the interface, one to perform the calling and another to perform the called function.

Software Component

A general term to refer to any type of software entity including software objects, DLLs, application programs, executable units, services, and so forth.

Virtual Directory

A 'directory' that corresponds to one or more keys in a metabase but has no direct counterpart on physical storage media.

Virtual Server

An information server that appears to the outside world as a totally separate physical information server but which, in reality may share a physical machine with other information servers.

Brief Summary and Objects of the Invention

The foregoing problems in the prior state of the art have been successfully overcome by the present invention, which is directed to configuration, administration, and operation of an information server. Various aspects of the present invention dramatically reduce the administrative burden and associated overhead. The present invention reduces the amount of information that must be maintained in memory and on disk while, simultaneously, eliminating the need to parse text-based INI files. The invention reduces the burden of administering and maintaining an information server and eliminates maintenance errors by reducing the amount of data that needs to be stored to configure and maintain an information server. The present invention implements a full complement of security mechanisms that allow wide flexibility in granting and controlling access to both the information objects provided by the information server and to the configuration information. Mechanisms are also implemented that allow simultaneous administration by multiple administrators. The invention also implements mechanisms to allow for true remote administration such that the information server may be administered from any desired location.

An information server constructed according to the present invention incorporates a database of configuration and other information. This database is separate and distinct from the various information objects that can be accessed through the information server. The database is used to store so called "metadata." Metadata, as used herein, includes configuration metadata (properties and settings which apply to the information server), content metadata (properties which apply to the information objects served and managed by the information server), and application metadata (properties stored by the information server application or extensions thereto which are used at initialization time or run time to affect the application's behavior). The database is preferably arranged in a hierarchical fashion with various properties being stored at each of the hierarchical levels.

One mechanism provided by the present invention to reduce the amount of data that must be stored and managed in order to configure and administer an information server is the use in inheritance for various properties. The present invention allows properties at one level to inherit properties from a parent or progenitor level. Thus, a property stored at a particular level may effectively extend to any and all sub-levels. This allows properties to be stored and administered from a single location. The use of inheritance is one mechanism which the present invention utilizes to reduce the overall amount of information that must be stored and administered for an information server. Inheritance also reduces the administrative burden and administrative errors.

Requests received from clients desiring to access information objects managed and administered by the information server typically include a path name having a series of individual constituent names. One example of such a path name is the familiar Uniform Resonance Locators (URLs) used to access web pages over the Internet. For example, one such path name may be written as http://www.mycompany.com/subpath1/document.htm. In this example, the path has various constituent names such as http, www.mycompany.com, subpath1, and document.htm. The path name is typically interpreted by an information server as a hierarchical path to locate an information object on physical storage that should be retrieved and provided to the requestor. The present invention extends this concept by also mapping all or part of the path name into the hierarchical database containing configuration information. Thus, configuration information relating to the portion of the information server that provides http services may be stored in a hierarchical location that corresponds to the http constituent name. In addition, configuration information relating to any of the other constituent names may be stored in an associated hierarchical level. Thus, configuration information relating to subpath1 or information objects stored along subpath1 may be placed in the database at a hierarchical level associated with the subpath1 constituent name. Information relating to document.htm may be stored in a hierarchical level corresponding to the document.htm constituent name. Using this mechanism, configuration information may be accessed in parallel with the access to the information object itself. In other words, in the example just given the constituent names may map both to a physical location on a storage medium and a location in the database.

Because the database provides inheritance of properties from one level to another, it may not be necessary to have a hierarchical level in the database that corresponds to each and every constituent name of a path name. For example, if all documents along subpath1 had a particular rating, then the rating for all documents may be stored at a level corresponding to subpath1 and inherited by the subsequent levels. If no other properties need to be stored for the subsequent levels, then there is no need for subsequent levels in the database. To facilitate such a functionality, the present invention allows part of a path to be resolved in the database and part of the path to be resolved in other locations. In other words, the resolution process picks up only those properties from the database that are needed.

The database may be provided with a programmatic interface that provides entry points and functions to manipulate data in the database. Software components wishing to access the database may do so through the appropriate programmatic function. Functions may be provided to perform any desired manipulations on the data in the database. Such functions may include, for example, functions to get and set properties at various hierarchical levels, functions to determine whether properties reside at a particular level or whether they are inherited from other levels, and so forth. If care is taken to implement the programmatic interface in a manner that is accessible from remote locations, then administration of configuration information for the information server may be accomplished from any location. Furthermore, mechanisms may be put in place to allow concurrent administration of the database.

The programmatic interface may also be provided with functions and mechanisms that allow the database to be written to a storage medium, restored from the storage medium, synchronized with a copy of the database in another location, and so forth. Such functions may allow a rich set of administrative tools to be developed that dramatically reduce the burden and administrative overhead associated with maintaining and configuring the information server.

In order to reduce the overhead necessary to discover changes that are made to the database, the present invention may implement a notification mechanism. Software components or other clients may register to be notified when certain events occur. For example, a component may register to be notified when a change is made to properties in the database. Because access to the database is implemented via a programmatic interface, when changes are made to the database the database may initiate and send notification to components registered for that event. In addition, the notification may identify which properties or locations in the database have been changed. In this way, a components receiving such notification can decide whether it needs to retrieve the updated information from the database. Such a mechanism eliminates the necessity of parsing a text file to determine what information has been changed. Furthermore, such a mechanism eliminates the need to reinitialize an information server to cause it to pick up changes that are made.

Accordingly, it is a primary object of the present invention to provide a system and method for administration of an information server that dramatically reduces the administrative burden. Another object of the present invention is to provide an information server that reduces the amount of information that needs to be stored to administer an information server. Yet another object of the present invention is to provide an information server with an integral database that stores configuration information and that can access such configuration information while resolving a path name from a request received by the information server.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIGS. 10A and 10B illustrate the processes of granting and releasing write locks according to one embodiment of the present invention;

DETAILED DESCRIPTION OF THE PREFERRED EMBODIMENTS

The invention is described below by using diagrams to illustrate either the structure or processing of embodiments used to implement the system and method of the present invention. Using the diagrams in this manner to present the invention should not be construed as limiting of its scope. The present invention contemplates both methods and systems for the configuration, management, and operation of an information server. The embodiments of the present invention may comprise a special purpose or general purpose computer comprising various computer hardware, as discussed in greater detail below.

Embodiments within the scope of the present invention also include computer readable media having executable instructions or data fields stored thereon. Such computer readable media can be any available media which can be accessed by a general purpose or special purpose computer. By way of example, and not limitation, such computer readable media can comprise RAM, ROM, EEPROM, CD-ROM or other optical disk storage, magnetic disk storage or other magnetic storage devices, or any other medium which can be used to store the desired executable instructions or data fields and which can accessed by a general purpose or special purpose computer. Combinations of the above should also be included within the scope of computer readable media. Executable instructions comprise, for example, instructions and data which cause a general purpose computer, special purpose computer, or special purpose processing device to perform a certain function or group of functions.

Figure 1:
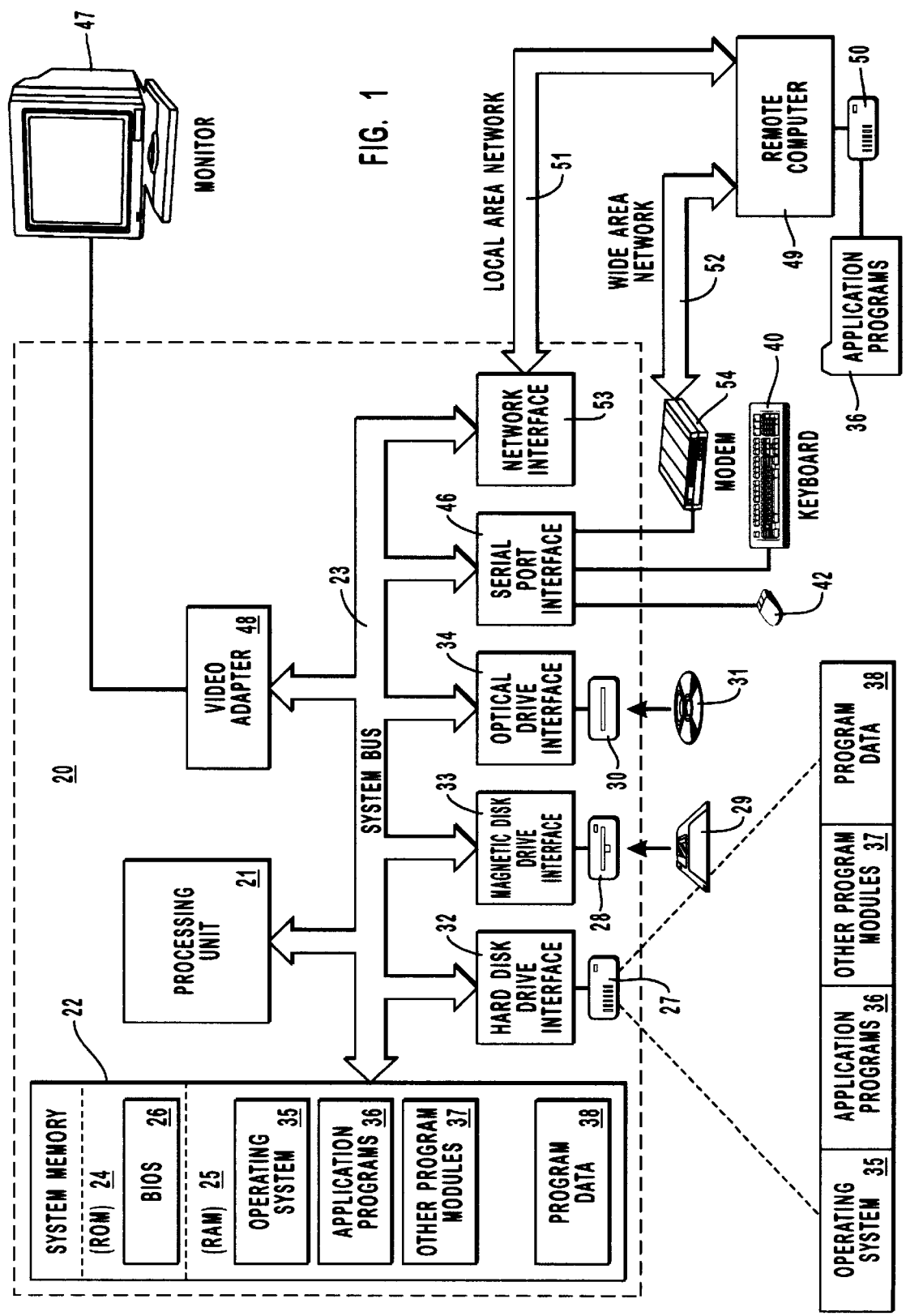
FIG. 1 is an example system that provides a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules or other software components, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the computer 20, such as during start-up, may be stored in ROM 24. The computer 20 may also include a magnetic hard disk drive 27 for reading from and writing to a magnetic hard disk, not shown, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer readable instructions, data structures, program modules and other data for the computer 20. Although the exemplary environment described herein employs a magnetic hard disk 27, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the computer 20 through input devices such as a keyboard 40 and pointing device 42. Other input devices (not shown) may include a microphone, joy stick, game pad, satellite dish, scanner, or the like. These and other input devices are often connected to the processing unit 21 through a serial port interface 46 that is coupled to system bus 23, but may be connected by other interfaces, such as a parallel port, game port or a universal serial bus (USB). A monitor 47 or other type of display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as a remote computer 49. Remote computer 49 may be another personal computer, a server, a router, a network PC, a peer device or other common network node, and typically includes many or all of the elements described above relative to the computer 20, although only a memory storage device 50 has been illustrated in FIG. 1. The logical connections depicted in FIG. 1 include a local area network (LAN) 51 and a wide area network (WAN) 52 that are presented here by way of example and not limitation. Such networking environments are commonplace in offices enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Figure 2:
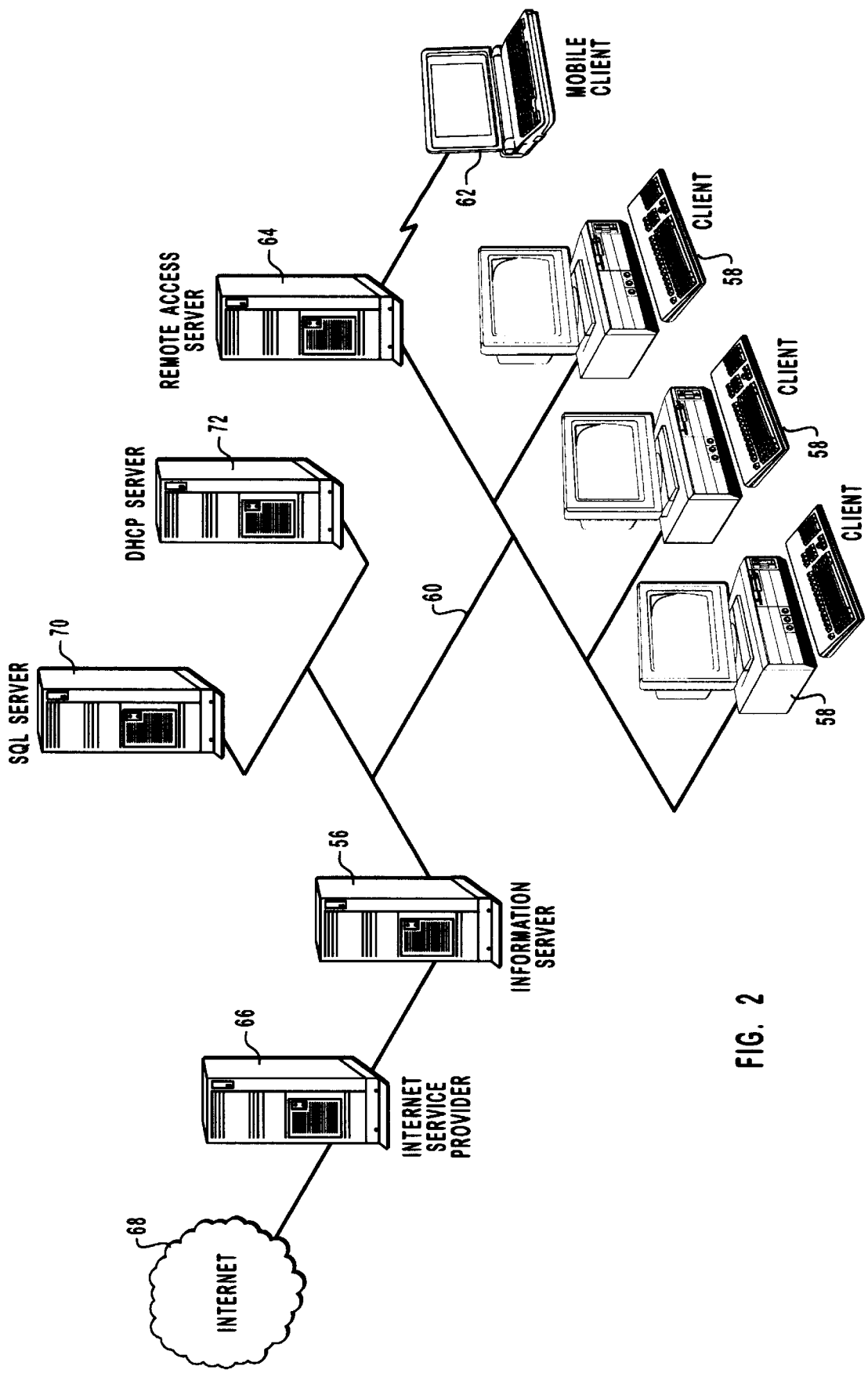
FIG. 2 is a diagram of an example network with an information server.

Referring now to FIG. 2, an example network where an information server might be employed is presented. The network of FIG. 2 is given by way of example and not limitation. Other configurations are possible and the configuration of FIG. 2 is intended to provide one possible context for the use of an information server.

In FIG. 2, an information server is shown generally as 56. Information server 56 may be an information server configured according to the present invention and incorporating the concepts disclosed herein. Information server 56 may service information requests from various clients such as clients 58. Clients 58 are illustrated as connecting to information server 56 over a local area network (LAN) 60. Although not specifically shown in FIG. 2, LAN 60 may have routers that route message traffic on the network. A configuration such as that illustrated in FIG. 2 is often encountered in an intranet context where a company or other organization desires to provide information that can be accessed using Internet type technology. Access to information server 56 may also be gained by mobile clients such as mobile client 62 through a remote access server, such as remote access server 64 or similar technology. Information server 56 may also be connected to Internet service provider 66. Internet service provider 66 and information server 56 may then engage in two way communication where requests for information may flow between Internet service provider 66 and information server 56. Such information requests may come from, for example, clients connected to the Internet 68.

The configuration may also contain other servers such as SQL server 70 and DHCP server 72. DHCP server 72 typically provides IP addresses to clients and other entities on LAN 60. SQL server 70 is representative, for example, of various other types of servers that provide information to or receive information from information server 56 or other clients of LAN 60.

As illustrated in FIG. 2, an information server may receive requests for information from a variety of sources. In this application, entities that request information will be referred to as clients. It should be noted that entities that request information may be various physical clients as illustrated in FIG. 2 but may also include various software components whether internal or external to information server 56.

Figure 3:
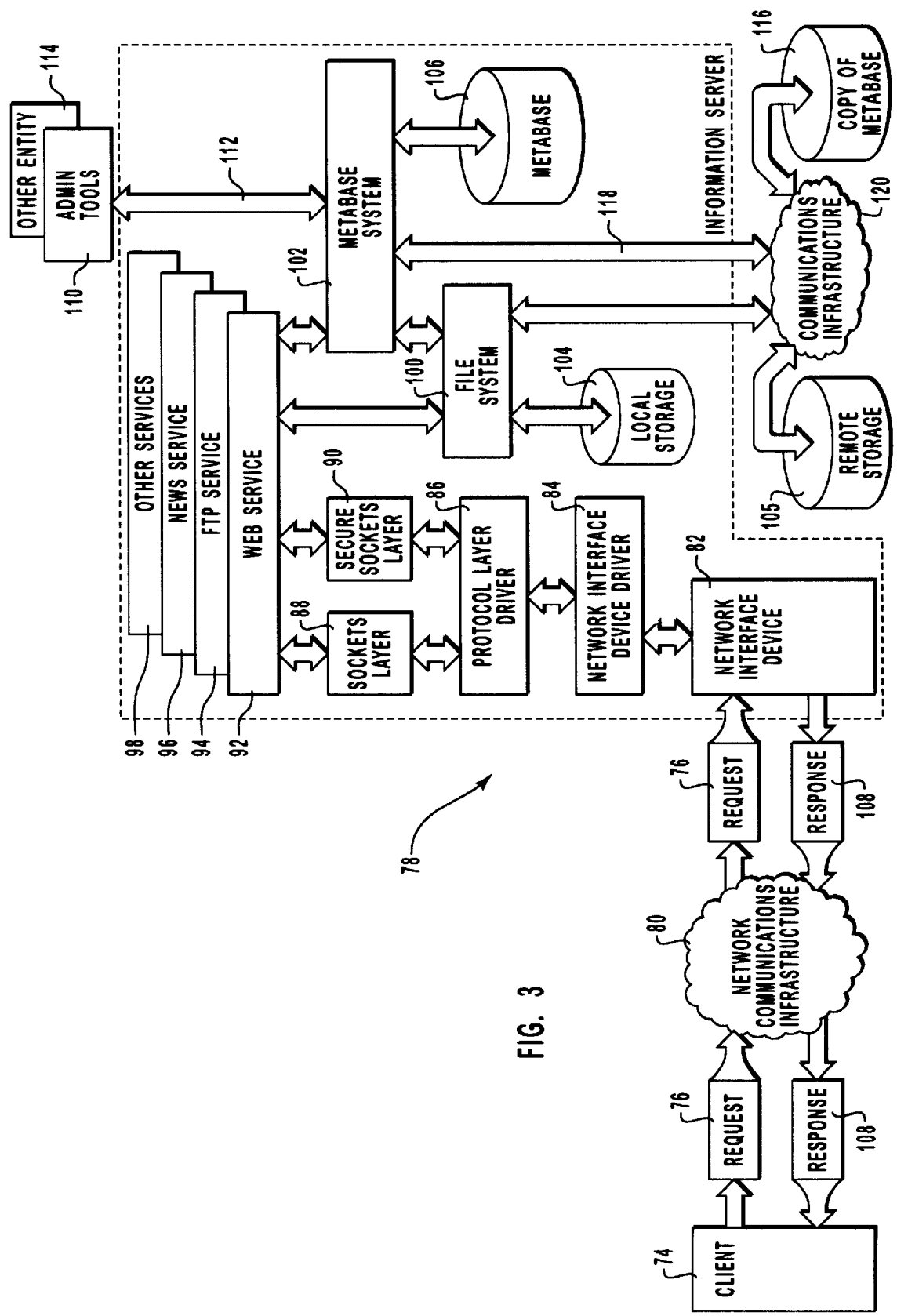
FIG. 3 is a high-level architectural diagram of one embodiment of the present invention.

Referring now to FIG. 3, one example of a top-level diagram of an embodiment of the present invention is illustrated. FIG. 3 represents a top-level architectural diagram and is given by way of example, and not limitation. In FIG. 3, client 74 initiates a request 76 for information from an information server according to the present invention, such as information server 78. Request 76 travels through network communication infrastructure 80 and is received by network interface device 82. Communication infrastructure 80 may represent any type of communication infrastructure between information server 78 and client 74. Communication infrastructure 80 may be a LAN, such as an intranet or other local network, a WAN such as the Internet or other wide area network, a combination of a LAN and WAN, or any other communication path that allows transmission of requests and responses between client 74 and information server 78. Network interface device 82 thus represents the appropriate interface mechanism to tie information server 78 to network communication infrastructure 80.

Requests received by network interface device 82, such as request 76, are passed through network interface device driver 84, protocol layer driver 86, and a sockets layer such as sockets layer 88 or secure sockets layer 90. Network interface device driver 84, protocol layer driver 86 and a sockets layer 88 or secure sockets layer 90 represent typical mechanisms to communicate information from a low-level network interface device up to a higher level application or service. In addition, the various layers may have interface layers that reside between them in order to make the changing of a driver at any particular layer a relatively easy process. In other words, if a standard interface layer exists between protocol layer 86 and network interface device driver 84, either side of the interface may be replaced with very little impact on the component on the other side of the interface. Such an approach is taken, for example, by Microsoft Windows NT which typically utilizes a network device interface specification (NDIS) layer between a hardware device driver and a protocol layer. Similar interface layers may also exist between protocol layer 86 and sockets layer 88 or secure sockets layer 90.

Network interface device driver 84 represents, for example, an appropriate hardware device driver used to communicate information to and from network interface device 82. Similarly, protocol layer driver 86 represents, for example, any one of a number of standard protocols such as a standard IP stack including transmission control protocol (TCP) and/or user datagram protocol (UDP), Internet control message protocol (ICMP), Internet protocol (IP), address resolution protocol (ARP), and so forth.

Once the request passes through sockets layer 88 or secure sockets layer 90, the request is handled by an appropriate software component. Such a software component, either alone or in conjunction with other components, is responsible for interpreting the request and providing an appropriate response. As discussed in greater detail below, in an information server configured according to the present invention this process also involves retrieving configuration information from a special database where configuration and other types of "metadata" are stored. Such a database is sometimes referred to as a "metabase". Embodiments within the scope of this invention may therefore comprise means for retrieving information from a database and for accessing and returning information objects in response to a request. In FIG. 3, such a means is illustrated, for example, by such software components as web service 92, FTP service 94, news service 96, and other services 98. It should be remembered that these are given by way of example and not limitation. Other embodiments may implement such a component differently. Thus, the scope of means for retrieving information from a metabase and for accessing and returning information objects extends beyond the specific examples illustrated in FIG. 3 to equivalent functionality incorporated into other embodiments.

Web service 92, FTP service 94, news service 96, and other services 98 may be implemented, for example, by services running under Windows NT. Other embodiments are also possible and the services illustrated in FIG. 3 are simply meant to illustrate a software component that is tasked with handling a request received as previously described. In various embodiments, services, such as those illustrated in FIG. 3, may handle a request by themselves or may employ one or more other software and/or hardware components to handle the request. In the embodiment illustrated in FIG. 3, the various services may make use of other entities such as file system 100 and metabase system 102.

In the embodiments illustrated in FIG. 3, when a request is received by a component, such as one of the services illustrated, the component accesses appropriate information to fill the request. For example, request 76 may be a request to retrieve information from a particular information object stored on local storage 104 or remote storage 105. As explained in greater detail below, such a request is often accompanied by a path name that indicates the identity and/or location of the particular information object that should be retrieved. The service receiving the request may resolve the path name received in the request and use the resolved path name to retrieve the appropriate information object from local storage 104 or remote storage 105 using file system 100.

Retrieving the appropriate information object from local storage 104, however, is only part of the process for an information server configured according to the present invention. In addition to an information object, configuration and other data is retrieved and utilized in filling the request. In the present invention, such configuration and other data is stored in a metabase. As illustrated in FIG. 3, metabase 106 is accessed via metabase system 102. As explained in greater detail below, metabase 106 may be stored on local storage or may reside in memory, or in some combination of locations including local storage, memory, remote storage, and so forth. In general, however, the information in metabase 106 is stored in a manner to minimize the time necessary to retrieve desired information.

Conceptually, an information server configured according to the present invention receives a request, extracts appropriate configuration and other information, uses that information to perform any configuration or make any decisions necessary regarding the response that should be generated, accesses appropriate information objects, creates a response, and returns response to the requesting client. The exact manner that this process is performed by embodiments within the present invention will be described in greater detail below. At this point, however, it is important to understand that when a service, such as web service 92, FTP service 94, news service 96, or other services 98 of FIG. 3 receives a request, in filling the request it may access information in metabase 106 through metabase system 102 and information objects stored on local storage 104 or remote storage 105 through file system 100. Although not specifically illustrated in FIG. 3, it is also possible that the service may access information objects that are not stored locally through a mechanism appropriate to the information. For example, a service could retrieve information from another location of a local area network.

In the embodiment illustrated in FIG. 3, metabase 106 is accessed through metabase system 102. Metabase system 102 is meant to depict a software component that handles all access to the information contained in metabase 106. Exemplary implementations of metabase system 102 are discussed in greater detail below. Essentially, metabase system 102 provides a programmatic interface to metabase 106. Metabase system 102 is, therefore, but one example of a means for providing a programmatic interface to a metabase such that access to the metabase is obtained through the programmatic interface. Metabase system 102 may provide various functions, interfaces, entry points, and so forth to allow other software components to access metabase 106 in an appropriate manner. Various functions that can be implemented in various embodiments will become more apparent from discussions below which describe various features and characteristics of metabase 106.

After the appropriate service has generated a response by accessing information in local storage 104, remote storage 105, and/or metabase 106, the response is passed back through the appropriate sockets layer, such as sockets layer 88 or secure sockets layer 90, through protocol layer driver 86, network interface device driver 84, and network interface device 82. The response, such as response 108, is then passed through network communication infrastructure 80 back to client 74.

The previous discussion illustrated how an embodiment of the present invention may access appropriate configuration and other information to generate and service a response received from a client. The present invention, however, provides many advantages for administration of the information server and configuration information stored thereon. Thus, embodiments within the scope of this invention may comprise means for administering a metabase. In FIG. 3, such means for administering is illustrated by administrative tools 110. Administrative tools 110 represent any number or type of administrative tools used by an administrator to maintain and configure information server 78 and the data stored thereon. As described in greater detail below, such administration is typically performed by including various properties and other information in metabase 106. Thus, embodiments within the scope of this invention may comprise means for allowing write access to a metabase. In FIG. 3, such means is illustrated, by way of example, by arrow 112. Such a means may allow access to metabase 106 through the programmatic interface provided by metabase system 102. If metabase system 102 is implemented using a technology that allows remote access, then administrative tools 110 may reside at any location and still allow full administration of information server 76. Such a possibility is illustrated in FIG. 3 by administrative tools 110 residing outside the dashed box enclosing information server 78.

Since metabase 106 is accessed through the programmatic interface of metabase system 102 in the embodiment illustrated in FIG. 3, other entities may also access the metabase for various purposes. In FIG. 3, such a possibility is illustrated by other entity 114. Other entity 114 may be any type of entity which has the appropriate permissions and a need to store information in or retrieve information from metabase 106. For example, other entity 114 may be a content index server which accesses information on local storage 104 and indexes the content of the information. The results of such a process may reside in whole or in part in metabase 106. In, addition or in the alternative, metabase 106 may be used to store properties which indicate that indexing has been accomplished or should be performed. Various other purposes may also be accomplished by storing information in or retrieving information from metabase 106.

All the discussion of the embodiment illustrated in FIG. 3 has centered around a single copy of metabase 106. In certain embodiments, it may be desirable to maintain more than one copy of a metabase. In such an embodiment, it may be desirable to have a second copy of the metabase, such as metabase copy 116. If two copies of a single metabase exist, then embodiments may comprise a means for synchronizing one copy a metabase with a second copy of a metabase. In FIG. 3, such a means is illustrated, for example, by arrow 118. The synchronization mechanism is illustrated as communicating over communication infrastructure 120. This simply illustrates that the copy may reside a location where remote communication is necessary. In addition, the synchronization mechanism may also require the assistance of one or more other software components. In such a scheme, a software component at the location of metabase copy 116 may communicate with metabase system 102 or another software component to synchronize the two copies of the database. An example mechanisms to synchronize two copies of a database are discussed below.

Figure 6:
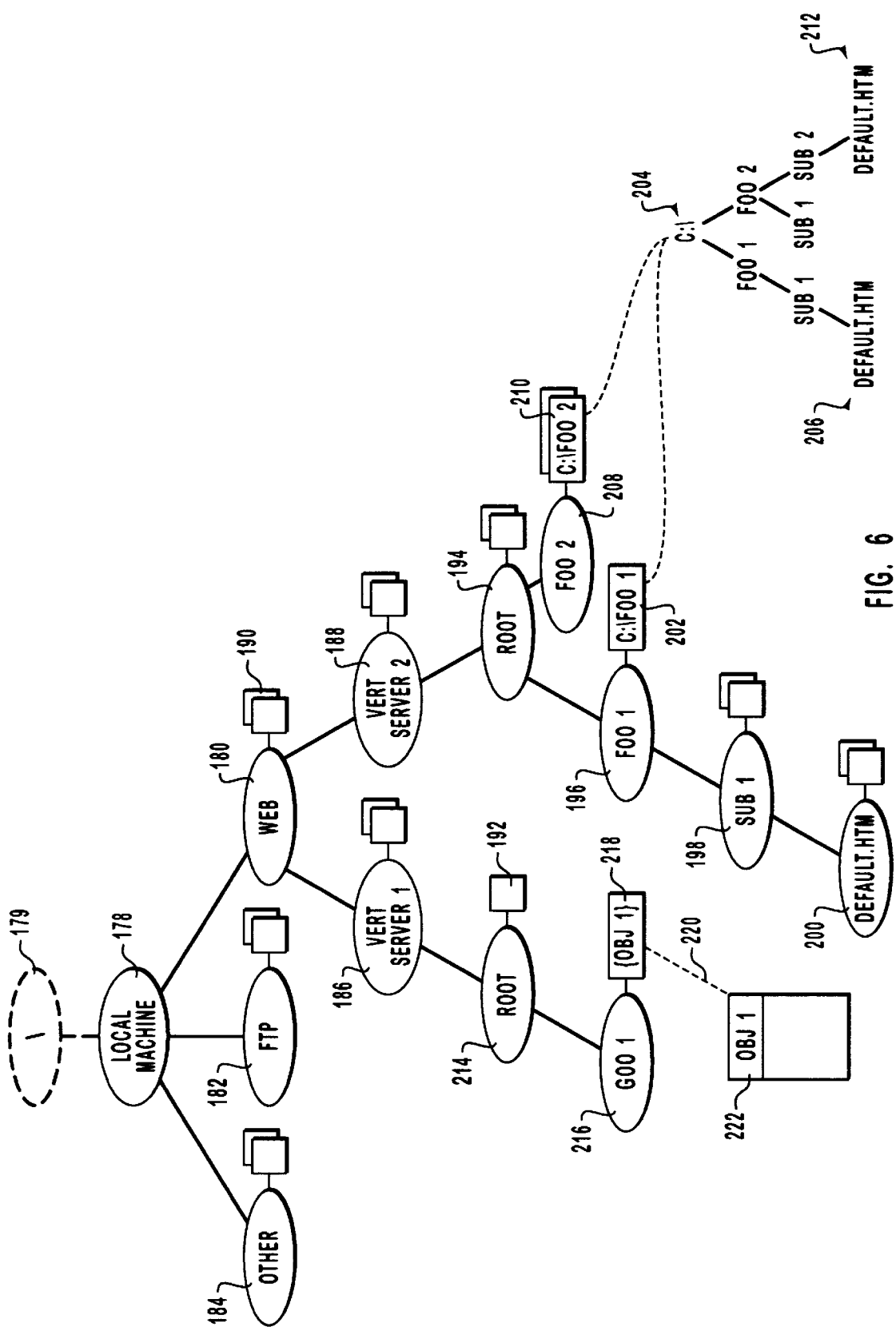
FIG. 6 is a high-level diagram illustrating path name resolution according to the present invention.

As previously described, embodiments of the present invention utilize a metabase, such as metabase 106 of FIG. 6, to store various types of configuration and other information. Although data stored therein may be organized in any fashion, for a variety of reasons it may be desirable, although not required, to organize the information in metabase 106 in a hierarchical fashion. Thus, in one embodiment of the present invention, metabase 106 comprises a variety of storage locations organized in a hierarchical fashion. The storage locations are sometimes referred to as key locations, or more simply keys. At each individual key, one or more properties may be stored. As explained in greater detail below, properties contain configuration and other types of metadata. The metadata stored by embodiments within the scope of this invention may generally be broken down into three categories. The first category is configuration metadata. Configuration metadata includes properties and settings which apply to information server operating system services. Such services are illustrated in FIG. 3, by way of example and not limitation, by web service 92, FTP service 94, news service 96, and other services 98. Such configuration metadata may include various configuration options for the various services. An example of such configuration metadata is an http port number.

The second category of metadata is content metadata. Content metadata includes properties which apply to the objects served and managed by an information server. An example of such content metadata is content rating information for various information objects on the information server. Another example of content metadata are access privileges which describe the type of access that a client may have for a particular location or object.

The third category of metadata suitable for storage in a metabase of the present invention is application metadata. Application metadata includes properties stored by an application or extension to the information server. Examples of such applications or extensions to the information server would be other entities which utilize or operate in conjunction with the information server. A content indexer has already been mentioned in conjunction with FIG. 3. Another example may be a component that retrieves real time or near real time information such as stock quotes and provides them in response to a request. Application metadata is typically stored or used by such an application or extension at initialization or run time to affect their behavior. Such behavior may either be in configuration or may be in the type of data or response returned. Examples of application metadata may include a property which indicates that a directory should be indexed, the server name which should be connected to in order to retrieve real time data, or objects which retrieve real time data or pointers to objects which retrieve real time data.

Figure 4:
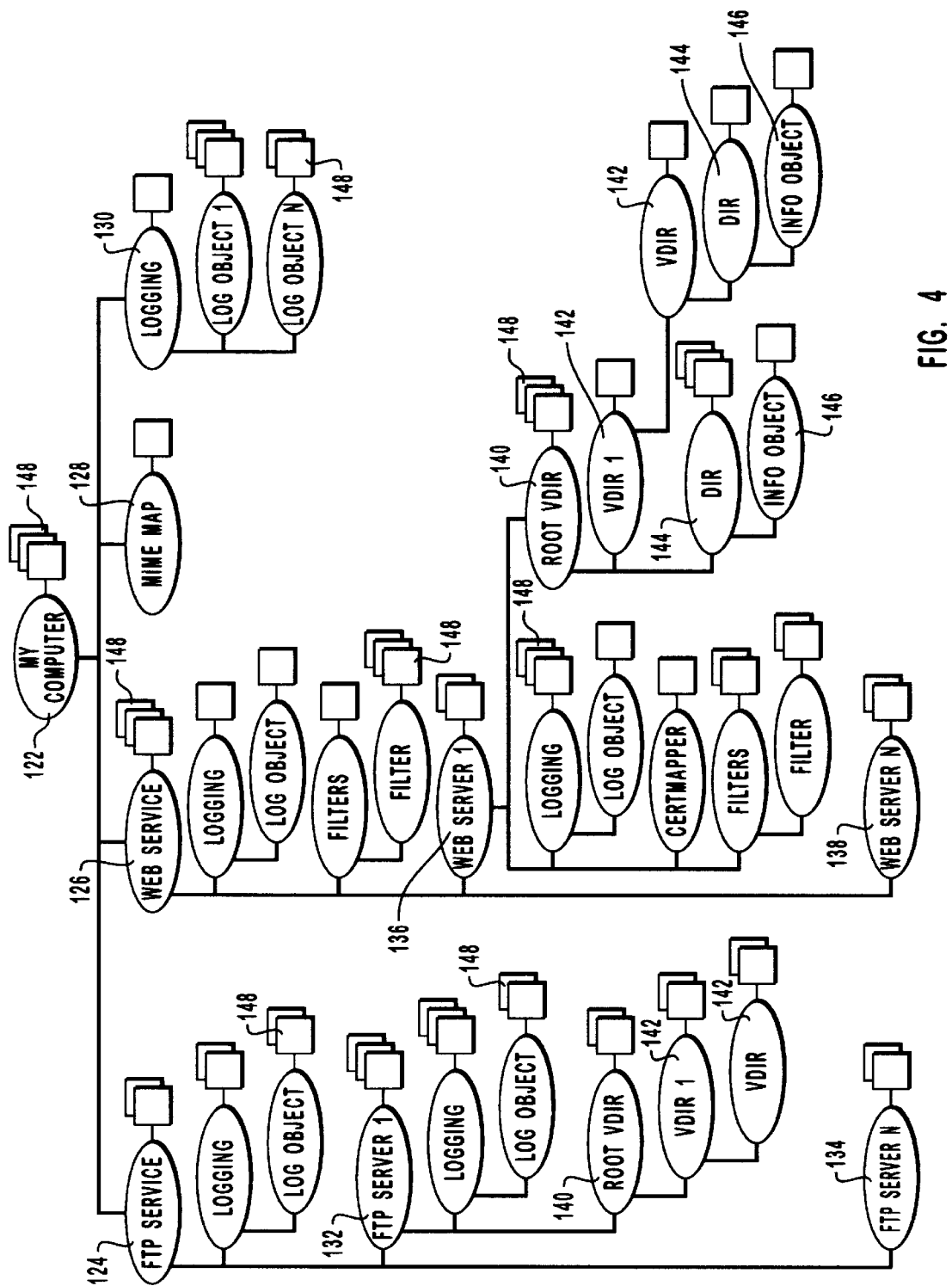
FIG. 4 is a representative example of the hierarchical structure of one metabase according to the present invention.

Turning now to FIG. 4, an example of the hierarchical structure of a metabase is illustrated. In FIG. 4, the keys are illustrated by ovals, such as my computer 122, FTP service 124, web service 126, MIME map 128, and logging 130. The metabase keys correspond to elements of an information server and each key contains properties that affect the configuration of its associated element. As previously described, each key may contain one or more configuration values called metabase properties or, more simply, properties. The metabase hierarchical structure typically mirrors the structure of an information server installation. For example, in the illustration of FIG. 4, my computer key 122 represents configuration information for the host computer such as a maximum bandwidth property that affects the overall operation of the information server.

Subordinate to the top-level key are FTP service 124, web service 126, MIME map 128, and logging 130. Keys stored at FTP service 124 would affect, for example, the configuration and operation of an FTP service, such as FTP service 94 of FIG. 3. Information stored at web service key 126 would affect the configuration and operation of a web service, such as web service 92 of FIG. 3. Similarly, MIME map 128 may affect a mail service and logging 130 may affect a logging service.

Embodiments within the scope of this invention may comprise multiple virtual servers of any given type. For example, although only a single FTP service and a single web service is illustrated in FIG. 3, such services may implement several virtual servers that look to the outside world like separate servers but, in reality, are implemented by a single service. Thus, the metabase may have several keys, each corresponding to a different virtual server. Such a situation is illustrated in FIG. 4 by FTP server 1 132, FTP server N 134, web server 1 136, and web server N 138. Keys at this location would be used to store properties influencing how the virtual servers are configured or how they operate.

Keys directly below the server keys correspond to root virtual directories, subordinate virtual directories, disk directories, and information objects. Virtual directories have no direct correlation in the physical storage media while directories and information objects have a direct counterpart in the physical storage media. In some situations, virtual root directories may be mapped to a physical counterpart that may not be a root directory. Various of these type of keys are illustrated in FIG. 4 as 140, 142, 144, and 146, respectively. The other keys illustrated in FIG. 4 also correspond to various objects of the information server installation.

In FIG. 4, the ability to store one or more properties at each key is illustrated by the various boxes attached to the individual keys. In FIG. 4 representative properties are illustrated as 148. Not all properties of FIG. 4 have been numbered to simplify the figure and make it easier to pick out various objects.

Keys in a metabase that are organized according to a hierarchy, such as that illustrated in FIG. 4, are analogous to a directory in a file system. Thus, key locations in a database organized in such a fashion may be addressed by a path name having various constituent names separated by a separator. For example, in FIG. 4 web server 1 key 136 may be accessed by \\computer\web service\web server 1.

Figure 5:
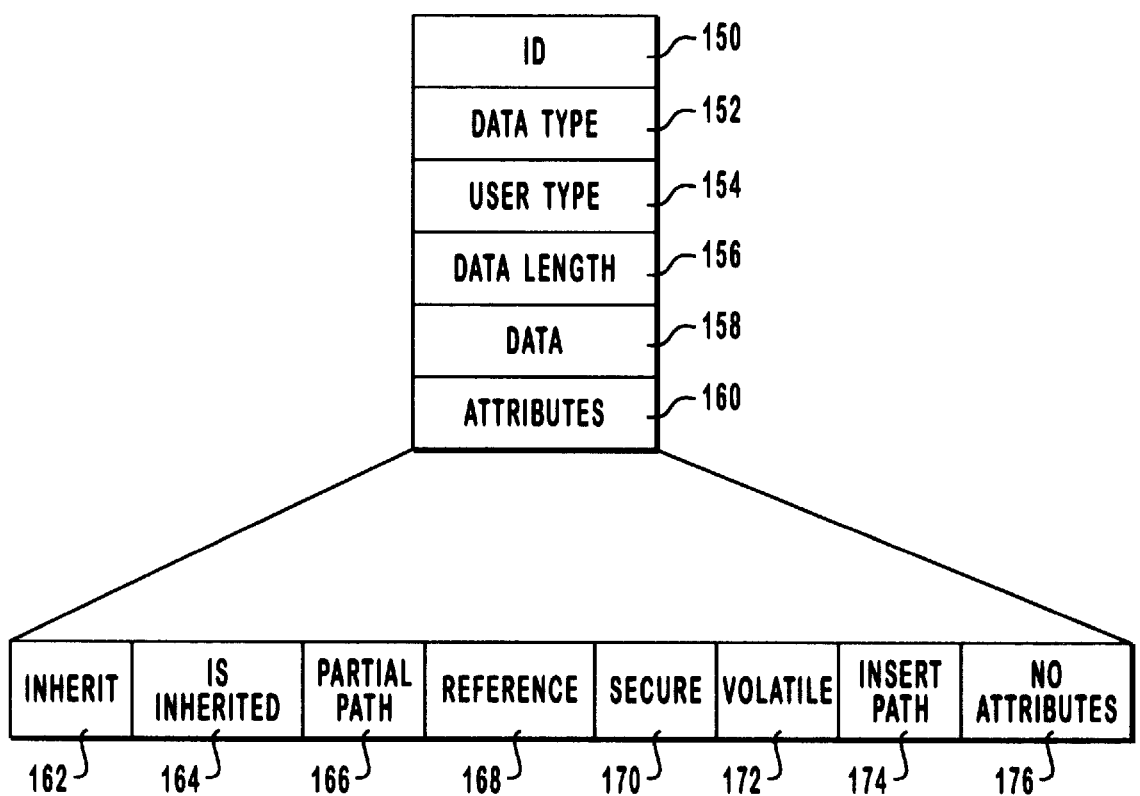
FIG. 5 illustrates one embodiment of a property suitable for use with the present invention.

Referring now to FIG. 5, a representative example of one possible property format is illustrated. As illustrated in FIG. 5, a property may comprise ID 150, data type 152, user type 154, data length 156, data 158, and attributes 160. ID 150 uniquely identifies the metabase property. For example, an ID may indicate that the property is a server state property. Data type 152 indicates the data type of the data in the property. Data may be strings, words, binary, or any other type of data supported by the implementation. User type 154 specifies the user type of the data. This field may be used by a user to indicate what the data is used for. Examples are user types that indicate an entry contains information specific to application configuration, access permissions, log methods, ports in use, IP addresses, web application management information, and so forth. Data length 156 allows retrieval of data 158. Basically, it allows the beginning and ending of data 158 to be identified. Attributes 160 are various flags that specify information about the property.

In one implementation, attributes 160 include inherit attribute 162, is inherited attribute 164, partial path attribute 166, reference attribute 168, secure attribute 170, volatile attribute 172, insert path attribute 174 and no attributes attribute 176. Inherit attribute 162 indicates that the data can be inherited. Inheritance of properties is described in greater detail below. Inherit attribute 162 may also be used to indicate that only inherited data should be returned. Is inherited attribute 164 indicates that a property has been inherited from a parent key. Partial path attribute 166 indicates that the entire path was not present or may not be present in the metabase. More information about partial paths is presented below. Reference attribute 168 indicates that the data is retrieved or can be handled by reference. Secure attribute 170 indicates that the data should be handled and transported in a secure fashion. Volatile attribute 172 indicates that the data should not be stored in long-term storage. Insert path attribute 174 indicates the path relative to a given starting point. No attributes attribute 176 indicates that the data does not have any attributes and the state of the other attributes should be ignored.

In order to implement a robust complement of security measures, properties within the metabase can be designed for secure handling and storage. This was alluded to previously in conjunction with secure attribute 170. Secure attribute 170 represents an example of means for storing secure data in a metabase. There may be a wide variety of reasons why properties in the metabase should be handled securely. Thus, setting secure attribute 170 will trigger any implemented security for storage and handling of sensitive properties. For example, as described in greater detail below, a metabase may store access control information that identifies what access various clients have. For a variety of reasons, the access control information should not be stored in a manner where someone can examine the information and determine which clients have what type of access. Thus, it may be desirable to handle such a property in a secure fashion so that the property is encrypted whenever it is transmitted beyond a trusted environment.

What constitutes a trusted environment may vary from implementation to implementation. What constitutes a secure or trusted environment may also vary according to the application. For example, security measures taken to store sensitive company information may not be as high as security measures taken to store national security information. In one embodiment, secure attributes are encrypted whenever they are written to non-volatile storage, such as a disk, and are encrypted whenever they are transferred beyond the immediate control of the programmatic interface. For example, if information is transferred beyond the direct control of metabase system 102 of FIG. 3, then such secure attributes would be encrypted. Other security mechanisms may be put in place to provide a greater or lesser degree of security when handling secure attributes, as appropriate to the particular implementation and intended use. Embodiments within the scope of this invention may also comprise other security features, some of which are discussed in greater detail below.

As previously illustrated in FIG. 4, embodiments within the scope of this invention may comprise a metabase with key locations organized in a hierarchical fashion. Each key location may store a variety of different properties. Also, as previously discussed the key locations within the metabase may be accessed through a hierarchical path with a plurality of constituent names, some of which corresponds to a key location in the metabase. If the structure of the metabase is set up to closely mirror the installation of the information server, such as that illustrated in FIG. 4, there is a high degree of correlation between the key locations in the metabase and the installation of the information server. A path name can, therefore, be used to access both the properties in the metabase and the information objects on the server.

Due to the high degree of correlation between the metabase structure and the information server installation, a single path name can be used to access both information objects and configuration and other metadata in the metabase. The present invention allows the retrieval of configuration properties concurrently with the access of requested information objects. The server can then combine the information retrieved from the metabase and the information objects accessed to generate a response that is appropriate to the request. As discussed in greater detail below, the information in the metabase may affect any aspect of the process of creating and returning an appropriate response. Creating a hierarchical key structure that closely tracks the server installation allows the access of required metadata to be a natural and integral part of the process of handling the request. No extra steps must be taken to a parse and determine what configuration information must be retrieved and where the configuration information is located. This can result in a dramatic savings over systems which store configuration and other parameters in text-based INI files.

Turning now to FIG. 6, examples of how configuration data may be retrieved as an integral part of the path resolution process are presented. In the metabase illustrated in FIG. 6, the named root key is local machine 178. Underneath named root key 178 are three keys representing web serves 180, FTP services 182, and other services 184. The web services have two virtual servers with keys 186 and 188. Each of the web servers has a root directory and an appropriate key structure that tracks, at least to some degree, the organization of information objects on the virtual server. Associated with each key are properties as appropriate. Exemplary properties 190 and 192 are numbered in FIG. 6.

The hierarchical structure of a metabase may also have an unnamed root key above the named root key that is always present. This key is illustrated in FIG. 6 by key 179. Depending on the implementation, such an unnamed root key may be treated slightly different than other keys. For example, in one implementation such a key may be protected from being deleted. Such a key may or may not be used to store properties, depending on the implementation. If such an unnamed root key is used to store properties, a mechanism to set and retrieve the properties should generally be provided.

To illustrate how path names can be used to retrieve information from the metabase, several examples are presented. As a first example, consider a request that comes with a path name of http://www.CompanyServer.com/foo1/sub1/default.htm. When the request is received, the http and www.CompanyServer.com constituent names will identify the request as one that should be handled by a web server. In one embodiment of the present invention, the second constituent name (www.CompanyServer.com in this example) maps to a virtual information server (sometimes called an instance number) like that defined in FIG. 6 by keys 186 and 188. The request, therefore, will be directed to one of the two virtual web servers provided by the information server. In this example, assume that the www.CompanyServer.com name refers to the second virtual web server. Thus, as the name is resolved, the service handling the request will know it needs to retrieve the properties stored in unnamed root 179 (if it exists), local machine 178, web 180, and virtual server 2 188. In addition, it is typical that the basic web address (www.CompanyName.com) refer to a root or default directory. Thus, resolving the constituent name www.CompanyName.com will also retrieve properties from key location 194. Note that until this point, the name resolution process has simply identified key locations in the metabase where properties should be retrieved. In this example, key location 194 corresponds to a virtual directory that has no corresponding location on physical storage. In some installations, this may not be a practical configuration and key location 194 would most likely indicate a location where a home page for the server may be retrieved if someone makes a request specifying only the company address.

As the name resolution process continues, the system would, in turn, identify the foo1 constituent name, the sub1 constituent name, and the default.htm constituent name. The resolution process would also identify the corresponding key locations 196, 198, and 200 respectively. Properties that specify various parameters for each of these physical objects are retrieved from the corresponding key locations. In FIG. 6, key location 196 has associated therewith property 202 whose contents are c:\foo1. This property thus points to a location on physical storage. At this point, the server may begin to go to physical storage and begin the name resolution process starting with the location indicated by property 202. An associated physical storage hierarchy is illustrated in FIG. 6 generally as 204. Examining physical storage hierarchy 204 indicates that the name resolution process of the path foo1/sub1/default.htm will identify and retrieve the default.htm document 206.

The server thus has retrieved all appropriate configuration information and has identified and retrieved default.htm document 206. The sever can then examine the properties retrieved from the metabase, the default.htm document 206, and then decide what response should be generated given the information available. For example, perhaps one or more of the properties retrieved form the metabase contained rating information. As the service decides how to respond to the request, it may evaluate the ratings on the pages and the permissible ratings that should be returned in a response. If default.htm document 206 contains information that should not be returned as identified by its rating, then perhaps the server returns a standard response indicating that the requestor's permissions were insufficient to receive the requested information. If, on the other hand, the requestor has sufficient permission to receive the desired information, the server may simply return default.htm document 206.

This example illustrates but one situation where the server may modify its operation based on the information retrieved from the metabase. Many other scenarios are possible and the present invention is flexible enough to accommodate a virtually unlimited number of different scenarios. Since there is no restriction on the type of property data that may be stored at any given key location, any information that would be necessary or desirable to help a server determine what response should be given to a request can be stored in the metabase.

As another example of a situation where the information server modifies its operation based on retrieved information, suppose one of the retrieved properties indicates that the information should only be transmitted in a secure fashion. In this situation, the server can initiate a secure connection to the requestor before transferring the desired information. Such a secure session may be a standard mechanism such as passing through a secure sockets layer like secure sockets layer 90 of FIG. 3 or may be a custom proprietary protocol. For example, a property may contain a requestor's public encryption key and the requested information can be encrypted using the public key stored in the metabase. Assuming that sufficient protections have been put in place to guarantee that only the proper public key has been stored in the metabase, such a scenario would allow selected individuals to retrieve and read desired information.

Returning now to FIG. 6, suppose that a request came in with the path http://www.CompanyServer.com/foo2/sub2/default.htm. As in the previous example, name resolution will identify the http and www.CompanyServer constituent names. These can be used to retrieve properties from key locations 178, 179 (if it exits), 180, 188, and 194. Constituent name foo2 would then identify key location 208, which would allow property 210 containing c:\foo2 to be retrieved. As in the previous example, this property is a pointer into physical storage hierarchy 204. Note, however, that unlike the previous example, the key hierarchy of the metabase terminates at foo2 key location 208. Thus, the remainder of the path cannot be resolved in the metabase. The remainder of the path can, however, be resolved in the physical storage hierarchy to retrieve default.htm document 212.

As previously indicated, and as discussed in greater detail in conjunction with FIG. 7 below, one aspect of the present invention allows properties to be inherited from parent key locations. Thus, although key locations corresponding to the constituent names in the subpath sub2/default.htm do not correspond to any key locations in the metabase, those locations may effectively be configured by inheriting various properties from one or more parent key locations. Thus, if the entire foo2 subtree of physical storage hierarchy 204 has a given rating, the rating parameter may be placed in key location 208 and may be inherited by every location and every information object in the foo2 subtree of physical storage hierarchy 204. This creates many benefits in administration and reduction of storage requirements that will be discussed in greater detail below. Partial path attribute 166 of the exemplary property illustrated in FIG. 5 can be used to help identify or retrieve partial path configuration information from a metabase.

The mapping of a received path into both the virtual name space of a metabase and the physical name space of physical storage provides some unique advantages not available in prior art systems. For example, two different paths with two different sets of properties can be used to retrieve a single physical object. Depending on which path is used to access the object, different results can occur.

For example, a first path can be provided that allows only read access to an object. A second path can be provided that accesses the same object, but allows read and write access. As another example, suppose when an object is accessed from an internal intranet, the object is sent in the clear (non-encrypted). However, if the same object is accessed from an outside Internet connection, the object is encrypted prior to being sent. Two different paths can be established to access the object from an internal intranet and from an outside Internet. The two paths will retrieve different properties and cause different behavior even though the object is the same. The concept can be extended to any number of paths.

Although the previous two examples have focused on retrieving documents from a physical storage location, the present invention is not limited to retrieving static information. Path names may also be used to access dynamic objects or other information objects that can retrieve or create desired information on demand when accessed. For example, it is relatively easy to envision an information object that when activated goes out, collects certain information, assembles the information into a desired format, possibly processing the information in the interim, and returns the assembled information in a form that may be used in creating an appropriate response.

As an example of such a situation, suppose the path http://InternalServer/goo1 was received. Further suppose that the constituent name InternalServer referred to an internal intranet server which was implemented as the first virtual server corresponding to key location 186 of FIG. 6. This path would then be resolved and allow retrieval of property information from key locations 178, 179 (if it exists), 180, 186, 214, and 216 respectively. Note that key location 216 corresponds to the goo1 constituent name. As illustrated in FIG. 6 key location 216 contains property 218 whose contents are a pointer or handle to object 1 222 as indicated by dashed line 220 and object 1 222. When the property information containing the pointer or handle is returned to the service, the service may access object 1 via the pointer or handle and use object 1 to generate and retrieve desired information.

This example illustrates that the present invention may go far beyond the service of requests to access static information documents and may, in a true sense, access and retrieve a wide variety of information in any desired manner so as to respond appropriately to a request received from a client.

Figure 7:
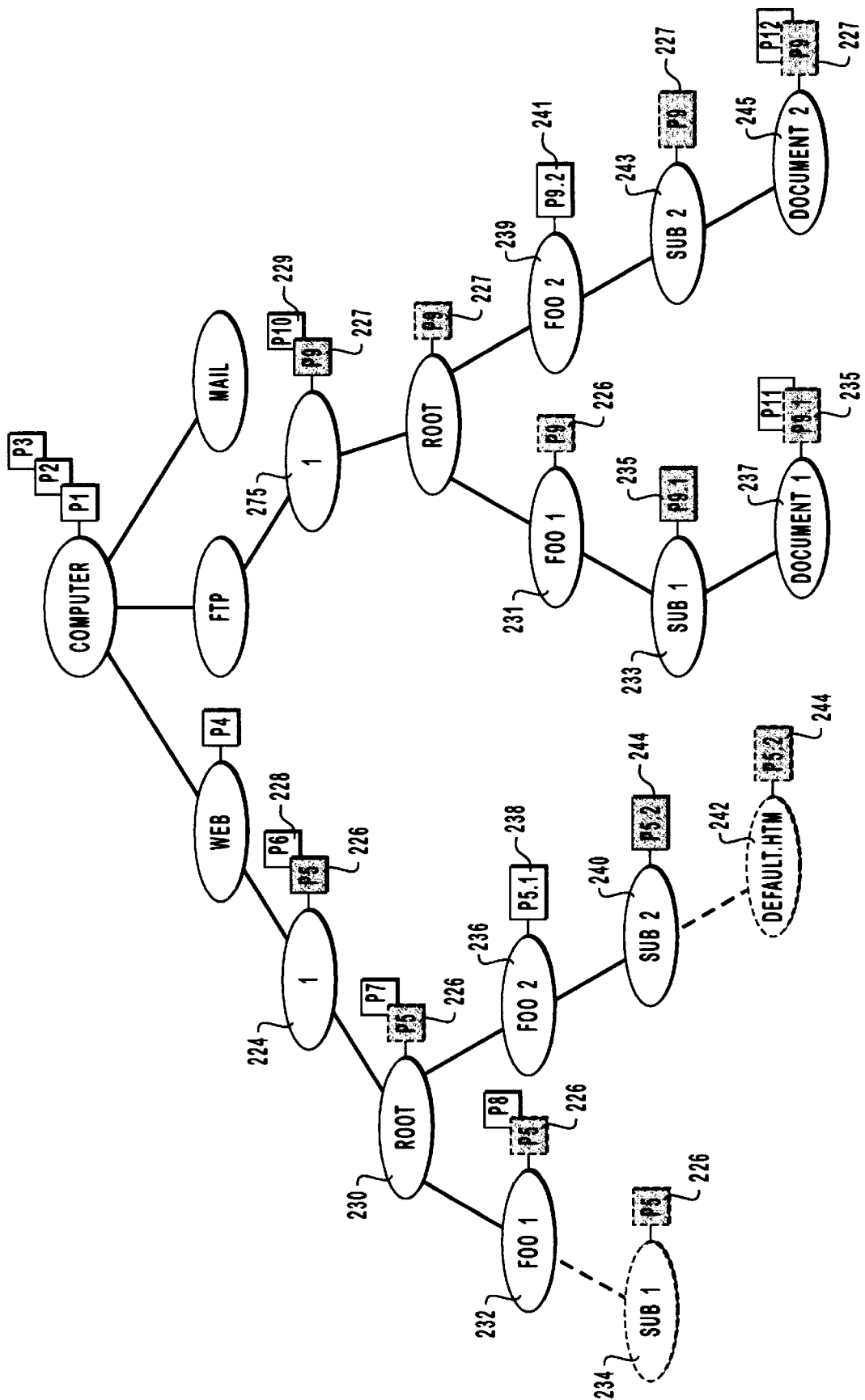
FIG. 7 is a high-level diagram illustrating inheritance of properties according to the present invention.

Turning now to FIG. 7, the concept of property inheritance is discussed in greater detail. FIG. 7 illustrates another key hierarchy of a metabase. Properties are attached to individual key locations in a manner that is consistent with previous diagrams discussed herein. Focusing on key location 224, which may correspond to the key location of a first virtual web server, properties 226 and 228 are stored therein. Assuming properties 226 and 228 have the form illustrated in FIG. 5 or, as a minimum, have a mechanism to indicate that a property should be inherited, then when the property is written to the key location, this indicator can be included. This indicator will then signal the metabase that the property should be inherited by all child nodes. In FIG. 7, property 226 is inherited by key location 230, 232, and 234. This is indicated visually by the shaded and dashed nature of property 226 as attached to key locations 230, 232, and 234.

Focusing for a moment on key location 234, it will be noted that the only property associated with key location 234 is property 226 which is inherited from key location 224. Thus, since the property is inherited and not stored at key location 234, there is no need to keep key location 234 in the metabase. Thus, key location 234 may be deleted as indicated by the dashed nature of key location 234. It should be noted that if a programmatic interface is used to access a metabase, then the functions implemented by the programmatic interface may handle the returning of virtual keys in a variety of fashions. As one example, when a requested location does not exist (e.g. the path terminates prematurely before the requested key location is reached), then the function may return properties that are inherited by that node based on its location relative to existing key locations. Other solutions are also possible. In the exemplary interface illustrated below, the calling program may set the partial path attribute illustrated in FIG. 5 when requesting data to request that inherited data for key locations be returned if the key location is not found. In the alternative, not setting the partial path attribute when requesting data will cause the function to return an error if the requested key location does not exist.

Returning now to FIG. 7, an example of how an attribute which has been inherited can be overridden is presented. Note that in FIG. 7, key location 236 has associated therewith property 238. Property 238 is set to override inherited property 226. Thus, for any child nodes of 236 property 226 will not be inherited. This can be identified by examining key locations 240 and 242. In one embodiment, such as that illustrated in the web subtree of FIG. 7, inheritance will not skip a generation. Thus, if a property is overridden at a particular level in the hierarchy, then any child key locations from that level will not inherit the property. Property 226 is effectively blocked from being inherited by property 238 for all of the subtree attached to key location 236. Note, however, that another property may be set in the subtree and inherited by child key locations. This is indicated in FIG. 7 by property 244 attached to key location 240 and inherited by key location 242. As with key location 234, if key location 242 possesses no other properties than inherited property 244, then key location 242 need not exist in the hierarchy and may be removed as indicated by the dashed nature of the key location.

An alternate embodiment implementing different rules for inheritance is illustrated in the FTP subtree of FIG. 7. In this embodiment, inheritance can skip a generation. Focusing on key location 225 with properties 227 and 229, assume that property 227 is inherited. This property will then be inherited by all subkeys unless overridden by another property. As illustrated in FIG. 7, property 227 is inherited by key 231. However, property 227 is overridden at key 233 by property 235 and key 239 by property 241. If property 235 is to be inherited by all subkey locations, this will block key 227 from being inherited by any subkeys of key 233. This is indicated in FIG. 7 by property 235 being inherited by key 237.

Unlike the embodiment illustrated in the web subtree of FIG. 7, inherited keys can skip a generation in this example. Thus, although property 227 is overridden by property 241 at key 239, any subkeys will still inherit property 227 as long as property 241 is not inheritable. Property 227 is, therefore, inherited by keys 243 and 245 as indicated. Other types of inheritance schemes may also be developed.

As illustrated in FIG. 7, the characteristic of inheritance may dramatically reduce the number of key locations that must be created and tracked in a metabase and may dramatically reduce the administrative burden in maintaining and configuring a metabase. This creates the ability to maintain the entire metabase in memory for much greater numbers of documents than would be possible with text-based INI files. Judicious use of the inheritance feature of the present invention can also dramatically simplify the administrative burden in creating and maintaining a metabase. For example, a system administrator who organizes a logical metabase hierarchy where key locations may share inherited data to the maximum extent possible will only need to administer those key locations possessing the original property. Thus, entire subtrees may be administered by setting a single property in a single location. The ability to override properties that are inherited also allows a great degree of flexibility in collecting data together that may share many properties in common but not all properties in common. Of course, this technology may open up an entirely new class of administrative tools which can go through the hierarchy of a metabase, examine the properties stored therein, and make recommendations to system administrators on how to rearrange the hierarchy to achieve the maximum use of the inheritance feature so as to eliminate redundant data from the metabase.

The incorporation of inheritance properties into a metabase may lead to the incorporation of various features into any programmatic interface used to access the metabase. As previously discussed, these features may include functions that operate properly when a key is not found in the metabase but inheritable properties exist for the desired key. In other contexts, it may be desirable to provide functions that return all properties of a key, both inherited and properties physically stored at that key (non-inherited). Other functions may be provided that retrieve only inherited properties or only non-inherited properties.

The inheritance feature of the present invention greatly eases the administrative burden and reduces the number and diversity of properties that need to be stored in a metabase. There may be cases, however, where a server may not want a particular property to be overridden. For example, it may not be wise to allow various security features to be overridden by blocking inheritance of those properties. Thus, appropriate mechanisms may be put in place to allow an entity retrieving information from the metabase to identify which properties are inherited and identify if such inherited properties are being overridden at a particular point in the key hierarchy. Again returning to FIG. 5 and examining the attributes of the example property, is inherited attribute 164 may identify a property that is inherited from a parent node. A comparison of the ID and is inherited flag of the properties retrieved at various key locations in the hierarchy can identify if one key location is overriding an inherited property. The entity can then make an appropriate determination as to what should be done.

Figure 8:
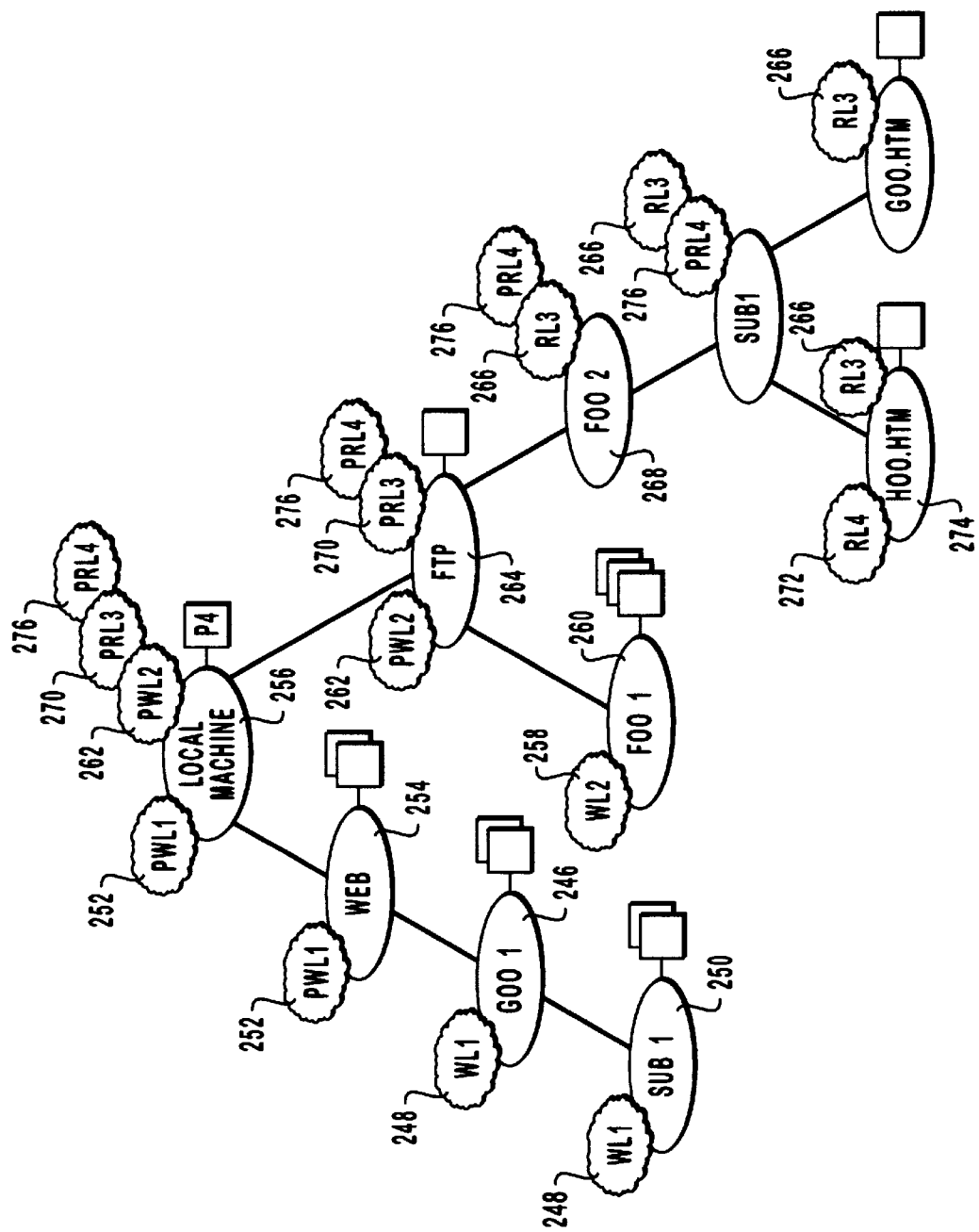
FIG. 8 is a diagram illustrating the read and write locking mechanisms according to one embodiment of the present invention.

Referring now to FIG. 8, a discussion regarding a mechanism for locking keys for reading or writing is presented. In any database there arise problems of simultaneous access to data locations. It is desirable to always ensure that the database maintains a logically consistent state as changes or updates are being made to the database. A situation should be avoided where one entity is reading information from a particular location while another entity is changing that location. In order to prevent such occurrences, read locking and write locking of databases are implemented and a wide variety of schemes have been developed in the past. However, when the concept of inheritance is introduced into a database, traditional mechanisms of read locking and write locking must be modified in order to allow the database to be changed in a manner that is logically consistent.

The present invention implements two different types of read locks and two different types of write locks. In this discussion, the two different read locks will be referred to as a read lock and a path read lock, and the two different write locks will be referred to as a write lock and a path write lock. In general, a read lock and write lock function in much the same way as has been traditionally employed in other contexts. For example, if an entity wishes to ensure that no data will be changed while it is reading a key it may open a particular key location for reading. As the key location is opened for reading, a read lock is placed on the key location. Any number of entities may open a particular key location for reading. This is premised on the concept that everybody may read a particular location and receive consistent data as long as no changes are made to the data. Thus, opening a read lock on a particular location will block any write locks from being granted on that location. Similarly, if a location is being updated, then no entity should read the location until the update has been complete. Thus, a write lock on a particular location will block any read locks from being granted.

Due to the hierarchical nature of the metabase and due to the fact that when properties are retrieved they are typically retrieved for an entire hierarchical path, when a read lock is granted, a read lock is placed on the requested key location and any child locations. The read locks on the child locations will prevent write locks from being opened on the child locations before an entity has had sufficient time to retrieve properties from the entire desired path. Similarly, when a write lock is granted on a particular key location, the write lock is also placed on all child locations to allow updates to occur to an entire subtree if desired. This is necessary due to the fact that a property that will be inherited by an entire subpath can be written at a specific key location and that single write will effectively propagate through an entire subpath. Thus, to protect against reading inconsistent data write locks must be granted to the entire subpath when a write lock is granted on a particular key location.

The previous discussion illustrates the rationale for granting read and write locks to key locations and their child locations. However, the concept of inheritance also requires modifications in the way that parent nodes are treated when read locks and write locks are granted. This can be illustrated by examining the desired outcome when a particular key location is open for reading or writing. When a particular key location is open for reading, it is desired that the properties at that key location and its child locations, remain constant until the read is complete and the read lock is released. In order to ensure that the properties at that key location remain constant, however, any properties inherited from parent key locations must also remain constant. Thus, a type of read lock should be placed on parent key locations when a read lock is granted for a particular key location. The read lock must be sufficient to ensure that the properties at parent key locations will not change, but should not preclude writing at other points in the hierarchy related to the location where the read lock is granted only through a common parent key. Similarly, when a write lock is granted, parent locations should be protected from change. It would not be desirable to allow someone to open a parent key location for reading (since that will attempt to place read lock on the write lock and key) but there is no reason to preclude other entities from reading a different part of the hierarchy related to the location where the write lock has been granted only through a common parent key location. The solution to all these issues is to assign path read locks to parent key locations when a read lock is granted to a particular key location and to assign path write locks to parent key locations when a write lock is granted.

Referring now to FIG. 8, one embodiment of a read lock mechanism suitable for use with the present invention is presented. In FIG. 8, suppose that a first entity was granted a write lock on goo1 key location 246. This is illustrated in FIG. 8 by write lock 248. As indicated in FIG. 8, write lock 248 is also placed on child key locations relative to key location 246. This results in write lock 248 being placed on key location sub1 250. A path write lock is then placed on all parent key locations. Thus, path write lock 252 is placed on web key 254 and local machine key 256. Similarly, write lock 258 may be granted to key 260 which will result in path write lock 262 being placed on key 264 and key 256. Note that key 256 now contains two path write locks but neither precludes appropriate write locks from being granted on different parts of the hierarchy. They will, however, prevent read locks from being granted on those keys.

Now assume that a read lock 266 was granted for key location foo2 268. Read lock 266 would then be granted to all child keys 268 as indicated in FIG. 8. Path read lock 270 would also be placed on parent key 264 and 256. Finally, assume that a second read lock 272 was granted on key 274 labeled hoo.htm. This would result in path read lock 276 being placed on all its parent key locations in FIG. 8.

From the diagram in FIG. 8, it will be seen that although a single node may only have a single write lock or multiple read locks, a node may have various combination of path read locks and path write locks. This is due to the specialized function these locks performed as previously described. Counts may be maintained for each of the key locations as read locks are granted to track the number of read locks granted to a particular key location.

Figure 9A:
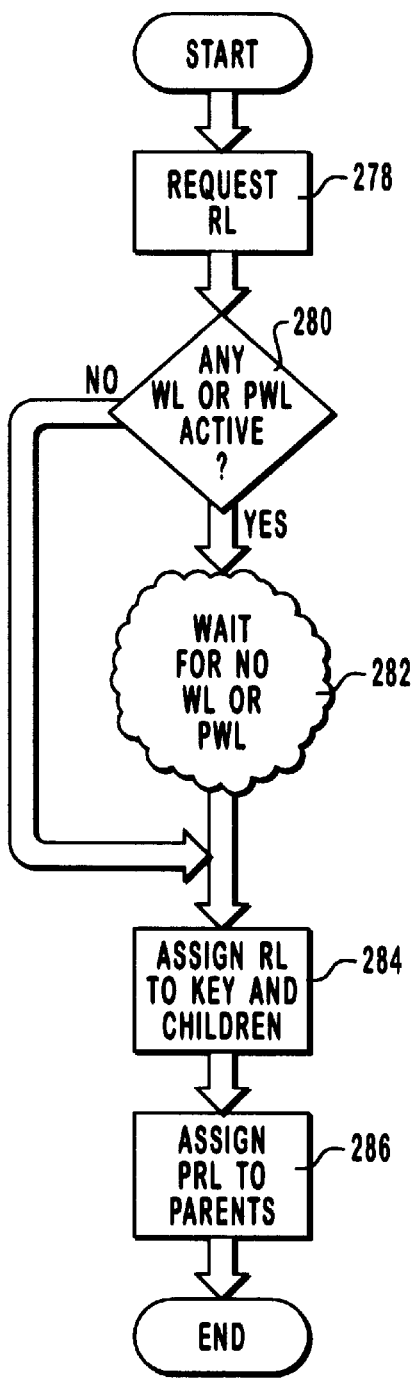
FIGS. 9A and 9B illustrate the processes of granting and releasing read locks according to one embodiment of the present invention.
Figure 9B:
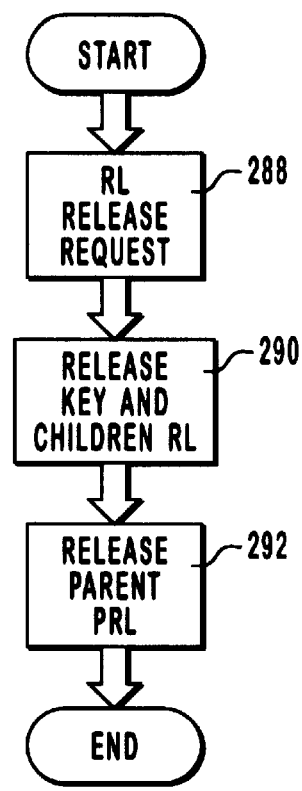

Referring now to FIGS. 9A and 9B, the process of granting read locks and releasing read locks is presented. Referring first to FIG. 9A, the process begins with a request for a read lock as indicated by step 278. Before a read lock will be granted, it will be checked to see if the key location has any open write locks or path write locks. This test is illustrated in FIG. 9A by decision block 280. If the key location has active write locks or path write locks, execution then proceeds to step 282 where one of several events may occur. In the situation illustrated in FIG. 9A, the request waits until no write locks or path write locks remain on the desired key location. In the alternative, the routine may return with an error indicating that a read lock may not be granted. As yet a third option, the routing may wait for a designated period of time and, if the read lock cannot be granted within that time, return with an error.

Once no active write locks or path write locks remain on the desired key location, execution proceeds to step 284 where read locks are granted to the key location and to any child locations. Execution then proceeds to step 286 where path read locks are placed on all parent key locations. Steps 284 and 286 individually and collectively represent but one example of a means for placing read locks at identified key locations. In embodiments that support different types of read locks, mechanisms that place these various types of read locks may also be properly classified as means for placing key locks.

Referring now to FIG. 9B, the process of releasing a read lock is presented. The process begins at step 288 where a read lock release request is received. Execution then proceeds to step 290 where read locks are released from the key location and any child locations. In step 292 path read locks are released from any parent locations.

Turning now to FIGS. 10A and 10B, the process of granting and releasing write locks is presented. There are many similarities between the process of granting write locks and the process of granting read locks. These are apparent in the similar structures of the read locks and write lock figures. Referring first to FIG. 10A, the process of granting a write lock begins when a write lock request is received at step 294. Execution proceeds to decision block 296 where the key location is checked for any active read locks, path read locks, or any write locks or path write locks. If active read locks, path read locks, write locks, or path write locks exist, execution proceeds to step 298 where the route waits until all locks have been released. Waiting for write and path write locks to be released prevents overlapping write locks. As previously discussed in conjunction with FIG. 9A, at this point the routine may also return an indication that a write lock could not be granted without waiting. In the alternative, a routine may wait for a designated period of time and, if the write lock cannot be granted within that time, return with an error.

After no read locks or path read locks remain, execution proceeds to step 300 where write locks are granted to the requested key location and any child key locations. Execution then proceeds to step 302 where path write locks are assigned to the ancestors. Steps 300 and 302 individually and collectively are examples of means for placing write locks at identified locations. In other implementations using different types of write locks, other mechanisms may correspond to such means for placing write locks at identified locations.

Referring now to FIG. 10B, the process of releasing write locks is illustrated. The process begins with step 304 where a release request is received. Execution proceeds to steps 306 and 308 where the key location and child location write locks are released and where ancestor path write locks are released. Execution then proceeds to step 310 where notification of changes may be sent to any registered clients.

One of the advantages of the present invention over prior art systems is the ability to notify registered clients when changes occur to the metabase. This allows clients to register for certain events and, when those events occur, receive notification so that they can take appropriate action. Although this concept is discussed in greater detail below, one event that clients may register for is a change to all or part of the metabase. When changes occur, notification of the changes is sent to registered clients. It is desirable to send such notification when a logically consistent state has been reached in the metabase. In other words, if an administrator is making several changes to a particular key location or to a particular hierarchy in the metabase, it would be unprofitable to send notification for each individual change. It is much more efficient and better to allow the administrator to finish all changes to a particular key location or hierarchy and then send notification of changes to that key location or hierarchy. If the administrator still has a write lock on a particular key location or on a particular hierarchy, it would not do any good to send notification that the key location had changed since a client attempting to read properties from the key location would be prevented by the write lock on the key location. Thus, the first time that a client would have an opportunity to read properties from the key location would be when the write lock on the key location was released. It makes sense to trigger notifications for modifications in the hierarchy when write locks on the particular location have been released.

In addition to the simple step 310 shown in FIG. 10B, it may also be desirable to track or test whether actual changes were made in the metabase before notification is sent. For example, it is not necessary to send notification if an administrator obtains a write lock on a location and simply releases it without making any changes. Thus, the trigger to send notification may be much more sophisticated than is indicated in FIG. 10B. Step 310 of FIG. 10B represents only one example of means for sending notification when certain events occur. Other examples, as previously explained, are also available.

Figure 11:
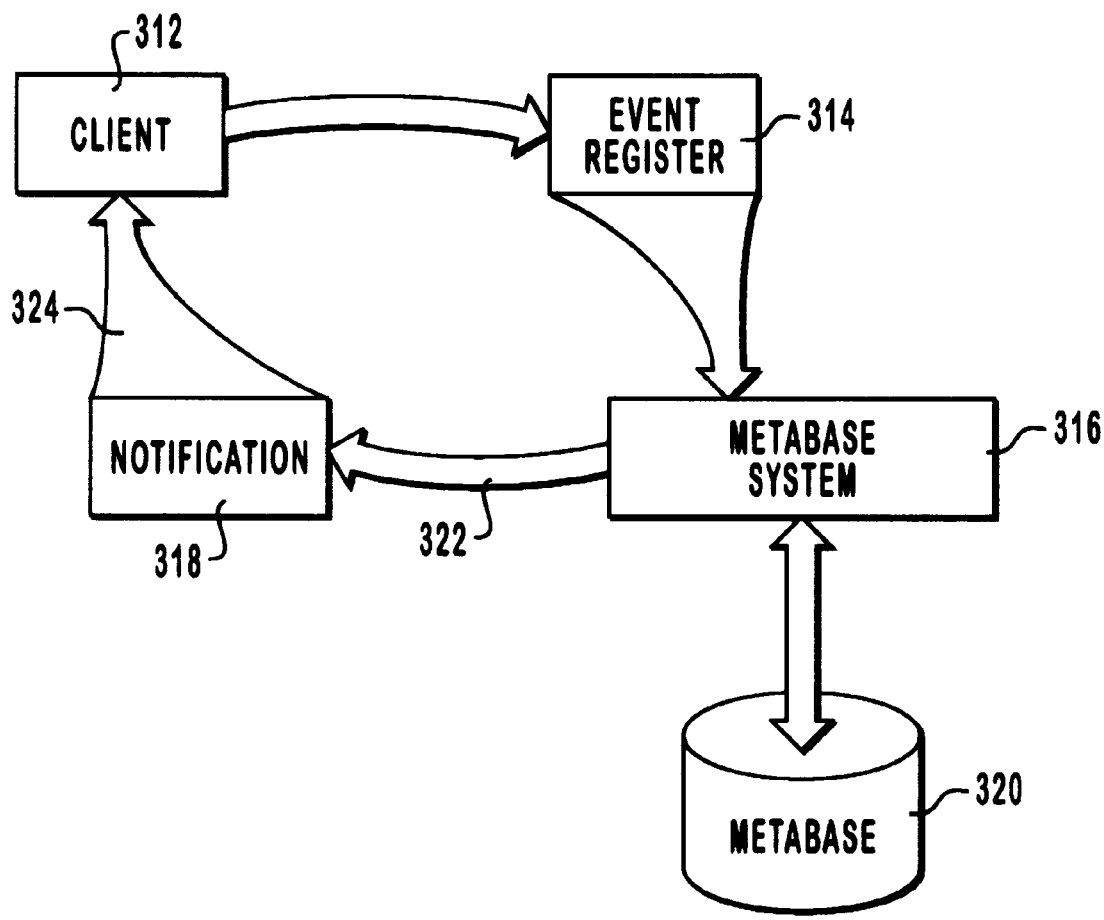
FIG. 11 represents the notification mechanism of one embodiment of the present invention.

Referring now to FIG. 11, the concept of notification is explored in greater detail. FIG. 11 represents a high-level diagram of the notification process. A client, illustrated in FIG. 11 as 312, sends registration request 314 to metabase system 316. As previously explained in conjunction with FIG. 3, metabase system 316 represents but one example of a programmatic interface to a metabase, such as metabase 320 of FIG. 11. Such a programmatic interface makes the process of sending notification described herein much simpler. This is because the programmatic interface controls all access to the metabase and is aware of all events which occur relative to the metabase. Thus, tracking and sending notification when certain events occur is a simpler process than if metabase 320 were not accessed through a programmatic interface.

Metabase system 316 receives event registration request 314 and registers client 312 for the requested events. When the events occur, metabase system 316 sends notification 318 to client 312. Notification 318 may contain information regarding which event occurred and, perhaps, detailed information that allows client 312 to select an appropriate course of action. For example, client 312 may register for changes that occur to the metabase. When changes occur to the metabase, metabase system 316 may include as part of notification 318 information that identifies the particular key locations that have been changed. Client 312 can then determine whether it is necessary to read information from metabase 320 to update its information. If the change occurred in a portion of the metabase of little interest, perhaps client 312 does not immediately read the information from metabase 320 but waits until a request is received that requires client 312 to retrieve the changed information. At the very least, notification 318 will allow client 312 to invalidate locally stored information so that updated information can be obtained from metabase 320 at the appropriate time. By way of example, and not limitation, in FIG. 11, means for sending notification when specified events occur is illustrated by notification 318, arrow 322, and arrow 324 which indicate the transfer of notification 318 to client 312.

Figure 12A:
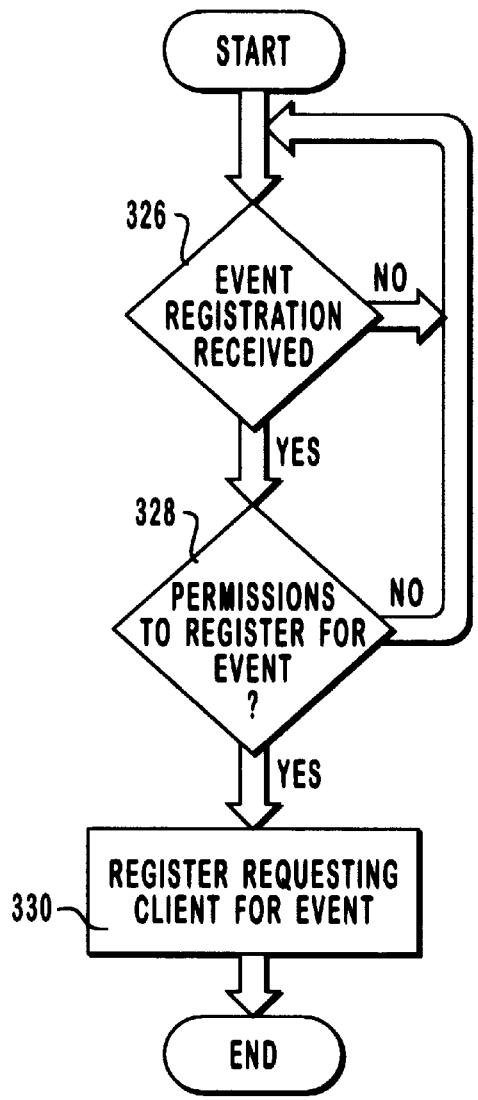
FIGS. 12A and 12B illustrate the process of registering and sending notifications according to one embodiment of the present invention.
Figure 12B:
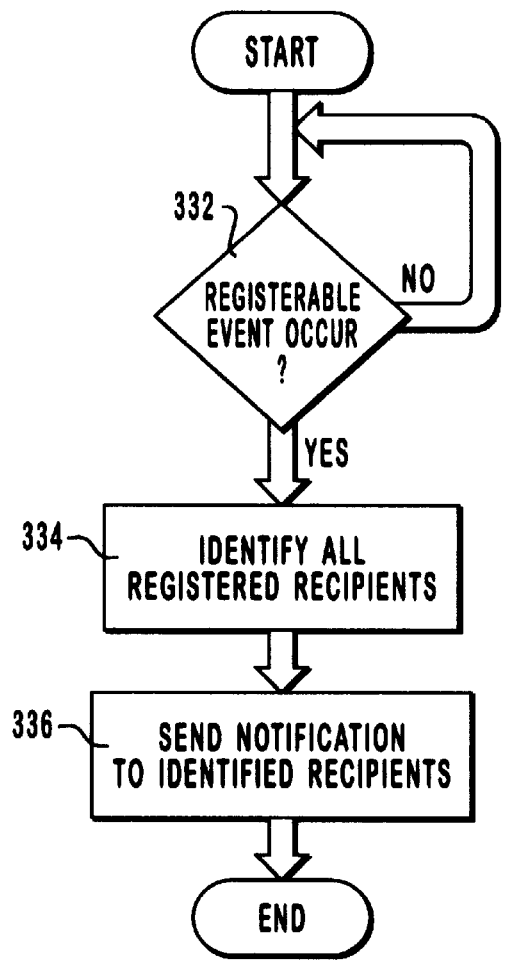

Referring now to FIGS. 12A and 12B, simplified diagrams of the registration and notification process are presented. These diagrams represent only the basic concept of registration and notification and, as briefly explained in conjunction with these diagrams, many other features and steps may be included to implement a robust notification mechanism.

Referring first to FIG. 12A, the process begins with decision block 326 which allows the process to wait until an event registration request is received. Once an event registration request is received, execution proceeds to decision block 328 which tests whether the entity requesting registration has sufficient security permissions to register for this event. This decision block is not necessary but may be desired to implement a robust notification system. In addition, any other checks necessary to determine the validity or allowability of a registration request may be placed in FIG. 12A. For example, it may be desirable to test whether the request contains a valid registerable event. It is anticipated that not all events that occur in the metabase may be registerable events. In other words, notification may be sent for each and every possible event that may occur within the metabase. Some events may be registerable for notification while other events may not. The exact details will depend upon the particular implementation. Assuming the registration request passes decision block 328, and any other associated checks, execution proceeds to step 330 where the client is registered for the event.

The registration and notification may occur through a wide variety of mechanisms. For example, the registration request may contain a handle or pointer to an entry point or function that should be called when the event occurs. Other mechanisms may also be used. For example, certain subsystems and operating systems have built-in event notification mechanisms. Notification may be sent via these mechanisms by placing a message onto the event notification stream. For a variety of reasons, it may not be desirable to send notification in this manner, but certain implementations may choose to utilize such mechanisms. Essentially, all that is required is that notification be able to be given to clients which register for a specified event.

Turning now to FIG. 12B, the basic steps involved in sending notification to a registered client are illustrated. The process begins with decision block 332 which waits until one of the registerable events occur. Execution then proceeds to step 334 where all registered clients are identified. How this step is implemented will be highly dependent upon the particular registration implementation, and possibly upon the particular notification mechanism used. After all registered recipients have been identified, execution proceeds to step 336 where notification is sent to the identified recipients. How this is accomplished will be dependent upon the notification mechanism used.

The read and write locking as well as the notification procedures enable true simultaneous administration of a metabase. For example, one administrator may write lock a portion of the metabase hierarchy while another administrator may write lock another portion of the metabase hierarchy. Both administrators may make changes to their respective portions of the hierarchy. When one administrator releases the write lock, the changes that were made can immediately be sent to the other administrator in order to allow the view of the metabase seen by the administrator to be updated. Thus, the ability to write lock different portions of the metabase coupled with the ability to notify others of changes ensures that each entity accessing the metabase will have the most current view and can make intelligent decisions about how the metabase should be administered.

Various security aspects of the metabase have been previously described. For example, the concept of secure properties which are handled in a secure fashion has been previously described in conjunction with FIG. 5. Generally, security may be broken down into two fundamental categories. The first is security of the metabase itself which includes the ability to prevent unauthorized access or modification of the metabase. The second is security of the information objects served by the information server. Typically, access to the information objects served by a server is implemented using the security mechanisms of the operating system. For example, Microsoft Windows NT and other advanced operating systems provide a full complement of security measures which prevent unauthorized access and modification to various portions of the operating system or data stored on the system. More information regarding the security features of Microsoft Windows NT can be found in *Inside Windows NT* by Helen Custer, published by Microsoft Press and incorporated herein by reference.

To compliment or enhance the security features already implemented in the operating system that hosts the information server, it may also be desirable to include various security features in the metabase. The security features can be used to enhance the security of not only the metabase itself but also the information object served by the information server.

Figure 13:
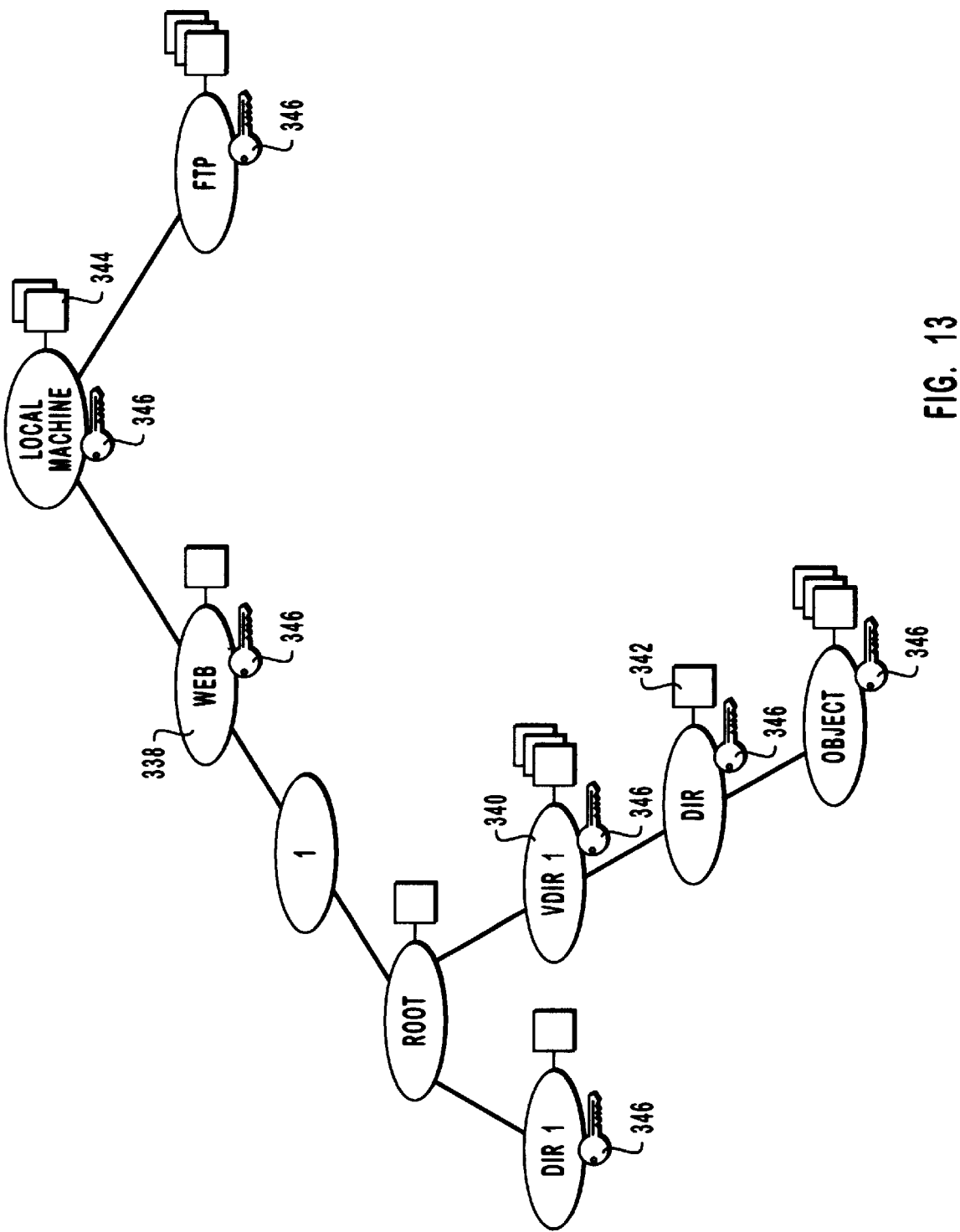
FIG. 13 illustrates the storing of security information in the metabase of one embodiment of the present invention.

Referring now to FIG. 13, one characteristic of the security features that may be implemented by the metabase is presented. In FIG. 13, a hierarchical representation of the keys of a metabase is presented. Associated with various key locations are properties. As previously illustrated, and consistent with the notation of previous diagrams, the keys of FIG. 13 are illustrated by ovals with keys 338 and 340 being exemplary. Each key 1 may store a plurality of properties which are represented by the boxes attached to the ovals. Properties 342 and 344 are exemplary.

In order to enhance security of the metabase, each request to the metabase may be checked for appropriate permissions to access the metabase. For example, because access to the metabase is preferably implemented through a programmatic interface, queries or accesses into the database may be tested for sufficient permissions. All that remains is to establish a procedure and mechanism for storing and checking the permissions. Although any mechanism may be utilized, including various conventional mechanisms, in one embodiment a unique mechanism is used to store access control information directly in the metabase itself. For example, access control information may be stored as a property in a particular key location. The property may be inheritable and may also include and take advantage of the wide variety and rich set of other attributes available in the metabase. Security properties may, for example, have the secure attribute set which will cause them to be handled and treated in a secure fashion as discussed in conjunction with FIG. 5 above. Other property formats may also be possible. In FIG. 13, keys where access control properties reside are indicated by key symbols 346. As indicated in FIG. 13, implementing access control in this fashion allows the access control for each individual key to be customized or allows a single key to control access to an entire subtree through the use of inherence. For example, key location 340 may store an access control property which is then inherited by each of its child keys.

The use of properties to store access control information results in a tremendously flexible format that can be custom tailored to any desired implementation. Since there are no restrictions on the type of data that may be stored in a property, any particular access control mechanism may be implemented. The programmatic interface may retrieve the access control properties and determine whether the requesting client has sufficient permissions for the desired access. If so, the request may be filled. If not, an error may be returned. In this fashion, unauthorized access to the metabase may be prevented.

Such a mechanism prevents unauthorized access to the metabase though the defined programmatic interface. However, if the metabase is written to permanent storage then the metabase may be accessed through other mechanisms not authorized by the programmatic interface. For example, the file may be accessed through another program. Modern operating systems, such as Windows NT, carry a full complement of security features that can prevent such unauthorized access. It is important to realize, however, that the security of a copy of the metabase written to the permanent storage does not rest solely with the metabase but also with the operating system.

The security mechanism described to prevent unauthorized access to the metabase may also be extended to prevent unauthorized access to information objects served by the information server. In this situation, security information would be placed in a property and written to the metabase. The security information would apply to the information objects, rather than to the metabase itself. The security information could be retrieved by a requesting entity just like any other property. Using the security information, the requesting entity can determine whether the client attempting to access the information object has sufficient permissions.

Although any type of security object may be stored in the security properties, in one implementation access control lists having a structure equivalent to those used by Windows NT are used. Such access control lists comprise a linked list or other collection of access control entries. An access control entry contains security ID and a set of access rights. The security ID identifies the user or group being granted or denied the rights enumerated in the access control entry. Access rights may include, for example, the right to read data, the right to write data, the write to execute an object, and so forth. Access control entries in Windows NT can grant the enumerated rights, deny the enumerated rights, or allow the enumerated rights with an auditing procedure. Further information regarding access control lists can be found in *Inside Windows NT,* previously incorporated by reference. The access control lists of Windows NT are but one example of possible access control structures that may be used with the present invention. As the properties define and impose no structure on the data stored therein, any access control information custom tailored to a particular implementation may be used.

In summary, using the particular implementation illustrated in FIG. 13 and described above, access rights may be granted either to the metabase or to information objects. Access control information in the metabase may be used to control administration of the metabase. For example, an administrator may grant limited rights to administer a portion of the metabase, and by extension the information server, to specific individuals. In the alternative, specific portions of the metabase may be restricted so that only designated individuals may administer them. Any other combination may also be created by storing appropriate access control information in the metabase.

One advantage of the present invention over the prior art is the ability to minimize the amount of information that must be stored to administer an information server. One mechanism used to minimize the amount of information is the inheritance mechanism previously discussed. This mechanism allows redundant information to be eliminated. The invention may also use other mechanisms to minimize the amount of information that must be stored.

Figure 14:
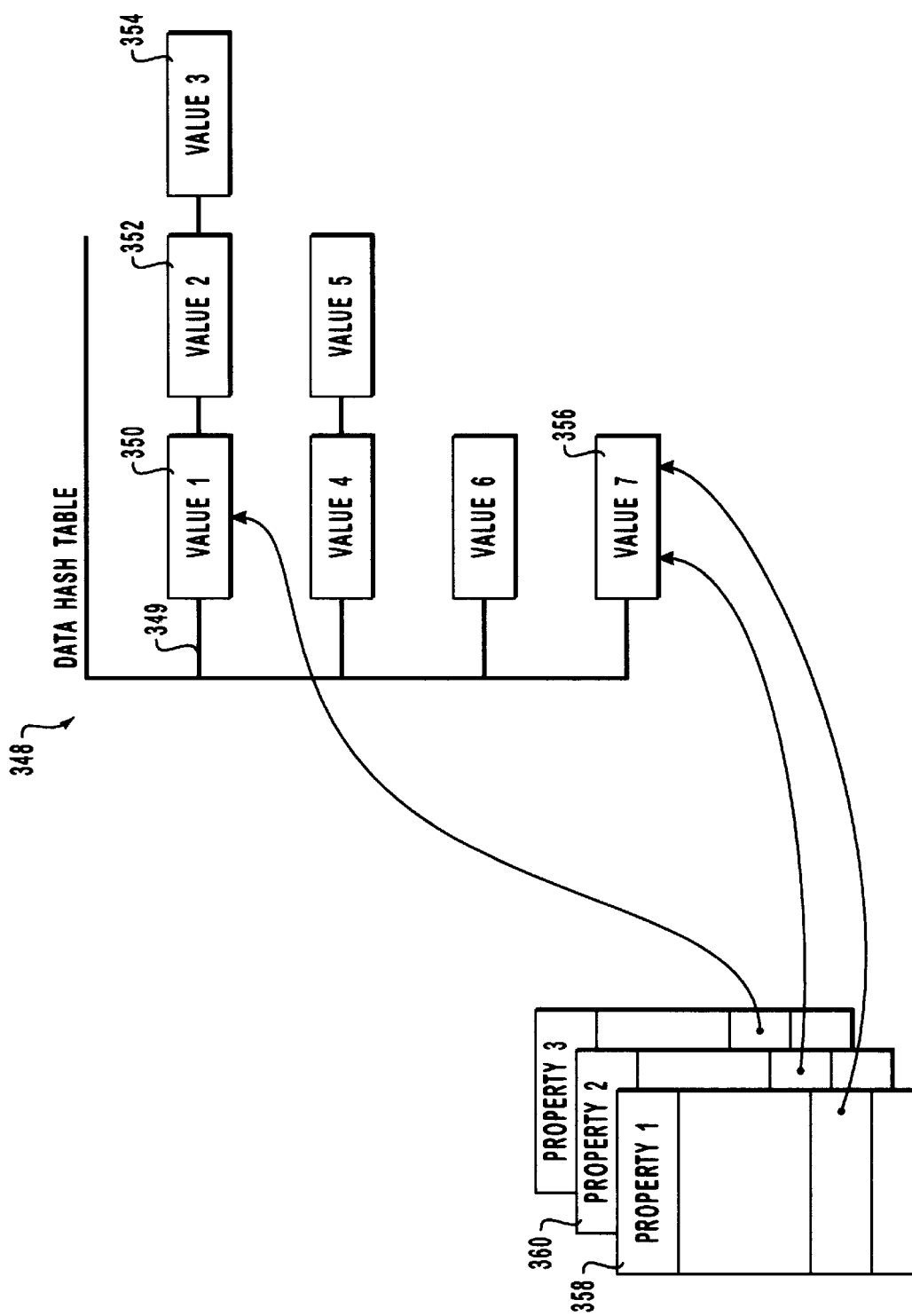
FIG. 14 illustrates one mechanism for reducing the amount of information stored in memory.

In many implementations, the metabase will be stored on non-volatile storage and, when the information server is initialized, be read from non-volatile storage into memory. It is desirable to maintain the metabase in memory to speed access to the information contained therein. As the amount of information administered by the information server increases, the size of the metabase also increases. Thus it may be important to utilize various mechanisms to reduce the overall amount of memory consumed by the metabase. Another mechanism, in addition to the inheritance mechanism previously discussed, for reducing the amount of memory consumed by the metabase is illustrated in FIG. 14.

When the metabase is read into memory, a data hash table may be created. A data hash table is simply a look-up table that is indexed by a particular key. In FIG. 14, an example data hash table is illustrated as 348. At each of the index locations, various values may be stored. For example, in FIG. 14 at index location 349 values 350, 352 and 354 are illustrated. The data hash table may be constructed as properties are read into memory. Essentially, the concept is to take the information from the property and store it in an appropriate location in the hash table. The information from the property is then replaced with a pointer or handle to the value. The value may be retrieved when desired through the pointer or handle. By storing a value a single time and replacing the value with a pointer, a net reduction in overall storage may be achieved. This is because the value need only be stored once. As indicated in FIG. 14, value 356 is common to both property 358 and 360.

Other mechanisms to reduce the overall size of the metabase may be used. Many schemes used to reduce the amount of memory a particular quantity of information takes up trade access speed for memory size. In other words, they are able to reduce the amount of memory that a given quantity of information takes up but may increase the access time somewhat. Any scheme used in the present invention to reduce the amount of memory that a particular metabase utilizes must be balanced with the need and desirability for rapid access to the information in the metabase.

As previously explained, in some implementations it is desirable to implement programmatic access to the metabase. Such an approach allows several features to be implemented and, for that reason, is sometimes preferred. Such a programmatic interface is, however, not required by the present invention. The hierarchical structure of the metabase may be implemented and accessed without a programmatic interface. If a programmatic interface is selected, however, then consideration should be given as to how the programmatic interface should be implemented. Such an interface may be implemented using a wide variety of mechanisms. For example, such a programmatic interface may be implemented in a linkable library in a separate executable software object, or in any other mechanism.

In one embodiment, a programmatic interface is implemented using Microsoft's component object model (COM) technology. Microsoft's COM technology is well know in the industry and well documented from a wide variety of sources. Essentially, COM provides a mechanism whereby a software object can expose an "interface" that defines a series of functions through which the functionality implemented by the object may be accessed. Any other software entity having a handle to the interface may then utilize any or all of the functions on the interface and access the functionality of the object. Implementing the programmatic interface in this fashion has many benefits. It allows the programmatic interface to be accessed by any number or type of software objects. It also allows the interface to be accessed across platforms or networks to allow for full remote administration and access.

Figure 15:
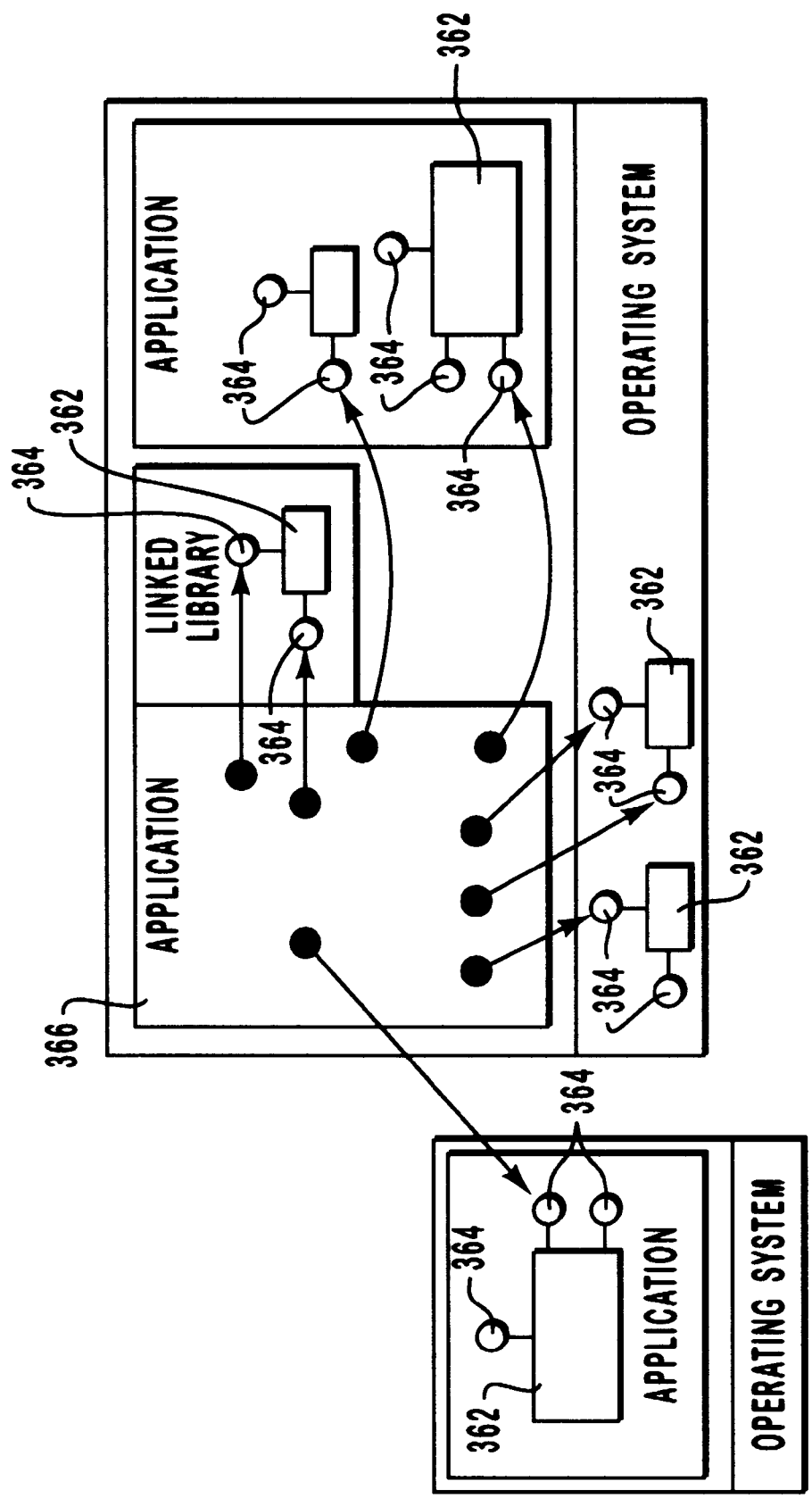
FIG. 15 illustrates the general component object model (COM) technology from Microsoft.

Turning to FIG. 15, a simplified diagram of the concept behind COM technology is presented. FIG. 15 shows a variety of COM objects 362 located in a variety of software objects. This emphasizes the fact that COM objects may be implemented in a variety of ways and in a variety of contexts. The COM objects have interfaces 364 which allows the functionality of the object to be accessed. In the illustration in FIG. 15 application 366 has handles to various interfaces in the COM objects and thus can access the functionality of the COM objects through those interfaces. Note that although application 366 is illustrated as accessing the functionality of the various COM objects, any software component with a handle to an interface may access the functionality thereof. COM defines well-known procedures for software entities to discover and obtain handles to interfaces of COM objects. These mechanisms are well known and well documented in the art. An example reference providing an overview of COM technology is *Understanding ActiveX and OLE,* by David Chappell, published by Microsoft Press and incorporated herein by reference.

As previously mentioned, a metabase may be replicated or duplicated at various locations and the copies of the metabase may be synchronized. Mechanisms to replicate and synchronize information exist and are known in the art. Any such mechanisms may be implemented as part of the present invention to facilitate the synchronization of various copies of a metabase. Thus, such mechanisms as keeping a change list or tracking log of the changes that have been made to a metabase and sending notification of changes that are made to other copies of the metabase may be used to facilitate the synchronization of two copies of a metabase.

Mechanisms may also be employed to identify whether two copies of a metabase are identical. Such a mechanism may include calculating signatures or other digest type information on the metabase and comparing it with a similar signature or digest calculated from the other copy of the metabase. Alternatively keeping track of change numbers and other such information may help determine whether two copies of a metabase contain identical information. As another option, a comparison can be made on the key hierarchy and property information stored therein to determine whether they are the same.

After a determination has been made as to whether two copies of a metabase are the same or not, then steps may be taken to reconcile their differences. Any type of mechanism may be used for this step. All that is required is that when the step is completed the two copies of the metabase have been reconciled and contain the most recent version of the data. As has been discovered in other contexts, such a procedure may not be as simple as it first appears. Mechanisms developed to perform this function range from a simplistic comparison of time stamp or other information to a complicated tracking of change histories in order to ensure that no conflicts exist in the data. Any such mechanisms may be used, although some may be more suited to particular implementations of the present inventions than others.

One approach would be to require that all changes made to a metabase be made in a particular copy of the metabase. These changes may then be propagated to other copies of the metabase through various mechanisms. A metabase allows simultaneous access, remote administration, and event notification if various of the features described in this patent are implemented. With these features, requiring all changes to be made to a particular copy of the metabase may not be a limitation. When all changes are made to a particular copy of the metabase, then synchronization becomes a simple matter of replacing older information with more current information.

Example Programmatic Interface

In order to more fully document one possible implementation of a programmatic interface to a metabase, the following is intended to present an example implementation. The implementation presented below is given by way of example, and not limitation. In the following example implementation, IIS refers to a particular software component that implements an information server containing much of the functionality described herein. The interface is documented according to a style typically employed by Microsoft and well known in the art. The interface document is followed by header files typically employed in a C or C++ program that define data types, structures, and function prototypes of the example programmatic interface.

Admin Base Object

The Admin Base Object is a fully-distributable component object model (COM) object that implements the IMSAdminBase interface, with methods that enable an application to manipulate configuration keys and data in the memory-resident metabase. Using the Admin Base Object, a C++ application can administer the configuration of IIS and can also use the metabase to store custom application data.

The Admin Objects provide most of the same functionality as the Admin Base Object for Java, Microsoft Visual Basic, or Active Server Pages (ASP)-based applications. ASP is a technology developed by Microsoft and information regarding the technology is available from Microsoft and a variety of sources. In addition, the Admin Objects are a provider for Active Directory Services, with supplemental IIS-specific functionality.

This section contains:

About the Admin Base Object explains how this object manages IIS configuration by manipulating data in the metabase, and discusses how to use keys, data entries, handles, inheritance, identifiers, and user types in a program.

Using the Admin Base Object explains setting, retrieving, and enumerating metabase data, registering an event sink, and backing up and restoring the metabase.

Admin Base Object Reference provides details of the interface structures, methods, and errors.

About the Admin Base Object

You can use the Admin Base Object to write applications, such as server administration or Web authoring tools, which check and update the server's configuration by manipulating keys and data in the metabase. You can also use the Admin Base Object to store your IIS-related custom application configuration data in the fast-access metabase without filling up the system registry.

This section contains:

Keys and Data Entries describes how data is organized into hierarchical keys.

Handles to Keys discusses the use of handles to access keys.

Inheritance details a feature that minimizes data storage and increases the efficiency of your programs.

Reserved Identifiers and User Types explains how data is identified and categorized.

Keys and Data Entries

You can use the Admin Base Object to control the configuration of your IIS installation. IIS configuration data is stored in the metabase in a hierarchical structure that parallels the organization of the elements of your IIS installation. Configuration data is stored in keys that are associated with IIS elements, and the keys are organized in a path structure similar to the Windows NT® registry, or a directory and file system. Keys are identified by their path within the metabase. For example, the path /LM specifies the local machine key, and the path/LM/W3SVC/3 specifies the key for the third web server.

Each key name cannot be longer than the METADATA_MAX_NAME_LEN constant. This applies to each node name separately, not the entire path. In the preceding example, the names LM and W3SVC must each be less than METADATA_MAX_NAME_LEN, but their combined path (/LM/W3SVC) can be longer.

Data entries may be assigned to each key, and each data entry has a unique identifier in the metabase. For example, MD_SERVER_STATE is an identifier for data that specifies the server state, and, when located at the key having the path /LM/MSFTPSVC/1, specifies data that describes the server state of the first virtual FTP server on the local machine.

For each FTP or Web server, the root virtual directory is given the special name ROOT. For example, the path /LM/MSFTPSVC/1/ROOT/Scripts/Script1.asp refers to the key associated with an ASP page in the virtual directory Scripts under the first virtual FTP server on the local machine.

Handles to Keys

The Admin Base Object uses handles to refer to keys in the metabase. When the metabase is initialized at startup, a handle (METADATA_MASTER_ROOT_HANDLE) is automatically opened with read-only permissions. You can use the OpenKey method to get a handle to a key in the metabase by providing the key's path relative to this handle, such as /LM/W3SVC/2, the path to the key for the second Web server. You can also use a handle to any key as a reference point to subordinate keys. For example, if you have opened a handle to /LM/W3SVC/2 as mentioned above, you can then use this handle and the relative path, /ROOT/VDir1, with the OpenKey method to get a handle to the key /LM/W3SVC/2/ROOT/VDir1.

The master handle, METADATA_MASTER_ROOT_HANDLE, does not protect metabase data from multiple-thread access, so data retrieved using this handle may change unexpectedly in the metabase. However, a handle that you open with the OpenKey method locks the metabase data for the key, all of its ancestor keys, and all of its subordinate keys. This insures consistency of metabase data by preventing other threads from changing data in a path containing a key for which you have an open handle.

A handle opened with read-only permission to a key permits other clients to open read-only handles to that key and other keys in its path, both superior and subordinate to it. No client can open a handle with write permission to a key until all handles, read or write, have been closed by all clients to all keys in the path. In addition, once one client has opened a handle with write permission to a key, no other client can open a handle for either reading or writing to that key or to any key above it in its path, or subordinate to it. Because server performance can significantly be reduced while waiting for keys to be available for read-only handles, it is recommended that you call the CloseKey method as soon as you have finished writing data. This frees the handle and releases the key and all keys above and below it to other processes and clients.

Inheritance

You can specify data in the metabase to be inheritable. This means that if you add a data entry to a key and specify it as inheritable, all of the keys subordinate to that key can access that data. This is much more efficient than setting the same data for each key in the metabase. For example, if you add the inheritable data MD_MYDATA for the key /LM, the subkeys /LM/W3SVC and /LM/MSFTPSVC, and others below them can also return MD_MYDATA. Inheritance stops at a subordinate key where the same metabase identifier is set. Inheritance can not skip keys—keys inherit data from the nearest superior key where the identifier is set.

You can specify that an entry is inheritable by setting the METADATA_INHERIT flag in the dwMDAttributes member of the METADATA_RECORD structure that is passed to the SetData method.

When retrieving data, you can specify that inherited data be returned by setting the METADATA_INHERIT flag in the dwMDAttributes member of the METADATA_RECORD structure that is passed to the GetData or EnumData method. For the GetAllData method, you specify this flag in the dwMDAttributes parameter. If this flag is not set, inherited data is not returned.

You can use the METADATA_PARTIAL_PATH flag to specify that inherited data be returned, even if a requested path does not exist. If you add the same inheritable data at the key /LM as in the preceding example, the subkey /LM/MYSVC would return the inheritable data, MD_MYDATA, regardless of whether the key /LM/MYSVC exists in the metabase. The METADATA_PARTIAL_PATH flag only applies if the METADATA_INHERIT flag is also set.

You can use the METADATA_PARTIAL_PATH flag to minimize the number of keys you create in the metabase. For example, when files in a directory have no metabase data of their own, you can specify data as inheritable at the directory key and use the METADATA_PARTIAL_PATH flag to return inherited data for individual files without having to create keys for them.

You can use the METADATA_ISINHERITED flag to determine if retrieved data is local or inherited. If specified on a call to any method that retrieves data, the method will return this flag for those data elements for which the returned data is inherited.

Reserved Identifiers and User Types

Each data entry in the metabase is assigned a unique identifier. An identifier is a DWORD containing a number that uniquely identifies the data in the metabase. Identifiers used by IIS are assigned from a pool of reserved numbers. The first 32K is reserved by the system for IIS data and the second 32K is reserved for Microsoft® FrontPage™ data. If you create identifiers in the metabase, use identifier numbers greater than 65535 (0x0000ffff) to avoid conflicts with current or future system data.

Each identifier is also assigned a user type, which is a DWORD that specifies how the data is used. Current IIS user types include IIS_MD_UT_SERVER for server configuration parameters, IIS_MD_UT_FILE for file and directory properties, IIS_MD_UT_WAM for web application management, and ASP_MD_UT_APP for ASP application configuration. User types enable you to classify your identifiers by application. You must assign a user type to each identifier you create in the metabase, although each identifier is not required to have a unique user type. The numbers from 0 to 2,000 are reserved for current and future system user types. User types you create must be above 2,000 to avoid conflicts with current and future system user types.

You can use the user type to filter data requested from a key. For example, the GetAllData method has a parameter, dwUserType, you can use to specify that only data of a certain user type is to be returned. For example, if this parameter is set to IIS_MD_UT_SERVER during the method call, only data related to the server will be returned. Note: Metabase identifiers must be unique, but multiple identifiers can have the same user type and data type.

Using the Admin Base Object

When IIS starts, it loads the metabase into memory, where it is available until IIS shuts down. The Admin Base Object enables you to manage data in the metabase through the structures and methods of the IMSAdminBase interface.

You use handles to access keys in the metabase as described in *Handles to Keys*. The METADATA_MASTER_ROOT_HANDLE is provided by IIS and connects to the root key of the metabase. You use this handle with the OpenKey method to open handles to specific keys, and to specify read or write permissions you need for the key. You can also use an existing open handle from an OpenKey call to open additional handles to other keys.

Once you have a handle to a key, you can use the Admin Base Object methods to manipulate that key's data entries. You can also access subkeys of the currently open key by specifying additional path information.

With a valid handle, you can use the GetData method to retrieve a data entry, or the SetData method to add an entry to the metabase. The GetAllData method enables your application to retrieve all or a subset of the values associated with a key with a single method call. The EnumData method enables your application to enumerate all or a subset of the values associated with a key. When a data entry is no longer needed, you can remove it from the metabase by calling the DeleteData method.

In addition to manipulating data entries, you can add, delete, or move keys from one path to another in the metabase. Use the AddKey method to add keys and the DeleteKey method to delete keys in the metabase. Use the CopyKey method to copy or move a key and all of its subkeys and data items.

Your program can also incorporate event sinks for notification when metabase data is changed by other processes, and when IIS shuts down.

This section contains:
Setting and Retrieving Data
Enumerating Keys and Data
Registering an Event Sink Setting and Retrieving Data You can set data in the metabase by calling the SetData method. This method takes as one of its parameters a METADATA_RECORD structure. This structure contains information about the data, such as its identifier, attributes, user type, data type, a pointer to the data, and so on. By setting values for the members of the METADATA_RECORD structure when it is passed as an input parameter to the SetData method, you can specify the data's type and storage method. For example, you can specify that the data be stored in a secure manner by setting the METADATA_SECURE flag in the structure's dwMDAttributes member.

In addition to specifying the data to be retrieved, the METADATA_RECORD structure is also used to receive data from the metabase. When you call the GetData or EnumData methods, you pass in a pointer to a METADATA_RECORD structure to specify the data to be retrieved, and to receive the data. Your program must allocate the buffer into which the data will be retrieved, and pass a pointer to it in the pbMDData member of the METADATA_RECORD structure.

The GetAllData method retrieves multiple data entries from a key. In this case, you use parameters of the GetAllData method to specify the data to be retrieved, and provide a buffer where the method returns an array of METADATA_GETALL_RECORD structures.

Enumerating Keys and Data

You can use the EnumKeys method to enumerate the subkeys of a key. The name of one subkey is returned per each enumeration call. ERROR_NO_MORE_ITEMS is returned after the last subkey has been enumerated. To get a total count of the subkeys associated with a key, you can increment the index parameter of the method. See *Enumerating Subkeys* for details and example code that enumerates keys.

Similarly, you can use the EnumData method to enumerate the data elements of a key. One data item is enumerated per call, but unlike enumerating keys, the EnumData method returns the data as well as the data identifier. ERROR_NO_MORE_ITEMS is returned after the last data item has been enumerated. To get a total count of the data items associated with a key, you must increment the index parameter of the method. See *Enumerating Data Items* for details and example code that enumerates data items.

Enumerating Subkeys

The following example uses the EnumKeys method to enumerate the number of virtual Web servers defined on the local machine. This example also uses the Active Template Library to demonstrate smart pointers. Smart pointers perform the normal COM QueryInterface, AddRef and Release calls automatically.

```
#define UNICODE
#define INITGUID
#include "iadmw.h"        // COM Interface header
#include "iiscnfg.b"      // MD_ & IIS_MD_ #defines
#include "atlBase.h"      // ATL support
HRESULT hRes = 0;
DWORD indx = 0;
METADATA_HANDLE MyHandle;
WCHAR SubKeyMame[METADATA_MAX_NAME_LEN];
CComPtr <IMSAdminBase> pIMeta;
hRes = CoCreateInstance(CLSID_MSAdminBase, NULL, CLSCTX_ALL,
IID_IMSAdminBase, (void **) &pIMeta);
if (FAILED)hRes))
    return;
//get a handle to the local machine
hRes    =     pIMeta->OpenKey(METADATA_MASTER_ROOT_HANDLE, TEXT("/LM"),
METADATA_PERMISSION_READ, 20, &MyHandle);
//loop until there are no more subkeys
while (SUCCEEDED)hRes)) {
    //enumerate the subkeys of the World Wide Web service
    hRes = pIMeta->EnumKeys(MyHandle, TEXT("/W3SVC"), SubKeyName, indx);
    if (SUCCEEDED)hRes)) {
        //store the virtual server names in an array for future use
        //Note: declare a suitable array of names and add
        // array bound checking
        wcscpy (names [indx], SubKeyName);
    }
    //increment the index
    indx++;
}
//release the handle
pIMeta->CloseKey(MyHandle);
```

Enumerating Data Items

The EnumData method returns the entire data entry, so you must pass in a METADATA_RECORD structure to receive the data. The values that are set for the METADATA_RECORD members when that structure is passed into the EnumData method specify which data items are to be enumerated.

The following example enumerates all of the server-related data entries of the first virtual Web server, including any inherited data. This is an example only, and does not include all appropriate error handling.

```
#define UNICODE
#define INITGUID
#include "iadmw.h"      // COM Interface header
#include "iiscnfg.h"    // MD_ & IIS_MD_ #defines
#include "atiBase.h"    // ATL support
HRESULT hRes = 0;
DWORD indx = 0;
METADATA_HANDLE MyHandle;
METADATA_RECORD MyRecord;
DWORD dwBufLen = ORIGINAL_BUFFER_SIZE;
DWORD dwReqBufLen = 0;
PBYTE pbBuffer = new BYTE[dwBufLen];
CComPtr <IMSAdminBase> pIMeta;
hRes = CoCreateInstance(CLSID_MSAdminBase, NULL, CLSCTX_ALL,
IID_IMSAdminBase, (void **) &pIMeta);
if (FAILED(hRes))
    return;
//get a handle to the Web service
hRes    =     pIMeta->OpenKey(METADATA_MASTER_ROOT_HANDLE,  TEXT("/LM/W3SVC"),
METADATA_PERMISSION_READ, 20, &MyHandle);
if (SUCCEEDED(hRes)) {
//loop until there are no more data items
while (SUCCEEDED(hRes)) {
    //initialize the input structure,
    //the values specify what kind of data to enumerate
    MyRecord.dwMDAttributes = METADATA_INHERIT;
    MyRecord.dwMDUserType = IIS_MD_UT_SERVER;
    NyRecord.dwMDDataType = ALL_METADATA;
    MyRecord.dwMDDataLen = dwBufLen;
    MyRecord.pbMDData = pbBuffer;
    //enumerate the data of the first virtual Web server
    //checking to ensure that the data returned does not
    //overflow the buffer
    hRes = pIMeta->EnumData(MyHandle, TEXT("/1"), &MyRecord, indx, &dwReqBufLen);
    if (hRes == RETURNCODETOHRESULT(ERROR_INSUFFICIENT_BUFFER)) {
        delete [ ] (pbBuffer);
        pbBuffer = new BYTE[dwReqBufLen];
        dwBufLen = dwReqBufLen;
        MyRecord->dwMDDataLen = dwReqBufLen;
        MyRecord->pbMDData = pbBuffer;
        hRes = pIMeta->EnumData(MyHandle, TEXT("/1"), &MyRecord, indx, &dwReqBufLen);
    }
    if (SUCCEEDED(hRes)) {
        //store the data identifiers in an array for future use
        //Note: declare a suitable DWORD array for names and add
        // array bound checking
        data[indx] = MyRecord->dwMDIdentifier;
        // Additional code needed to store other data fields.
    }
    //increment the index
    indx++;
} // end while
//release the handle and buffer
pIMeta->CloseKey(MyHandle);
} // end if pIMeta->OpenKey Succeeded
delete pbBuffer;
```

Registering an Event Sink

You may design your application to be notified when certain events occur. To receive event notifications, your application must implement a COM sink of a class descended from the IMSAdminBaseSink interface. You may implement a sink for the following events.

The metabase shuts down.

A key or its associated data changes.

Shutdown Notify Sink

This sink method will be called when IISADMIN stops. The metabase will be open during this call, however there is no guarantee that handles will not be open that prevent you from reading from or writing to portions of the metabase. In addition, your sink must not release its interface during this call. The recommended implementation is, when notified, set a flag and return, then release the interface. The metabase will wait for five seconds or until all interfaces have been released before actually shutting down.

Your callback method must implement the following prototype as a minimum:

```
HRESULT STDMETHODCALLTYPE ShutdownNotify( void)
{
return HRESULT_FROM_WIN32 (ERROR_NOT_SUPPORTED);
}
```

Change Notify Sink

If your application needs to be notified whenever a key or its associated data changes, it must implement the SinkNotify method. This method will receive a notification whenever one of the following events occurs.

A key that has been changed is closed by the CloseKey method.

Permissions on a handle to a key are changed from write or read/write to read-only by the ChangePermissions method.

The SinkNotify method is not called if the handle is closed by the instance of the IMSMetadata interface that registered the sink. In other words, a client only receives notifications of changes made by other clients.

Note

Do not open any write handles within your SinkNotify processing or recursive notifications between clients may cause a system lockup. You may open read handles to the metabase within your SinkNotify method.

Your callback method must implement the following prototype as a minimum:

```
HRESULT SinkNotify(
DWORD dwMDNumElements
MD_CHANGE_OBJECT pcoChangeList[ ]
);
```

The parameter dwMDNumElements receives the number of elements that have changed. The maximum number of change entries that are sent on a single call to the callback method is specified by the constant MD_MAX_CHANGE_ENTRIES. If more notifications are required, the method is called multiple times.

Remarks

IIS does not make secure calls to remote machines. If your program implements a sink and is executing on a machine other than the machine on which IIS is running, you must remove security by calling the COM CoInitializeSecurity function with the dwImpLevel parameter set to RPC_C_AUTHN_LEVEL_NONE, as shown in this example:

```
hRes = CoInitializeSecurity(NULL,
    -1,
    NULL,
    NULL,
    RPC_C_AUTHN_LEVEL_NONE,
    0,
    NULL,
    EOAC_NONE,
    0)
```

For more information on this function, see the Reference topic in COM and ActiveX Object Services in the Platform SDK, which is also available in the MSDN Library.

Admin Base Object Reference

The following topics specify the structures, methods, and errors of the Admin Base Object:
  IMSAdminBase Structures
  IMSAdminBase Methods
  IMSAdminBase Errors IMSAdminBase Structures The following structures are used by the Admin Base Object methods.

| | |
|---|---|
| MD_CHANGE_OBJECT | Stores information about changes made to a key in the metabase. |
| METADATA_GETALL_RECORD | Member of an array that receives multiple metabase entries. |
| METADATA_HANDLE_INFO | Stores information about a handle to the metabase. |
| METADATA_RECORD | Specifies or receives a single metabase data entry. |

MD_CHANGE_OBJECT

The MD_CHANGE_OBJECT structure receives information about the changes made to a key in the metabase. It is used in the SinkNotify method of a change notify sink.

```
#define MD_CHANGE_OBJECT    MD_CHANGE_OBJECT_W
#define PMD_CHANGE_OBJECT   PMD_CHANGE_OBJECT_W
typedef struct   _MD_CHANGE_OBJECT_W
{
/* [string] */ LPWSTR pszMDPath;
DWORD dwMDChangeType;
DWORD dwMDNumDataIDs;
/* [size_is] [unique] */ DWORD __RPC_FAR *pdwMDDataIDs;
} MD_CHANGE_OBJECT_W;
typedef struct _MD_CHANCE_OBJECT_W __RPC_FAR *PMD_CHANGE_OBJECT_W;
```

Members
  pszMDPath
  The path to the modified key.
  dwMDChangeType
  A DWORD that lists the type of changes made. This member can contain one or more of the following flags:

| Flag | Description |
|---|---|
| MD_CHANGE_TYPE_ADD_OBJECT | The key was added to the metabase. |
| MD_CHANGE_TYPE_DELETE_DATA | A data entry was deleted from the key. |
| MD_CHANGE_TYPE_DELETE_OBJECT | The key was deleted from the metabase. |
| MD_CHANGE_TYPE_RENAME_OBJECT | The key was renamed. |
| MD_CHANGE_TYPE_SET_DATA | A data entry was added to or set for the key. | dwMDNumDataIDs
  The number of data entries that were changed.
  pdwMDDataIDs
  A pointer to an array containing the identifiers of the data entries that were changed. The array is dwMDNumDataIDs in length.
METADATA_RECORD
  The METADATA_RECORD structure contains information about a metabase entry. It is used as an input parameter by the SetData method and as an input/output parameter by methods that retrieve data from the metabase, such as GetData, EnumData, or GetAllData.

```
typedef struct _METADATA_RECORD {
    DWORD dwMDIdentifier;
    DWORD dwMDAttributes;
    DWORD dwMDUserType;
    DWORD dwMDDataType;
    DWORD dwMDDataLen;
    unsigned char *pbMDData;
    DWORD dwMDDataTag;
} METADATA_RECORD;
```

Members
dwMDIdentifier
A DWORD that uniquely identifies the metabase entry, for example, MD_SERVER_STATE.
dwMDAttributes
Flags that specify how to set or get data from the metabase. This member can be set to one or more of the following values:

| Flag | Description |
| --- | --- |
| METADATA_INHERIT | Set: The data can be inherited.<br>Get: Return inheritable data. |
| METADATA_INSERT_PATH | For a string data item:<br>Set: Indicates the string contains MD_INSERT_PATH_STRINGW.<br>Get: Replace MD_INSERT_PATH_STRINGW with the path of the data item relative to the handle |
| METADATA_ISINHERITED | Set: Not valid.<br>Get: Mark data items that were inherited. |
| METADATA_NO_ATTRIBUTES | Set: The data does not have any attributes.<br>Get: Not applicable. Data is returned regardless of this flag setting. |
| METADATA_PARTIAL_PATH | Set: Not valid.<br>Get: Return ERROR_SUCCESS and any inherited data even if the entire path is not present. This flag is only valid if METADATA_INHERIT is also set. |
| METADATA_REFERENCE | Set: The data was retrieved by reference.<br>Get: Not valid |
| METADATA_SECURE | Set: Store and transport the data in a secure fashion.<br>Get: Not valid. |
| METADATA_VOLATILE | Set: Do not save the data in long term storage.<br>Get: Not valid. | dwMDUserType

A DWORD that specifies the user type of the data. When you use the SetData method to create a new data item, specify a user type above 2,000. User types 2,000 and below are reserved. When retrieving or updating data, this specifies the user type assigned to the data item.

IIS currently uses these user types:

| User type | Description |
| --- | --- |
| ASP_MD_UT_APP | The entry contains information specific to ASP application configuration. |
| IIS_MD_UT_FILE | The entry contains information about a file, such as access permissions or log on methods. |
| IIS_MD_UT_SERVER | The entry contains information specific to the server, such as ports in use and IP addresses. |
| IIS_MD_UT_WAM | The entry contains information specific to web application management. | dwMDDataType
Identifies the type of data in the metabase entry. This parameter can be one of the following values:

| Data type | Description |
| --- | --- |
| ALL_METADATA | Set: Not valid<br>Get: Return data regardless of type. |
| BINARY_METADATA | Binary data in any form. |
| DWORD_METADATA | An unsigned 32-bit number. |
| EXPANDSZ_METADATA | A null-terminated string that contains unexpanded environment variables, such as %PATH%. The environment variables are not expanded by the Admin Base Object. |
| MULTISZ_METADATA | An array of null-terminated strings, terminated by two null characters. |
| STRING_METADATA | A null-terminated string. | dwMDDataLen
A DWORD that specifies the length of the data in bytes. If the data is a string, this value includes the ending null character. For multisz data, this includes an additional null character after the final string. For example, the length of a multisz string containing two strings would be (wcslen(stringA)+1)*sizeof(WCHAR)+(wcslen(stringB)+1)*sizeof(WCHAR)+1*sizeof(WCHAR)

In-process clients need to specify dwMDDataLen only when setting binary and multisz values in the metabase. Remote applications must specify dwMDDataLen for all data types.

pbMDData

When setting a value in the metabase, points to a buffer that contains the data. When retrieving data from the metabase, points to a buffer to receive the data.

dwMDDataTag

Reserved.

METADATA_GETALL_RECORD

The METADATA_GETALL_RECORD structure is analogous to the METADATA_RECORD structure, but is only used to return data from a call to the GetAllData method. Data retrieval specifications are provided in GetAllData method parameters, not in this structure (as is the case with METADATA_RECORD). The GetAllData method returns the data from multiple entries as an array of METADATA_GETALL_RECORD structures.

```
typedef struct   _METADATA_GETALL_RECORD {
    DWORD dwMDIdentifier;
    DWORD dwMDAttributes;
    DWORD dwMDUserType;
    DWORD dwMDDataType;
    DWORD dwMDDataLen;
    union
    {
        DWORD dwMDDataOffset;
        unsigned char *pbMDData;
    };
    DWORD dwMDDataTag;
} METADATA_GETALL_RECORD;
```

Members dwMDIdentifier

A DWORD that identifies the metabase entry. For example, MD_SERVER_STATE.

dwMDAttributes

A set of flags that receives the attributes of the data entry. This member can receive one or more of the following values:

| Flag | Description |
| --- | --- |
| METADATA_INHERIT | Return inherited data |
| METADATA_INSERT_PATH | Indicates the string contains MD_INSERT_PATH_STRINGW. |
| METADATA_ISINHERITED | Returned data is inherited. |
| METADATA_NO_ATTRIBUTES | No attributes set. |
| METADATA_PARTIAL_PATH | Inherited data returned even if the entire path is not present. This flag is only valid if METADATA_INHERIT is also set. |
| METADATA_REFERENCE | The data was retrieved by reference. |
| METADATA_SECURE | Not Valid. |
| METADATA_VOLATILE | Not Valid. | dwMDUserType

A DWORD that specifies the type of user of the data. IIS currently defines the following two types of users:

| User type | Description |
| --- | --- |
| ASP_MD_UT_APP | The entry contains information specific to ASP application configuration. |
| IIS_MD_UT_FILE | The entry contains information about a file, such as access permissions, or log on methods. |
| IIS_MD_UT_SERVER | The entry contains information specific to the server, such as ports in use and IP addresses. |
| IIS_MD_UT_WAM | The entry contains information specific to Web application management. | dwMDDataType

Specifies the type of data in the metabase entry. This member can be one of the following values:

| Data type | Description |
| --- | --- |
| ALL_METADATA | All data returns, regardless of type. Not valid when setting values. |
| BINARY_METADATA | Binary data in any form. |
| DWORD_METADATA | An unsigned 32-bit number. |
| EXPANDSZ_METADATA | A null-terminated unicode string that contains unexpanded environment variables, such as %PATH%. |
| MULTISZ_METADATA | An array of null-terminated strings, terminated by two null characters. |
| STRING_METADATA | A null-terminated unicode string | dwMDDataLen

A DWORD that receives the length of the data in bytes. If the data is a string, this value includes the ending null character. For multisz data, this includes an additional null character after the final string. For example, the length of a multisz string containing two strings would be (wcslen(stringA)+1)*sizeof(WCHAR)+(wcslen(stringB)+1)*sizeof(WCHAR)+1*sizeof(WCHAR)

dwMDDataOffset

If the data was returned by value, contains the byte offset of the data in the buffer specified by the parameter pbMDBuffer of the IMSAdminBase::GetAllData method. All out-of-process executions will return data by value. The array of records, excluding the data, is returned in the first part of the buffer. The data associated with the records is returned in the buffer after the array of records, and dwMDDataOffset is the offset to the beginning of the data associated with each record in the array.

pbMDData

Reserved. Do not use.

dwMDDataTag

Reserved. Do not use.

See Also

METADATA_RECORD

METADATA_HANDLE_INFO

The METADATA_HANDLE_INFO structure contains information about a handle to a metabase entry.

```
typedef struct _METADATA_HANDLE_INFO {
    DWORD dwMDPermissions;
    DWORD dwMDSystemChangeNumber;
} METADATA_HANDLE_INFO;
```

| Value | Description |
|---|---|
| METADATA_PERMISSION_READ | The handle can read keys and data. |
| METADATA_PERMISSION_WRITE | The handle can write keys and data. | dwMDSystemChangeNumber

Specifies the system change number when the handle was opened. This is a number that tracks how many changes were made to data since the metabase was created. This value is saved to disk between metabase sessions.

IMSAdminBase Methods

The IMSAdminBase COM interface of the Admin Base Object exposes the following methods:

| Method | Description |
|---|---|
| IMSAdminBase::AddKey | Adds a key to the metabase. |
| IMSAdminBase::Backup | Backs up the metabase to a backup file. |
| IMSAdminBase::ChangePermissions | Changes read/write permissions on a handle to a key. |
| IMSAdminBase::CloseKey | Closes a key. |
| IMSAdminBase::CopyData | Copies or moves data between keys. |
| IMSAdminBase::CopyKey | Copies or moves a key in the metabase. |
| IMSAdminBase::DeleteAllData | Deletes all or a subset of the data associated with a key. |
| IMSAdminBase::DeleteBackup | Deletes a metabase backup from a backup file. |
| IMSAdminBase::DeleteChildKeys | Deletes all subkeys of a key. |
| IMSAdminBase::DeleteData | Deletes a data entry. |
| IMSAdminBase::DeleteKey | Deletes a key from the metabase. |
| IMSAdminBase::EnumBackups | Enumerates the metabase backups in a backup file. |
| IMSAdminBase::EnumData | Enumerates the data associated with a key, one entry per call. |
| IMSAdminBase::EnumKeys | Enumerates the subkeys of a key, one subkey per call. |
| IMSAdminBase::GetAllData | Retrieves all or a subset of the data associated with a key. |
| IMSAdminBase::GetData | Retrieves a data entry. |
| IMSAdminBase::GetDataPaths | Retrieves all paths of a subtree where a specified identifier exists. |
| IMSAdminBase::GetDataSetNumber | Retrieves the data set number associated with a key. |
| IMSAdminBase::GetHandleInfo | Retrieves information about a handle. |
| IMSAdminBase::GetLastChangeTime | Retrieves the last change time for a key. |
| IMSAdminBase::GetSystemChangeNumber | Retrieves the system change number. |
| IMSAdminBase::OpenKey | Opens a key. |
| IMSAdminBase::RenameKey | Renames an existing key. |
| IMSAdminBase::Restore | Restores the metabase from a backup file. |
| IMSAdminBase::SaveData | Saves metabase changes to disk. |
| IMSAdminBase::SetData | Sets a data entry. |
| IMSAdminBase::SetLastChangeTime | Sets the last change time for a key. |

Members dwMDPermissions

Specifies the permissions with which the handle was opened. This member can have one or more of the following flags set:

IMSAdminBase::AddKey

The IMSAdminBase::AddKey method creates a key and adds it to the metabase as a subkey of the key at the specified path.

```
HRESULT AddKey(
    METADATA_HANDLE    hMDHandle,    //  metabase handle
    LPCWSTR            pszMDPath     //  path to the key,
                                     //  relative to hMDHandle
);
```

Parameters hMDHandle

Specifies a handle with write permissions as returned by the IMSAdminBase::OpenKey method. The value METADATA_MASTER_ROOT_HANDLE is not valid for this operation.

pszMDPath

Points to a string that contains the new key's path, relative to the path of hMDHandle. For example, if the handle references the /LM key, you could specify the Web services subkey using the path /W3SVC.

This parameter cannot be NULL.

Return Values

Returns an HRESULT that contains one of the following values:

| | |
|---|---|
| ERROR_ACCESS_DENIED | Access is denied. Either the open handle does not have read or write permission as needed or the user does not have sufficient permissions to perform the operation. |
| ERROR_DUP_NAME | A key of that name already exists in the metabase. |
| ERROR_INVALID_NAME | The specified name is invalid. |
| ERROR_INVALID_PARAMETER | The parameter is incorrect. |
| ERROR_NOT_ENOUGH_MEMORY | Not enough storage is available to process this command. |
| ERROR_PATH_NOT_FOUND | The specified path is not found in the metabase. |
| ERROR_SUCCESS | The method succeeded. |

IMSAdminBase::Backup

```
HRESULT backup(
    LPCWSTR    pszMDBackupLocation,   //  backup location
```

```
    DWORD    dwMDVersion,    //  version number
    DWORD    dwMDFlags,      //  flags
);
```

The IMSAdminBase::Backup method backs up the metabase to a backup location you specify by providing a backup location name of up to 100 characters in length. Multiple metabase backups can be stored in a backup location.

Note

IIS determines the backup storage mechanism, so the backup location name you provide does not necessarily translate to a particular directory, file, or database storage mechanism. As implemented in this release, metabase backups are stored as files in the SYSTEM32\INETSRV\METABACK directory. This mechanism may change in future releases.

Parameters pszMDBackupLocation

A string of up to MD_BACKUP_MAX_LEN unicode characters that identifies the backup location. The storage mechanism will be determined by IIS. If an empty string is specified, the default backup location will be used.

dwMDVersion

Specifies the version number to be assigned to the backup. Must be less than or equal to MD_BACKUP_MAX_VERSION. Can be set to one of the following values:

| | |
|---|---|
| MD_BACKUP_HIGHEST_VERSION | Overwrite the highest existing backup version in the specified backup location. |
| MD_BACKUP_NEXT_VERSION | Use the next backup version number available in the specified backup location. |
| dwMDFlags | |
| One or more of the following flags: | |
| MD_BACKUP_FORCE_BACKUP | Force the backup even if the SaveData operation specified by MD_BACKUP_SAVE_FIRST fails. |
| MD_BACKUP_OVERWRITE | Back up even if a backup of the same name and version exists in the specified backup location, overwriting it if necessary. |
| MD_BACKUP_SAVE_FIRST | Perform a SaveData operation before the backup. |

Return Values

Returns an HRESULT that contains one of the values listed in the table below. Other errors may also be returned that are passed through from the file system, or from a crypto api when secure metabase data is being saved.

| Value | Description |
| --- | --- |
| E_INVALIDARG | An argument was invalid |
| ERROR_NOT_ENOUGH_MEMORY | Insufficient memory to perform the operation |
| ERROR_SUCCESS | The method succeeded. |
| MD_WARNING_SAVE_FAILED | This is a warning not an error. |

IMSAdminBase::ChangePermissions

```
HRESULT   Change Permissions(
  METADATA_HANDLE hwDHandle,  // handle to the metabase
  DWORD      dwMDTimeOut,      // time to wait for success
  DWORD      dwMDAccessRequest, // new permissions for handle
);
```

The IMSAdminBase;:ChangePermissions method changes permissions on an open handle. If the handle was opened with write permission and you change it to read only, this method will cause any callback methods registered to be called.

Parameters hMDHandle

Specifies a handle to the metabase, as returned by the IMSAdminBase::OpenKey method.

dwMDTimeOut

Specifies the time, in milliseconds, for the method to wait for the operation to succeed.

dwMDAccessRequested

Specifies the new permissions for the handle. It must be at least one of the following values:

| Value | Description |
| --- | --- |
| METADATA_PERMISSION_READ | Open the key for reading. |
| METADATA_PERMISSION_WRITE | Open the key for writing. |

Return Values

Returns an HRESULT that contains one of the following values:

| | |
| --- | --- |
| ERROR_INVALID_HANDLE | The metabase handle is invalid. |
| ERROR_PATH_BUSY | The path specified cannot be used at this time. |
| ERROR_SUCCESS | The method succeeded |

Remarks

When you use this method to add permissions, success or failure follows the same rules as apply in IMSAdminBase::OpenKey. Timeout values should be short for this call; it is quite possible for two threads with read permission on the same data to attempt to update to write permission at the same time. Both will block until one read handle is closed.

IMSAdminBase::CloseKey

The IMSAdminBase::CloseKey method closes a handle to a key. If the handle was opened with write permission and changes have been made, this will cause any callback methods registered to be called.

```
HRESULT CloseKey(
  METADATA_HANDLE hMDHandle      // handle to key
);
```

Parameters hMDHandle

Specifies the handle to close, as returned by the IMSAdminBase::OpenKey method.

Return Values

Returns an HRESULT that contains one of the following values:

| | |
| --- | --- |
| ERROR_INVALID_HANDLE | The handle is not valid. |
| ERROR_SUCCESS | The method succeeded. |

IMSAdminBase::CopyData

The IMSAdminBase::CopyData method copies or moves data associated with the source key to the destination key. You can also specify whether the method copies the key's inherited data.

```
HRESULT CopyData(
  METADATA_HANDLE                // source metabase handle
    hMDSourceHandle,
  LPCWSTR pszMDSourcePath,       // path to the source key,
                                 // relative to hMDSourceHandle
  METADATA_HANDLE                // destination metabase handle
    hMDDestHandle,
  LPCWSTR pszMDDestPath,         // path to the source key,
                                 // relative to hMDDestHandle
  DWORD dwMDAttributes,          // attributes of the data
  DWORD dwMDUserType,            // user type of the data
  DWORD dwMDDataType,            // data type of the data
  BOOL  bMDCopyFlag              // flag that specifies whether to
                                 // copy or move the data
);
```

Parameters hMDSourceHandle

Specifies METADATA_MASTER_ROOT_HANDLE, or a handle with read permission returned by the IMSAdminBase::OpenKey method.

pszMDSourcePath

Points to a string that contains the path of the key with which the source data is associated, relative to the path of hMDSourceHandle. For example, if the handle references the /LM key, you could specify the Web services subkey using the path /W3SVC.

hMDDestHandle

Specifies a handle, returned by IMSAdminBase::OpenKey, that has write permission. METADATA_MASTER_ROOT_HANDLE is not a valid value for this parameter.

pszMDDestPath

Points to the path of the key for data to be copied to, relative to the path of hMDDestHandle.

dwMDAttributes

The flags, contained in the METADATA_RECORD structure, used to get the data.

dwMDUserType

A DWORD that specifies the user type of the data. If not set to ALL_METADATA, only metadata of the specified user type will be copied or moved. The following user types are defined for IIS:

| User type | Description |
| --- | --- |
| ALL_METADATA | Copy or move all data, regardless of user type. |
| ASP_MD_UT_APP | The entry contains information specific to ASP application configuration. |
| IIS_MD_UT_FILE | Copy or move only data specific to a file, such as access permissions or log on methods. |
| IIS_MD_UT_SERVER | Copy or move only data specific to the server, such as ports in use and IP addresses. |
| IIS_MD_UT_WAM | The entry contains information specific to Web application management. | dwMDDataType

A DWORD that specifies the type of data to retrieve. If dwMDDataType is not set to ALL_METADATA, only metadata of the specified type will be copied or moved. This parameter can be one of the following values:

| Data type | Description |
| --- | --- |
| ALL_METADATA | Copy or move all data, regardless of type. |
| BINARY_METADATA | Binary data in any form. |
| DWORD_METADATA | An unsigned 32-bit number. |
| EXPANDSZ_METADATA | A null-terminated string that contains unexpanded environment variables, such as %PATH%. |
| MULTISZ_METADATA | An array of null-terminated strings, terminated by two null characters. |
| STRING_METADATA | A null-terminated ASCII string. | bMDCopyFlag

A Boolean that specifies whether to copy or move the data. If this parameter is set to TRUE, the data is copied. If it is FALSE, the data is moved. If dwMDAttributes contains the flag METADATA_INHERIT, this parameter must be set to TRUE.

Return Values

Returns an HRESULT that contains one of the following values:

| | |
| --- | --- |
| ERROR_ACCESS_DENIED | Access is denied. Either the open handle does not have read or write permission as needed, or the user does not have sufficient permissions to perform the operation. |
| ERROR_INVALID_PARAMETER | The parameter is incorrect. |
| ERROR_NOT_ENOUGH_MEMORY | There is not enough memory to complete the operation. |
| ERROR_PATH_NOT_FOUND | The specified path is not found. |

-continued

| | |
| --- | --- |
| ERROR_SUCCESS | The method succeeded. |

Remarks

If inherited data is copied, (if dwMDAttributes specifys the METADATA_INHERIT flag) it is copied to the destination key, not to the corresponding ancestor keys.

The handle, METADATA_MASTER_ROOT_HANDLE, provides no guarantee against multiple thread access. If your application requires a constant data state, use a handle returned by IMSAdminBase::OpenKey.

IMSAdminBase::CopyKey

The IMSAdminBase::CopyKey method copies or moves a key, including its subkeys and data, to a specified destination. The copied or moved key becomes a subkey of the destination key.

```
HRESULT CopyKey(
    METADATA_HANDLE hMDSourceHandle,    // metabase handle to the source key
    LPCWSTR pszMDSourcePath,            // path of the source, relative to
                                        // hMDSourceHandle
    METADATA_HANDLE hMDDestHandle,      // metabase handle to the destination
    LPCWSTR pszMDDestPath,              // path of the destination, relative to
                                        // hMDDestHandle
    BOOL bMDOverwriteFlag,              // whether to overwrite or merge data with
                                        // an existing version of the key
    BOOL bMDCopyFlag                    // whether to copy or move the key
    );
```

Parameters hMDSourceHandle

Specifies the handle of the key to be copied or moved. If the key is to be copied (bMDCopyFlag is set to TRUE) hMDSourceHandle must have read permissions. If the key is to be moved (bMDCopyFlag is set to FALSE), hMDSourceHandle must have read/write permissions.

pszMDSourcePath

Points to a string that contains the path of the key to be copied or moved relative to the path of hMDSourceHandle. For example, if the handle references the /LM key, you could specify the Web services subkey using the path /W3SVC.

hMDDestHandle

Specifies a handle with write permissions that specifies the destination of the moved or copied key.

pszMDDestPath

Points to a string that contains the path of the new or moved key, relative to hMDDestHandle.

bMDOverwriteFlag

Determines the behavior if the destination key already exists. If set to TRUE, the existing key and all of its data and descendants are deleted prior to copying or moving the source. If FALSE, the existing key, data, and descendants remain, and the source is merged with that data. In cases of data conflicts, the source data overwrites the destination data.

bMDCopyFlag

Specifies whether to copy or move the specified key. If bMDCopyFlag is TRUE, the key is copied. If it is FALSE, the key is moved, and the source key is deleted from its original location.

Return Values

Returns an HRESULT that contains one of the following values:

| | |
|---|---|
| ERROR_ACCESS_DENIED | Access is denied. Either the open handle does not have read or write permission as needed or the user does not have sufficient permissions to perform the operation. |
| ERROR_DUP_NAME | A key of that name already exists in the metabase. |
| ERROR_INVALID_PARAMETER | The parameter is incorrect. |
| ERROR_NOT_ENOUGH_MEMORY | Not enough memory is available to process this command. |
| ERROR_PATH_NOT_FOUND | The specified path is not found in the metabase. |
| ERROR_SUCCESS | The method succeeded. |

IMSAdminBase::DeleteAllData

The IMSAdminBase::DeleteAllData method deletes all or a subset of local data associated with a particular key.

```
HRESULT DeleteAllData
    METADATA_HANDLE hMDHandle,   // metabase handle
    LPCWSTR pszMDPath,           // path to the key, relative
                                 //   to hMDHandle
    DWORD dwMDUserType,          user type of the data
    DWORD dwMDDataType           // data type of the data
```

Parameters
  hMDHandle
  Specifies a handle to the metabase.
  pszMDPath
  Specifies the path of the key with which the data to be deleted is associated, relative to the path of hMDHandle. For example, if the handle references the /LM key, you could specify the Web services subkey using the path /W3SVC.
  dwMDUserType
  Specifies the user type of the data to delete. If not set to ALL_METADATA, only data of the specified user type will be deleted.
  dwMDDataType
  Specifies the data type of the data to delete. If not set to ALL_METADATA, only data of the specified data type will be deleted.
Remarks
  The IMSAdminBase::DeleteAllData method only deletes data local to the specified key. Any data that the specified key inherits from keys higher in the metabase is not deleted.
  This method can affect subkeys of the specified object if those subkeys inherit data from the key specified in the IMSAdminBase::DeleteAllData call.
IMSAdminBase::DeleteBackup
  The IMSAdminBase::DeleteBackup method deletes a metabase backup from a backup location.

```
HRESULT DeleteBackup
LPCWSTR pszMDBackupLocation
DWORD dwMDVersion
);
```

Parameters
  pszMDBackupLocation
  A string of up to MD_BACKUP_MAX_LEN unicode characters that identifies the backup location.
  dwMDVersion
  Specifies the version number of the backup to be deleted from the backup location, or can be the following constant:

| | |
|---|---|
| MD_BACKUP_HIGHEST_VERSION | Delete the highest existing backup version in the specified backup location. |

Return Values

Returns an HRESULT that contains one of the following values, or any erro from the file system converted to an HRESULT.

| Value | Description |
|---|---|
| ERROR_INVALID_NAME | Specified name is invalid. |
| ERROR_NOT_ENOUGH_MEMORY | Insufficient memory to perform the operation. |
| ERROR_SUCCESS | The method succeeded. |

IMSAdminBase::DeleteChildKeys

The IMSAdminBase::DeleteChildKeys deletes all subkeys of the specified key and any data they contain. It also recursively deletes all keys below the subkeys.

```
HRESULT DeleteChildKeys (
    METADATA_HANDLE hMDHandle,   // metabase handle
    LPCWSTR pszMDPath            // path to the key
);
```

Parameters hMDHandle

Specifies a handle with write permissions, as returned by the IMSAdminBase::OpenKey method. METADATA_MASTER_ROOT_HANDLE is not valid for this operation.

pszMDPath

Points to a string that contains the path of the key whose subkeys are to be deleted, relative to the path of hMDHandle. For example, if the handle references the /LM key, you could use the path /W3SVC to specify the Web services subkey. In this case, all subkeys below /LM/W3SVC would be deleted.

Return Values

Returns an HRESULT that contains one of the following values:

| | |
|---|---|
| ERROR_ACCESS_DENIED | Access is denied. Either the open handle does not have read or write permission as needed, or the user does not have sufficient permissions to perform the operation. |
| ERROR_PATH_NOT_FOUND | The specified path is not found in the metabase. |
| ERROR_SUCCESS | The method succeeded. |

IMSAdminBase::DeleteData

The IMSAdminBase::DeleteData method deletes a data from a key in the metabase.

```
HRESULT DeleteData(
    METADATA_HANDLE hMDHandle,   // metadata handle
    LPCWSTR pszMDPath,           // path to the key, relative to hMDHandle
    DWORD dwMDIdentifier,        // identifier of the data
    DWORD dwMDDataType           // type of data to remove
);
```

Parameters hMDHandle

Specifies a handle returned by the IMSAdminBase::OpenKey method with write permission. This parameter cannot be set to METADATA_MASTER_ROOT_HANDLE.

pszMDPath

Specifies the path of the key to have its data deleted, relative to the path of the handle. For example, if the handle references the /LM key, you could specify the Web services subkey using the path /W3SVC.

dwMDIdentifier

Specifies the identifier of the data, such as MD_CONNECTION_TIMEOUT.

dwMDDataType

Specifies a data type. If this parameter is not set to ALL_METADATA, the data item will be removed only if its data type matches the specified type. This parameter can be one of the following values:

| Data type | Description |
|---|---|
| ALL_METADATA | Specifies all data, regardless of type. |
| BINARY_METADATA | Binary data in any form. |
| DWORD_METADATA | An unsigned 32-bit number. |
| EXPANDSZ_METADATA | A null-terminated string that contains unexpanded environment variables, such as %PATH%. |
| MULTISZ_METADATA | An array of null-terminated strings, terminated by two null characters. |
| STRING_METADATA | A null-terminated ASCII string. |

Return Values
Return an HRESULT that contains one of the following values:

| | |
|---|---|
| ERROR_ACCESS_DENIED | Access is denied. Either the open handle does not have read or write permission as needed, or the user does not have sufficient permissions to perform the operation. |
| ERROR_INVALID_PARAMETER | The parameter is incorrect. |
| ERROR_PATH_NOT_FOUND | The specified path was not found in the metabase. |
| ERROR_SUCCESS | The method succeeded |
| MD_ERROR_DATA_NOT_FOUND | The specified data is not found in the metabase. |

IMSAdminBase::DeleteKey

The IMSAdminBase::DeleteKey method deletes a key and all of its data from the metabase. All of the key's subkeys are recursively deleted.

```
HRESULT DeleteKey(
    METADATA_HANDLE hMDHandle,    // metabase handle
    LPCWSTR pszMDPath              // path of the key to delete
);
```

Parameters hMDHandle

Specifies a handle with write permission returned by the IMSAdminBase::OpenKey method. METADATA_MASTER_ROOT_HANDLE is not valid for this operation.

pszMDPath

Points to a string that contains the path of the key to be deleted, relative to the path of hMDHandle. For example, if the handle references the /LM key, you could specify the Web services subkey be deleted by using the path /W3SVC.

This parameter cannot be NULL.

Return Values

Returns an HRESULT that contains one of the following values:

| | |
|---|---|
| ERROR_ACCESS_DENIED | Access is denied. Either the open handle does not have read or write permission as needed, or the user does not have sufficient permissions to perform the operation. |
| ERROR_INVALID_PARAMETER | The parameter is incorrect. |
| ERROR_PATH_NOT_FOUND | The specified path is not found in the metabase. |
| ERROR_SUCCESS | The method succeeded. |

IMSAdminBase::EnumBackups

The IMSAdminBase::EnumBackups method enumerates the metabase backups in a specified backup location, or in all backup locations. Repeated calls to this method, increasing dwMDEnumIndex from 0, will return information for each metabase backup in the backup location until HRESULT_FROM_WIN32 (ERROR_NO_MORE_ITEMS) is returned.

```
HRESULT EnumBackups(
    LPWSTR pszMDBackupLocation,
    DWORD __RPC_FAR *pdwMDVersion,
    PFILETIME pftMDBackupTime,
    DWORD dwMDEnumIndex
);
```

Parameters pszMDBackupLocation

On input, a buffer of length MD_BACKUP_MAX_LEN times sizeof(WChar) containing an empty string or a string of up to MD_BACKUP_MAX_LEN unicode characters that identifies the backup location. If an empty string is input, the method will enumerate backups in all backup locations, returning the backup location is this parameter. If a backup location is specified on input, only backups in the specified backup location will be enumerated.

pdwMDVersion

Receives the version number of the backup.

pftMDBackupTime

Receives the date and time of the backup, in Universal Time Coordinate (UTC), formerly GMT.

dwMDEnumIndex

Specifies the index number of the backup to be enumerated.

Return Values

Returns an HRESULT that contains one of the following values, or any errors from the file system converted to HRESULT.

| Value | Description |
| --- | --- |
| ERROR_INVALID_NAME | Specified name is invalid. |
| ERROR_NO_MORE_ITEMS | No more items to enumerate. |
| ERROR_NOT_ENOUGH_MEMORY | Insufficient memory to perform the operation. |
| ERROR_SUCCESS | The method succeeded. |

IMSAdminBase::EnumData

The IMSAdminBase::EnumData method enumerates the data entries of a key in the metabase. One entry is enumerated per call. Set dwMDEnumDataIndex to 0 on the first call and increment by 1 on each subsequent call until the method returns ERROR_NO_MORE_ITEMS.

```
HRESULT EnumData(
    METADATA_HANDLE hMDHandle,       // metadata handle
    LPCWSTR pszMDPath,                // path to a key, relative to hMDHandle
    PMETADATA_RECORD pmdrMDData,      // pointer to a structure that
                                      // receives the data
    DWORD dwMDEnumDataIndex,          // index of the current data entry
    DWORD *pdwMDRequiredDataLen       // receives the required buffer size
                                      // for the data
);
```

Parameters hMDHandle

Specifies the handle to a key in the metabase. The handle can be METADATA_MASTER_ROOT_HANDLE or a handle, with read permission, returned by the IMSAdminBase::OpenKey method.

pszMDPath

Specifies the path of the key to be enumerated, relative to the path of hMDHandle. For example, if the handle references the /LM key, you could specify the Web services subkey using the path /W3SVC.

pmdrMDData

Points to a METADATA_RECORD structure that specifies the data to retrieve and receives the data.

dwMDEnumDataIndex

Specifies the index of the entry retrieved. Set this to 0 before the first call and increment it by 1 on each successive call until ERROR_NO_MORE_ITEMS is returned.

pdwMDRequiredDataLen

Points to a DWORD that receives the required buffer size if the method returns ERROR_INSUFFICIENT_BUFFER.

Return Values

Returns HRESULT that contains one of the following values:

| | |
| --- | --- |
| ERROR_ACCESS_DENIED | Access is denied. Either the open handle does not have read or write permission as needed, or the user does not have sufficient permissions to perform the operation. |
| ERROR_INSUFFICIENT_BUFFER | The buffer passed into the method call is too small to receive the data. |
| ERROR_INVALID_PARAMETER | The parameter is incorrect. |
| ERROR_NO_MORE_ITEMS | There are no more entries to enumerate. |
| ERROR_PATH_NOT_FOUND | The specified path is not found in the metabase. |
| ERROR_SUCCESS | The method succeeded. |

Remarks

The handle, METADATA_MASTER_ROOT_HANDLE, provides no guarantee against multiple thread access. If your application requires a constant data state, use a handle returned by IMSAdminBase::OpenKey.

IMSAdminBase::EnumKeys

The IMSAdminBase::EnumKeys method enumerates the subkeys of the specifies key. A subkey can be enumerated once per call. Subkeys are numbered from 0 to (NumKeys−1), with NumKeys equal to the number of subkeys below the key. If dwMDEnumKeyIndex is greater than or equal to the number of subkeys, ERROR_NO_MORE_ITEMS is returned.

```
HRESULT EnumKeys(
    METADATA_HANDLE hMDHandle,   // metabase handle
    LPCWSTR pszMDPath,           // path to the key
    LPWSTR pszMDName,            // receives the name of the subkey
    DWORD dwMDEnumKeyIndex       // index of the subkey
);
```

Parameters
  hMDHandle
   Specifies a handle to a metabase key. This can be either METADATA_MASTER_ROOT_HANDLE, or a handle with read permissions returned by the IMSAdminBase::OpenKey method.
  pszMDPath
   Points to a string that contains the path of the key relative to the path of hMDHandle. For example, if the handle references the /LM key, you could specify the Web services subkey using the path /W3SVC. In this case the subkeys of /LM/W3SVC would be enumerated.
  pszMDName
   Points to a string buffer that receives the names of the metabase subkeys enumerated. This buffer must be at least METADATA_MAX_NAME_LEN wide characters long.
  dwMDEnumKeyIndex
   Specifies the index of the subkey to be retrieved. Set this to 0 before the first call and increment it by 1 on each successive call until ERROR_NO_MORE_ITEMS is returned.
Return Values
  Returns an HRESULT that contains one of the following values:

| | |
|---|---|
| ERROR_ACCESS_DENIED | Access is denied. Either the open handle does not have read or write permission as needed, or the user does not have sufficient permissions to perform the operation. |
| ERROR_INVALID_PARAMETER | The parameter is incorrect. |
| ERROR_NO_MORE_ITEMS | There are no more subkeys to enumerate. |
| ERROR_PATH_NOT_FOUND | The specified path was not found in the metabase. |
| ERROR_SUCCESS | The method succeeded. |

Remarks

The handle, METADATA_MASTER_ROOT_HANDLE, provides no guarantee against multiple thread access. If your application requires a constant data state, use a handle returned by IMSAdminBase::OpenKey.

IMSAdminBase::GetAllData

The IMSAdminBase::GetAllData method retrieves all data associated with a key in the metabase. This includes all values that the key inherits.

```
HRESULT GetAllData(
    METADATA_HANDLE hMDHandle,        // metabase handle
    LPCWSTR pszMDPath,                // path to the key, relative to
                                      // hMDHandle
    DWORD dwMDAttributes,             // attributes of the data to retrieve
    DWORD dwMDUserType,               // user type of the data to retrieve
    DWORD dwMDDataType,               // data type of the data to retrieve
    DWORD *pdwMDNumDataEntries,       // receives the number of entries
                                      // copied to pbMDBuffer
    DWORD *pdwMDDataSetNumber,        // receives the data set number
    DWORD dwMDBufferSize,             // the size, in bytes, of pbMDBuffer
    Unsigned char *pbMDBuffer,        // the buffer that receives the data
    DWORD *pdwMDRequiredBufferSize    // if the method fails, receives
                                      // the required buffer size
);
```

Parameters
hMDHandle
Specifies a handle to the metabase. This can be either METADATA_MASTER_ROOT_HANDLE or a handle, with read permission, returned by the IMSAdmin-Base::OpenKey method.
pszMDPath
Specifies the path of the key with which the data to be retrieved is associated, relative to the path of hMDHandle. For example, if the handle references the /LM key, you could specify the Web services subkey using the path /W3SVC.
dwMDAttributes
The flags, contained in the METADATA_RECORD structure, used to get the data.
dwMDUserType
Specifies the user type of the data. If not set to ALL_METADATA, only data of the specified user type will be returned.
The following user types are defined for IIS:

| User type | Description |
| --- | --- |
| ALL_METADATA | Return all data, regardless of user type. |
| ASP_MD_UT_APP | The entry contains information specific to ASP application configuration. |
| IIS_MD_UT_FILE | Return only data specific to a file, such as access permissions or log on methods. |
| IIS_MD_UT_SERVER | Return only data specific to the server, such as ports in use and IP addresses. |
| IIS_MD_UT_WAM | The entry contains information specific to Web application management. | dwMDDataType
Specifies the type of data to retrieve. If dwMDDataType is not set to ALL_METADATA, only metadata of the specified type will be returned. This parameter can be one of the following values:

| Data type | Description |
| --- | --- |
| ALL_METADATA | Retrieve all data, regardless of type. |
| BINARY_METADATA | Binary data in any form. |
| DWORD_METADATA | An unsigned 32-bit number. |
| EXPANDSZ_METADATA | A null-terminated string that contains unexpanded environment variables, such as %PATH%. |
| MULTISZ_METADATA | An array of null-terminated strings, terminated by two null characters. |
| STRING_METADATA | A null-terminated ASCII string. | pdwMDNumDataEntries
Points to a DWORD that receives the number of entries copied to pbBuffer.
pdwMDDataSetNumber
Points to a number associated with this data set.
dwMDBufferSize
Specifies the size, in bytes, of pbMDBuffer.
pbMDBuffer
Points to a buffer that receives the data. If the method call is successful, the buffer will contain an array of METADATA_GETALL_RECORD structures.
pdwMDRequiredBufferSize
Points to a DWORD that contains the buffer length required, in bytes.
Return Values Returns an HRESULT that contains one of the following values:

| | |
|---|---|
| ERROR_ACCESS_DENIED | Access is denied. Either the open handle does not have read or write permission as needed, or the user does not have sufficient permissions to perform the operation. |
| ERROR_INSUFFICIENT_BUFFER | The buffer passed into the method call is too small to receive the data. |
| ERROR_INVALID_PARAMETER | The parameter is incorrect. |
| ERROR_PATH_NOT_FOUND | The specified path was not found. |
| ERROR_SUCCESS | The method succeeded. |

Remarks

On non-Intel platforms the DWORD data is aligned; this may not be true on remote clients.

The handle, METADATA_MASTER_ROOT_HANDLE, provides no guarantee against multiple thread access. If your application requires a constant data state, use a handle returned by IMSAdminBase::OpenKey IMSAdminBase::GetData The IMSAdminBase::GetData method retrieves an entry from the metabase.

```
HRESULT GetData(
    METADATA_HANDLE hMDHandle,      // metabase handle
    LPCWSTR pszMDPath,              // path to the key, relative to
                                    // hMDHandle
    PMETADATA_RECORD pmdrMDData,    // pointer to a structure that
                                    // receives the data
    DWORD *pdwMDRequiredDataLen     // pointer to a DWORD that receives
                                    // the required data length in the case
                                    // of an overflow
);
```

Parameters hMDHandle

Specifies a handle to the metabase. This can be either METADATA_MASTER_ROOT_HANDLE or a handle returned by the IMSAdminBase::OpenKey method with read permission.

pszMDPath

Specifies the path of the key that contains the data. This path is relative to the path of hMDHandle. For example, if the handle references the /LM key, you could specify the Web services subkey using the path /W3SVC.

pmdrMDData

Points to a METADATA_RECORD structure that specifies the data to retrieve and receives the retrieved data.

pdwMDRequiredDataLen

Receives the data length of the required buffer size if the buffer size specified by pmdrMDData→dwMDDataLen is not large enough to hold the data returned (ERROR_INSUFFICIENT_BUFFER is returned).

Return Values

Returns an HRESULT that contains one of the following values:

| | |
|---|---|
| ERROR_ACCESS_DENIED | Access is denied. Either the open handle does not have read or write permission as needed, or the user does not have sufficient permissions to perform the operation. |
| ERROR_INSUFFICIENT_BUFFER | The buffer passed to the method call is too small to receive the data. |
| ERROR_INVALID_PARAMETER | The parameter is incorrect. |
| ERROR_PATH_NOT_FOUND | The specified path is not found in the metabase. |
| ERROR_SUCCESS | The method succeeded. |
| MD_ERROR_DATA_NOT_FOUND | The specified data is not found in the metabase. |

Remarks

The handle, METADATA_MASTER_ROOT_HANDLE, provides no guarantee against multiple thread access. If your application requires a constant data state, use a handle returned by IMSAdminBase::OpenKey.

IMSAdminBase::GetDataPaths

The IMSAdminBase::GetDataPaths determines which keys in the metabase contain a specified data identifier. This method retrieves the paths of all keys in the subtree relative to a specified starting key that actually contains the identifier. You can use this method to determine the scope of inherited data values, since only keys that contain the identifier itself are returned. Paths to keys that only contain inherited data for the specified identifier will not be returned.

```
HRESULT GetDataPaths(
    METADATA_HANDLE hMDHandle,   // metabase handle
    LPCWSTR pszMDPath,           // path to the key, relative to hMDHandle
    DWORD dwMDIdentifier,        // identifier of the data
    DWORD dwMDDataType,          // type of data
    DWORD dwMDBufferSize,        // the size, in wchars, of pbBuffer
    LPWSTR pszBuffer,            // the buffer that receives the data
    DWORD *pdwMDRequiredBufferSize  // if the method fails, receives
                                 // the required buffer size
);
```

Parameters hMDHandle

Specifies a handle to the metabase. This can either be METADATA_MASTER_ROOT_HANDLE or a handle returned by a previous call to IMSAdminBase::OpenKey.

pszMDPath

Points to a string that contains the path of the key to be opened, relative to hMDHandle. For example, if the handle references the /LM key, you could specify the Web services subkey using the path/W3SVC.

dwMDIdentifier

Specifies the identifier of the data, such as MD_ACCESS_PERM.

dwMDDataType

A DWORD that specifies the type of data to be located. This parameter can be one of the following values:

dwMDBufferSize

Specifies the size, in wchars, of the buffer.

pszBuffer

Points to a buffer that receives the data. If the method call is successful, the buffer will contain a double-null terminated multsz of all paths in the subtree that contain the specified identifier. The returned paths are relative to the handle specified. If the identifier exists on the key designated by the handle and path specified, this path will be the first entry in the list.

pdwMDRequiredBufferSize

Points to a DWORD that contains the buffer length required, in wchars. This parameter is only used if the method returns ERROR_INSUFFICIENT_BUFFER.

Return Values

Returns an HRESULT that contains one of the following values:

| Data type | Description |
|---|---|
| ALL_METADATA | Copy or move all data, regardless of type. |
| BINARY_METADATA | Binary data in any form. |
| DWORD_METADATA | An unsigned 32-bit number. |
| EXPANDSZ_METADATA | A null-terminated string that contains unexpanded environment variables, such as %PATH%. |
| MULTISZ_METADATA | An array of null-terminated strings, terminated by two null characters. |
| STRING_METADATA | A null-terminated ASCII string. |

| | |
|---|---|
| ERROR_INVALID_PARAMETER | The parameter is incorrect. |
| ERROR_NOT_ENOUGH_MEMORY | There is not enough memory to complete the operation. |
| ERROR_PATH_NOT_FOUND | The specified path is not found. |
| ERROR_SUCCESS | The method succeeded. |

IMSAdminBase::GetDataSetNumber

The IMSAdminBase::GetDataSetNumber method retrieves all the data set numbers associated with a key in the metabase. A data set number is a unique number identifying the data items at that key, including inherited data items. Keys with the same data set number have identical data.

```
HRESULT GetDataSetNumber(
    METADATA_HANDLE hMDHandle,      // metabase handle
    LPCWSTR pszMDPath,              // path to the key, relative to
                                    // hMDHandle
    DWORD *pdwMDDataSetNumber       // receives the data set number
                                    // associated with the key
);
```

Parameters
  hMDHandle
    Specifies a handle to the metabase, either METADATA_MASTER_ROOT_HANDLE or a handle with read permission as returned by the IMSAdminBase::OpenKey method.
  pszMDPath
    Points to a string that contains the path of the key to have its data set number retrieved, relative to the path of hMDHandle. For example, if the handle references the /LM key, you could specify the Web services subkey using the path /W3SVC.
  pdwMDDataSetNumber
    Points to a DWORD that receives the number associated with this data set. You can use this value to identify data sets common to multiple keys.
Return Values
  Returns as HRESULT that contains one of the following values:

| | |
|---|---|
| ERROR_INVALID_PARAMETER | The parameter is incorrect. |
| ERROR_SUCCESS | The method succeeded. |

IMSAdminBase::GetHandleInfo

The IMSMAdminBase::GetHandleInfo method retrieves information associated with the specified metabase handle.

```
HRESULT GetHandleInfo(
    METADATA_HANDLE hMDHandle,           // metabase handle
    PMETADATA_HANDLE_INFO pmdhiInfo      // receives the information
                                         // associated with hMDHandle
);
```

Parameters
  hMDHandle
    Specifies a handle to the metabase, either METADATA_MASTER_ROOT_HANDLE or a handle returned by a previous call to the IMSAdminBase::OpenKey method.
  pmdhiInfo
    Points to a METADATA_HANDLE_INFO structure that receives the information about the handle.
Return Values
  Returns an HRESULT that contains one of the following values:

| | |
|---|---|
| ERROR_INVALID_HANDLE | The handle is invalid. |
| ERROR_SUCCESS | The method succeeded. |

Remarks

The dwMDSystemChangeNumber member of the METADATA_HANDLE_INFO structure pointed to by pmdhiInfo will correspond to the system change number generated at the time the handle was created. It will not change if write operations are done using this handle, or any other handle. You can compare this number with the value returned by the IMSAdminBase::GetSystemChangeNumber method to see if any write operations have been done since the handle was opened.

IMSAdminBase::GetLastChangeTime

The IMSAdminBase::GetLastChangeTime method retrieves the last change time associated with a key.

```
HRESULT GetLastChangeTime(
        METADATA_HANDLE hMDHandle,    // metabase handle.
        LPCWSTR pszMDPath,            // path to the key, relative to
                                      // hMDHandle
        PFILETIME pftMDLastChangeTime // receives the last change time
        BOOL bLocalTime               // local or UTC time
);
```

Parameters
 hMDHandle
  Specifies a handle to the metabase. This can either be METADATA_MASTER_ROOT_HANDLE or a handle with write permissions returned by the IMSAdminBase::OpenKey method.
 pszMDPath
  Specifies a string that contains the path of the affected key, relative to the path of hMDHandle. For example, if the handle references the /LM key, you could specify the Web services subkey using the path /W3SVC.
 pftMDLastChangeTime
  Points to a FILETIME structure that receives the last change time.
 bLocalTime
  Specifies whether the value returned in pftMDLastChangeTime is local (TRUE), or UTC time (FALSE)
Return Values
  Returns an HRESULT that contains one of the following values:

| Value | Description |
| --- | --- |
| ERROR_INVALID_PARAMETER | The parameter is incorrect. |
| ERROR_PATH_NOT_FOUND | The specified path is not found. |
| ERROR_SUCCESS | The method succeeded. |

Remarks
  Last change times are updated whenever data or subkeys are set, added, renamed, deleted, copied, or moved, or when this method is called.
IMSAdminBase::GetSystemChangeNumber
  The IMSAdminBase::GetSystemChangeNumber method retrieves the number of changes made to data since the metabase was created. This value is saved to long term storage between metabase sessions.

Parameters pdwSystemChangeNumber

Points to a DWORD that receives the system change number. This number is incremented each time the metabase is updated.

Return Values

Returns an HRESULT that contains one of the following values:

| | |
| --- | --- |
| ERROR_SUCCESS | The method succeeded. |

Remarks

You can compare the value retrieved by this method to the system change number of a handle to see whether changes have been made to the metabase since the handle was opened.

IMSAdminBase::OpenKey

The IMSAdminBase::OpenKey method opens a key for read access, write access or both. The returned handle can be used by several of the other methods. The first time you call this method, you must pass in the METADATA_MASTER_ROOT_HANDLE.

```
HRESULT GetSystemChangeNumber(
     DWORD *pdwSystemChangeNumber   // receives the system change number
);
```

```
HRESULT OpenKey(
        METADATA_HANDLE hMDHandle,    // metabase handle
        LPCWSTR pszMDPath,            // path to the key, relative to hMDHandle
        DWORD dwMDAccessRequested,    // specifies read and/or write permissions
```

-continued

```
    DWORD dwMDTimeOut,           // the time, in milliseconds, before the
                                 //method times out
    PMETADATA_HANDLE phMDNewHandle
                                 // receives the handle to the opened key
);
```

Parameters hMDHandle

Specifies a handle to the metabase. This can either be METADATA_MASTER_ROOT_HANDLE or a handle returned by a previous call to IMSAdminBase::OpenKey.

pszMDPath

Points to a string that contains the path of the key to be opened, relative to hMDHandle. For example, if the handle references the /LM key, you could specify the Web services subkey using the path /W3SVC.

dwMDAccessRequested

Specifies the requested permissions for the handle. This parameter must be set to at least one of the following values:

| Value | Description |
| --- | --- |
| METADATA_PERMISSION_READ | Open the key for reading. |
| METADATA_PERMISSION_WRITE | Open the key for writing. | dwMDTimeOut

Specifies the time, in milliseconds, for the method to wait for the open operation to succeed.

phMDNewHandle

Points to a handle to receive the opened handle.

Return Values

Returns an HRESULT that contains one of the following values:

| | |
| --- | --- |
| ERROR_INVALID_PARAMETER | The parameter is incorrect. |
| ERROR_PATH_BUSY | The path specified cannot be used at this time because a handle to the key, or one of its ancestors or descendents, is already open. |
| ERROR_PATH_NOT_FOUND | The specified path is not found. |
| ERROR_SUCCESS | The method succeeded. |

Remarks

Opening a key with read permissions guarantees that the view of the data will not change while the key is open. Opening a key with write permissions guarantees that no other processes will read or write any data until the handle is closed. This applies to the open key and all of its ancestor and descendent keys. Because opening a key locks a portion of the metabase, it is recommended that you open the key, perform any reads or writes, and immediately close the key when done.

If you try to open a key with read access, the method will wait until all open write access handles to the key and to all ancestor and descendent keys are closed. If you try to open a key with write access, the method will wait until all open handles (either read or write) to the key and to all ancestor and descendent keys are closed.

The METADATA_MASTER_ROOT_HANDLE remains open at all times, and does not block other handles of either access type from being opened.

IMSAdminBase::RenameKey

The IMSAdminBase::RenameKey method renames a key in the metabase.

```
HRESULT RenameKey(
    METADATA HANDLE hMDHandle,
                                 // metabase handle to the key
    LPCWSTR pszMDPath,
                                 // path of the key, relative to
                                 // hMDHandle
    LPCWSTR pszMDNewName         // new name for the key
);
```

Parameters hMDHandle

Specifies a handle to a metabase key. This can be either METADATA_MASTER_ROOT_HANDLE, or a handle- with write permissions returned by the IMSAdminBase::OpenKey method.

pszMDPath

Points to a string that contains the path of the key, relative to the path of hMDHandle. For example, if the handle references the /LM key, you could specify the virtual directory, VDIR1, on the third Web server using the path /W3SVC/3/ROOT/VDIR1.

pszMDNewName

Points to a string that contains the new name for the key.

Return Values

Returns an HRESULT that contains one of the following values:

| | |
|---|---|
| ERROR_ACCESS_DENIED | Access is denied. Either the open handle does not have read or write permission as needed, or the user does not have sufficient permissions to perform the operation. |
| ERROR_DUP_NAME | A key of that name already exists in the metabase. |
| ERROR_INVALID_PARAMETER | The parameter is incorrect. |
| ERROR_NOT_ENOUGH_MEMORY | Not enough memory is available to process this command. |
| ERROR_PATH_NOT_FOUND | The specified path was not found in the metabase. |
| ERROR_SUCCESS | The method succeeded. |

IMSAdminBase::Restore

The IMSAdminBase::Restore method restores the metabase from a backup. The restore operation stops all services dependent on IISADMIN, including all servers, until the restore has completed, then restarts all services. You should be careful to plan for this service interruption when restoring the metabase from a backup.

```
HRESULT Restore(
        LPCWSTR pszMDBackupLocation,
        DWORD dwMDVersion,
        DWORD dwMDFlags
    );
```

Parameters
    pszMDBackupLocation
    A string of up to MD_BACKUP_MAX_LEN unicode characters that identifies the backup location containing the backup to be restored.
    dwMDVersion
    Specifies the version number of the backup to be restored from the backup location, or may be the following constant:

| | |
|---|---|
| MD_BACKUP_HIGHEST_VERSION | Restore from the highest existing backup version in the specified backup location. | dwMDFlags
    Reserved. Must be zero.
Return Values
    Returns an HRESULT that contains one of the values listed in the table below. Other errors may also be returned that are passed through from the file system, or from a crypto api when secure metabase data is being saved, or from registry operations.

| Value | Description |
|---|---|
| E_INVALIDARG | An argument was invalid |
| ERROR_INVALID_DATA | The data is invalid. |
| ERROR_NOT_ENOUGH_MEMORY | Insufficient memory to perform the operation. |
| ERROR_SUCCESS | The method succeeded. |
| MD_ERROR_INVALID_VERSION | The specified version is invalid. |
| MD_WARNING_INVALID_DATA | Invalid metabase data. |
| MD_WARNING_PATH_NOT_FOUND | Specified path not found. |

IMSAdminBase::SaveData

The IMSAdminBase::SaveData method explicitly saves the metabase data to disk. The metabase data is saved in the metabase storage file, by default named metabase.bin in the INETSRV directory in which you installed IIS, or the file specified in the Windows NT® registry key LOCAL_MACHINE\\SOFTWARE\\Microsoft\\INetMgr\\Parameters if the file has been relocated as discussed in the Security topic of the IIS Metabase section.

You must not have a handle open with write permission when you call this method, or the method will fail. The process waits for a few seconds for handles to close, so other processes with write handles open should not normally interfere with the save operation.

Syntax
HRESULT SaveData (void);
Return Values
Returns an HRESULT that contains one of the following values:

| | |
|---|---|
| ERROR_PATH_BUSY | The path specified cannot be used at this time. |
| ERROR_SUCCESS | The method succeeded. |
| File system error codes | See winerror.h for information about specific error codes. |

Remarks

All data in the metabase is saved, including data written by other applications. This method will fail and return ERROR_PATH_BUSY if there are any open write handles to the metabase.

Metabase data is saved when IIS shuts down, so you usually do not need to call this method. However, for critical data it is recommended that you call it whenever appropriate for your application.

IMSAdminBase::Set Data

The IMSAdminBase::SetData method sets a data item. If data with that identifier does not already exist, this method creates and inserts a data item into the list of data items of that type. If data with that identifier already exists, this method sets the new data value. Duplicate data identifiers are not allowed even if the entries are of different user types or data types.

```
HRESULT SetData(
    METADATA_HANDLE hMDHandle,      // metadata handle
    LPCWSTR pszMDPath,              // path of the key relative to
                                    // hMDHandle
    PMETADATA_RECORD pmdrMDData     // pointer to data
);
```

Parameters
hMDHandle

Specifies a handle with write permissions as returned by the IMSAdminBase::OpenKey method. METADATA_MASTER_ROOT_HANDLE is not valid for this operation.

pszMDPath

Specifies a string that contains the path of the key that receives the entry, relative to the path of hMDHandle. For example, if the handle references the /LM key, you could specify the Web services subkey using the path /W3SVC.

pmdrMDData-

Points to a METADATA_RECORD structure that contains the data to set. All the structure members must be filled except dwMDDataTag.

Return Values

Returns an HRESULT that contains one of the following values:

| | |
|---|---|
| ERROR_ACCESS_DENIED | Access is denied. Either the open handle does not have read or write permission as needed, or the user does not have sufficient permissions to perform the operation. |
| ERROR_INVALID_PARAMETER | The parameter is incorrect. |
| ERROR_NOT_ENOUGH_MEMORY | There is not enough memory to complete the operation. |
| ERROR_PATH_NOT_FOUND | The specified path is not found. |
| ERROR_SUCCESS | The method succeeded. |
| MD_ERROR_CANNOT_REMOVE_SECURE_ATTRIBUTE | Cannot set data to be not secure when a secure value exists. |

IMSAdminBase::SetLastChangeTime

The IMSAdminBase::SetLastChangeTime method sets the last change time associated with a key in the metabase.

```
HRESULT SetLastChangeTime(
    METADATA_HANDLE hMDHandle,      // handle to the metabase
    LPCWSTR pszMDPath,              // path to the key, relative to
                                    // hMDHandle
    PFILETIME pftMDLastChangeTime,  // pointer to the last change time
    BOOL bLocalTime                 // local or UTC time
);
```

Parameters hMDHandle

Specifies a handle to the metabase. This can either be METADATA_MASTER_ROOT_HANDLE or a handle with write permissions returned by the IMSAdminBase::OpenKey method.

pszMDPath

Specifies the path of the key to be set, relative to the path of hMDHandle. For example, if the handle references the /LM key, you could specify the Web services subkey using the path /W3SVC.

pftMDLastChangeTime

Points to a FILETIME structure that contains the last change time to set for the key bLocalTime Specifies whether the value pointed at by pftMDLastChangeTime is local (TRUE), or UTC time (FALSE).

Return Values

Returns an HRESULT that contains one of the following values:

| Value | Description |
|---|---|
| ERROR_INVALID_PARAMETER | The parameter is incorrect. |
| ERROR_PATH_NOT_FOUND | The specified path is not found. |
| ERROR_SUCCESS | The method succeeded. |

Remarks

In addition to calls to this method, last change times are updated whenever data or subkeys are set, added, renamed, deleted, copied, or moved.

IMSAdminBase Errors

Error codes returned by Admin Base Object are HRESULTS. The errors beginning with MD_ are already HRESULTS, whereas the WIN32® errors, beginning with ERROR_, are converted to HRESULTS by the RETURNCODETOHRESULT macro. The conversion adds 80070000 to the Win32® error code. Other COM and RPC HRESULTS can also be returned.

The following error codes are specific to the Metadata Key.

| Error Code | Description |
| --- | --- |
| MD_ERROR_DATA_NOT_FOUND | The specified data was not found in the metabase. |
| MD_ERROR_INVALID_VERSION | The version specified in metadata storage was not recognized. |
| MD_WARNING_DUP_NAME | A key or data was specified more than once. The duplicate was ignored. |
| MD_WARNING_INVALID_DATA | The specified data is invalid and has been ignored. |
| MD_WARNING_PATH_NOT_FOUND | The specified key path was not found. The key and its associated metadata were ignored. |

Function Prototypes

The following section details the structures, data types, and function prototypes for an example programatic interface using many of the concepts and functions defined above. The function prototypes are given in the form of two header files that are typically used in a C or C++ program. The first defines function prototypes while the second defines structures and various data types.

```
/* this ALWAYS GENERATED file contains the definitions for the interfaces */

/* File created by MIDL compiler version 3.03.0106 */
/* at Tue Aug 19 11:59:41 1997  */
/* Compiler settings for .\iadmw.idl:
    Oi (OptLev=i0), W1, Zp8, env=Win32, ms_ext, c_ext
    error checks: allocation ref
*/
//@@MIDL_FILE_HEADING(  )

/* verify that the <rpcndr.h> version is high enough to compile this file*/
#ifndef __REQUIRED_RPCNDR_H_VERSION__
#define __REQUIRED_RPCNDR_H_VERSION__ 440
endif
```

```
#include "rpc.h"
include "rpcndr.h"

#ifndef __RPCNDR_H_VERSION__
#error this stub requires an updated version of <rpcndr.h>
endif // __RPCNDR_H_VERSION__ ifndef COM_NO_WINDOWS_H
include "windows.h"
#include "ole2.h"
endif /*COM_NO_WINDOWS_H*/ ifndef __iadmw_h__
define __iadmw_h__ ifdef __cplusplus
extern "C"{
#endif

/* Forward Declarations */ ifndef __IMSAdminBaseW_FWD_DEFINED__
define __IMSAdminBaseW_FWD_DEFINED__
typedef interface IMSAdminBaseW IMSAdminBaseW;
endif      /* __IMSAdminBaseW_FWD_DEFINED__ */ ifndef __IMSAdminBaseSinkW_FWD_DEFINED__
define __IMSAdminBaseSinkW_FWD_DEFINED__
typedef interface IMSAdminBaseSinkW IMSAdminBaseSinkW;
#endif      /* __IMSAdminBaseSinkW_FWD_DEFINED__ */

/* header files for imported files */
#include "mddefw.h"
#include "objidl.h"
#include "ocidl.h"

void __RPC_FAR * __RPC_USER MIDL_user_allocate(size_t);
void __RPC_USER MIDL_user_free( void __RPC_FAR * );

/*****************************************
 * Generated header for interface: __MIDL_itf_iadmw_0000
 * at Tue Aug 19 11:59:41 1997
 * using MIDL 3.03.0106
 ****************************************/
/* [local] */

/*++

Copyright (c) 1997 Microsoft Corporation

Module Name: iadmw.h

Admin Objects Interfaces

--*/
#ifndef _ADM_IADMW_
#define _ADM_IADMW_
#include <mdcommsg.h>
```

```
#include <mdmsg.h>
/*
    Error Codes

Admin api's all return HRESULTS. Since internal results are either
        winerrors or Metadata specific return codes (see mdmsg.h), they are
        converted to HRESULTS using the RETURNCODETOHRESULT macro (see
        commsg.h).
*/
/*
    Max Name Length
        The maximum number of characters in the length of a metaobject name,
        including the terminating NULL. This refers to each node in the tree,
        not the entire path.
        eg. strlen("Root") < ADMINDATA_MAX_NAME_LEN
*/
define ADMINDATA_MAX_NAME_LEN          256 define CLSID_MSAdminBase         CLSID_MSAdminBase_W
define IID_IMSAdminBase          IID_IMSAdminBase_W
#define IMSAdminBase              IMSAdminBaseW
#define IMSAdminBaseSink          IMSAdminBaseSinkW
#define IID_IMSAdminBaseSink      IID_IMSAdminBaseSink_W
define GETAdminBaseCLSID         GETAdminBaseCLSIDW DEFINE_GUID(CLSID_MSAdminBase_W, 0xa9e69610, 0xb80d, 0x11d0, 0xb9, 0xb9, 0x0,
0xa0, 0xc9, 0x22, 0xe7, 0x50);
DEFINE_GUID(IID_IMSAdminBase_W, 0x70b51430, 0xb6ca, 0x11d0, 0xb9, 0xb9, 0x0,
0xa0, 0xc9, 0x22, 0xe7, 0x50);
DEFINE_GUID(IID_IMSAdminBaseSink_W, 0xa9e69612, 0xb80d, 0x11d0, 0xb9, 0xb9,
0x0, 0xa0, 0xc9, 0x22, 0xe7, 0x50);
#define GETAdminBaseCLSIDW(IsService) CLSID_MSAdminBase_W
/*
The Main Interface, UNICODE
*/ extern RPC_IF_HANDLE __MIDL_itf_iadmw_0000_v0_0_c_ifspec;
extern RPC_IF_HANDLE __MIDL_itf_iadmw_0000_v0_0_s_ifspec;

#ifndef __IMSAdminBaseW_INTERFACE_DEFINED__
#define __IMSAdminBaseW_INTERFACE_DEFINED__

/****************************************
 * Generated header for interface: IMSAdminBaseW
 * at Tue Aug 19 11:59:41 1997
 * using MIDL 3.03.0106
 ****************************************/
/* [unique][uuid][object] */

EXTERN_C const IID IID_IMSAdminBaseW;

#if defined(__cplusplus) && !defined(CINTERFACE)

MIDL_INTERFACE("70B51430-B6CA-11d0-B9B9-00A0C922E750")
    IMSAdminBaseW : public IUnknown
    {
    public:
        virtual HRESULT STDMETHODCALLTYPE AddKey(
            /* [in] */ METADATA_HANDLE hMDHandle,
```

```
        /* [string][in][unique] */ LPCWSTR pszMDPath) = 0;

virtual HRESULT STDMETHODCALLTYPE DeleteKey(
        /* [in] */ METADATA_HANDLE hMDHandle,
        /* [string][in][unique] */ LPCWSTR pszMDPath) = 0;

virtual HRESULT STDMETHODCALLTYPE DeleteChildKeys(
        /* [in] */ METADATA_HANDLE hMDHandle,
        /* [string][in][unique] */ LPCWSTR pszMDPath) = 0;

virtual HRESULT STDMETHODCALLTYPE EnumKeys(
        /* [in] */ METADATA_HANDLE hMDHandle,
        /* [string][in][unique] */ LPCWSTR pszMDPath,
        /* [size_is][out] */ LPWSTR pszMDName,
        /* [in] */ DWORD dwMDEnumObjectIndex) = 0;

virtual HRESULT STDMETHODCALLTYPE CopyKey(
        /* [in] */ METADATA_HANDLE hMDSourceHandle,
        /* [string][in][unique] */ LPCWSTR pszMDSourcePath,
        /* [in] */ METADATA_HANDLE hMDDestHandle,
        /* [string][in][unique] */ LPCWSTR pszMDDestPath,
        /* [in] */ BOOL bMDOverwriteFlag,
        /* [in] */ BOOL bMDCopyFlag) = 0;

virtual HRESULT STDMETHODCALLTYPE RenameKey(
        /* [in] */ METADATA_HANDLE hMDHandle,
        /* [string][in][unique] */ LPCWSTR pszMDPath,
        /* [string][in][unique] */ LPCWSTR pszMDNewName) = 0;

virtual /* [local] */ HRESULT STDMETHODCALLTYPE SetData(
        /* [in] */ METADATA_HANDLE hMDHandle,
        /* [string][in][unique] */ LPCWSTR pszMDPath,
        /* [in] */ PMETADATA_RECORD pmdrMDData) = 0;

virtual /* [local] */ HRESULT STDMETHODCALLTYPE GetData(
        /* [in] */ METADATA_HANDLE hMDHandle,
        /* [string][in][unique] */ LPCWSTR pszMDPath,
        /* [out][in] */ PMETADATA_RECORD pmdrMDData,
        /* [out] */ DWORD __RPC_FAR *pdwMDRequiredDataLen) = 0;

virtual HRESULT STDMETHODCALLTYPE DeleteData(
        /* [in] */ METADATA_HANDLE hMDHandle,
        /* [string][in][unique] */ LPCWSTR pszMDPath,
        /* [in] */ DWORD dwMDIdentifier,
        /* [in] */ DWORD dwMDDataType) = 0;

virtual /* [local] */ HRESULT STDMETHODCALLTYPE EnumData(
        /* [in] */ METADATA_HANDLE hMDHandle,
        /* [string][in][unique] */ LPCWSTR pszMDPath,
        /* [out][in] */ PMETADATA_RECORD pmdrMDData,
        /* [in] */ DWORD dwMDEnumDataIndex,
        /* [out] */ DWORD __RPC_FAR *pdwMDRequiredDataLen) = 0;

virtual /* [local] */ HRESULT STDMETHODCALLTYPE GetAllData(
        /* [in] */ METADATA_HANDLE hMDHandle,
        /* [string][in][unique] */ LPCWSTR pszMDPath,
        /* [in] */ DWORD dwMDAttributes,
        /* [in] */ DWORD dwMDUserType,
        /* [in] */ DWORD dwMDDataType,
        /* [out] */ DWORD __RPC_FAR *pdwMDNumDataEntries,
        /* [out] */ DWORD __RPC_FAR *pdwMDDataSetNumber,
        /* [in] */ DWORD dwMDBufferSize,
        /* [size_is][out] */ unsigned char __RPC_FAR *pbMDBuffer,
```

```
                /* [out] */ DWORD __RPC_FAR *pdwMDRequiredBufferSize) = 0;
virtual HRESULT STDMETHODCALLTYPE DeleteAllData(
        /* [in] */ METADATA_HANDLE hMDHandle,
        /* [string][in][unique] */ LPCWSTR pszMDPath,
        /* [in] */ DWORD dwMDUserType,
        /* [in] */ DWORD dwMDDataType) = 0;

virtual HRESULT STDMETHODCALLTYPE CopyData(
        /* [in] */ METADATA_HANDLE hMDSourceHandle,
        /* [string][in][unique] */ LPCWSTR pszMDSourcePath,
        /* [in] */ METADATA_HANDLE hMDDestHandle,
        /* [string][in][unique] */ LPCWSTR pszMDDestPath,
        /* [in] */ DWORD dwMDAttributes,
        /* [in] */ DWORD dwMDUserType,
        /* [in] */ DWORD dwMDDataType,
        /* [in] */ BOOL bMDCopyFlag) = 0;

virtual HRESULT STDMETHODCALLTYPE GetDataPaths(
        /* [in] */ METADATA_HANDLE hMDHandle,
        /* [string][in][unique] */ LPCWSTR pszMDPath,
        /* [in] */ DWORD dwMDIdentifier,
        /* [in] */ DWORD dwMDDataType,
        /* [in] */ DWORD dwMDBufferSize,
        /* [size_is][out] */ WCHAR __RPC_FAR *pszBuffer,
        /* [out] */ DWORD __RPC_FAR *pdwMDRequiredBufferSize) = 0;

virtual HRESULT STDMETHODCALLTYPE OpenKey(
        /* [in] */ METADATA_HANDLE hMDHandle,
        /* [string][in][unique] */ LPCWSTR pszMDPath,
        /* [in] */ DWORD dwMDAccessRequested,
        /* [in] */ DWORD dwMDTimeOut,
        /* [out] */ PMETADATA_HANDLE phMDNewHandle) = 0;

virtual HRESULT STDMETHODCALLTYPE CloseKey(
        /* [in] */ METADATA_HANDLE hMDHandle) = 0;

virtual HRESULT STDMETHODCALLTYPE ChangePermissions(
        /* [in] */ METADATA_HANDLE hMDHandle,
        /* [in] */ DWORD dwMDTimeOut,
        /* [in] */ DWORD dwMDAccessRequested) = 0;

virtual HRESULT STDMETHODCALLTYPE SaveData( void) = 0;

virtual HRESULT STDMETHODCALLTYPE GetHandleInfo(
        /* [in] */ METADATA_HANDLE hMDHandle,
        /* [out] */ PMETADATA_HANDLE_INFO pmdhiInfo) = 0;

virtual HRESULT STDMETHODCALLTYPE GetSystemChangeNumber(
        /* [out] */ DWORD __RPC_FAR *pdwSystemChangeNumber) = 0;

virtual HRESULT STDMETHODCALLTYPE GetDataSetNumber(
        /* [in] */ METADATA_HANDLE hMDHandle,
        /* [string][in][unique] */ LPCWSTR pszMDPath,
        /* [out] */ DWORD __RPC_FAR *pdwMDDataSetNumber) = 0;

virtual HRESULT STDMETHODCALLTYPE SetLastChangeTime(
        /* [in] */ METADATA_HANDLE hMDHandle,
        /* [string][in][unique] */ LPCWSTR pszMDPath,
        /* [in] */ PFILETIME pftMDLastChangeTime,
        /* [in] */ BOOL bLocalTime) = 0;

virtual HRESULT STDMETHODCALLTYPE GetLastChangeTime(
```

```
            /* [in] */ METADATA_HANDLE hMDHandle,
            /* [string][in][unique] */ LPCWSTR pszMDPath,
            /* [out] */ PFILETIME pftMDLastChangeTime,
            /* [in] */ BOOL bLocalTime) = 0;

virtual /* [restricted][local] */ HRESULT STDMETHODCALLTYPE
KeyExchangePhase1( void) = 0;

virtual /* [restricted][local] */ HRESULT STDMETHODCALLTYPE
KeyExchangePhase2( void) = 0;

virtual HRESULT STDMETHODCALLTYPE Backup(
            /* [string][in][unique] */ LPCWSTR pszMDBackupLocation,
            /* [in] */ DWORD dwMDVersion,
            /* [in] */ DWORD dwMDFlags) = 0;

virtual HRESULT STDMETHODCALLTYPE Restore(
            /* [string][in][unique] */ LPCWSTR pszMDBackupLocation,
            /* [in] */ DWORD dwMDVersion,
            /* [in] */ DWORD dwMDFlags) = 0;

virtual HRESULT STDMETHODCALLTYPE EnumBackups(
            /* [size_is][out][in] */ LPWSTR pszMDBackupLocation,
            /* [out] */ DWORD __RPC_FAR *pdwMDVersion,
            /* [out] */ PFILETIME pftMDBackupTime,
            /* [in] */ DWORD dwMDEnumIndex) = 0;

virtual HRESULT STDMETHODCALLTYPE DeleteBackup(
            /* [string][in][unique] */ LPCWSTR pszMDBackupLocation,
            /* [in] */ DWORD dwMDVersion) = 0;

virtual HRESULT STDMETHODCALLTYPE UnmarshalInterface(
            /* [out] */ IMSAdminBaseW __RPC_FAR *__RPC_FAR *piadmbwInterface) = 0;

};

else /* C style interface */ typedef struct IMSAdminBaseWVtbl
    {
        BEGIN_INTERFACE

HRESULT ( STDMETHODCALLTYPE __RPC_FAR *QueryInterface )(
            IMSAdminBaseW __RPC_FAR * This,
            /* [in] */ REFIID riid,
            /* [iid_is][out] */ void __RPC_FAR *__RPC_FAR *ppvObject);

ULONG ( STDMETHODCALLTYPE __RPC_FAR *AddRef )(
            IMSAdminBaseW __RPC_FAR * This);

ULONG ( STDMETHODCALLTYPE __RPC_FAR *Release )(
            IMSAdminBaseW __RPC_FAR * This);

HRESULT ( STDMETHODCALLTYPE __RPC_FAR *AddKey )(
            IMSAdminBaseW __RPC_FAR * This,
            /* [in] */ METADATA_HANDLE hMDHandle,
            /* [string][in][unique] */ LPCWSTR pszMDPath);

HRESULT ( STDMETHODCALLTYPE __RPC_FAR *DeleteKey )(
            IMSAdminBaseW __RPC_FAR * This,
            /* [in] */ METADATA_HANDLE hMDHandle,
            /* [string][in][unique] */ LPCWSTR pszMDPath);
```

```
HRESULT ( STDMETHODCALLTYPE __RPC_FAR *DeleteChildKeys )(
    IMSAdminBaseW __RPC_FAR * This,
    /* [in] */ METADATA_HANDLE hMDHandle,
    /* [string][in][unique] */ LPCWSTR pszMDPath);

HRESULT ( STDMETHODCALLTYPE __RPC_FAR *EnumKeys )(
    IMSAdminBaseW __RPC_FAR * This,
    /* [in] */ METADATA_HANDLE hMDHandle,
    /* [string][in][unique] */ LPCWSTR pszMDPath,
    /* [size_is][out] */ LPWSTR pszMDName,
    /* [in] */ DWORD dwMDEnumObjectIndex);

HRESULT ( STDMETHODCALLTYPE __RPC_FAR *CopyKey )(
    IMSAdminBaseW __RPC_FAR * This,
    /* [in] */ METADATA_HANDLE hMDSourceHandle,
    /* [string][in][unique] */ LPCWSTR pszMDSourcePath,
    /* [in] */ METADATA_HANDLE hMDDestHandle,
    /* [string][in][unique] */ LPCWSTR pszMDDestPath,
    /* [in] */ BOOL bMDOverwriteFlag,
    /* [in] */ BOOL bMDCopyFlag);

HRESULT ( STDMETHODCALLTYPE __RPC_FAR *RenameKey )(
    IMSAdminBaseW __RPC_FAR * This,
    /* [in] */ METADATA_HANDLE hMDHandle,
    /* [string][in][unique] */ LPCWSTR pszMDPath,
    /* [string][in][unique] */ LPCWSTR pszMDNewName);

/* [local] */ HRESULT ( STDMETHODCALLTYPE __RPC_FAR *SetData )(
    IMSAdminBaseW __RPC_FAR * This,
    /* [in] */ METADATA_HANDLE hMDHandle,
    /* [string][in][unique] */ LPCWSTR pszMDPath,
    /* [in] */ PMETADATA_RECORD pmdrMDData);

/* [local] */ HRESULT ( STDMETHODCALLTYPE __RPC_FAR *GetData )(
    IMSAdminBaseW __RPC_FAR * This,
    /* [in] */ METADATA_HANDLE hMDHandle,
    /* [string][in][unique] */ LPCWSTR pszMDPath,
    /* [out][in] */ PMETADATA_RECORD pmdrMDData,
    /* [out] */ DWORD __RPC_FAR *pdwMDRequiredDataLen);

HRESULT ( STDMETHODCALLTYPE __RPC_FAR *DeleteData )(
    IMSAdminBaseW __RPC_FAR * This,
    /* [in] */ METADATA_HANDLE hMDHandle,
    /* [string][in][unique] */ LPCWSTR pszMDPath,
    /* [in] */ DWORD dwMDIdentifier,
    /* [in] */ DWORD dwMDDataType);

/* [local] */ HRESULT ( STDMETHODCALLTYPE __RPC_FAR *EnumData )(
    IMSAdminBaseW __RPC_FAR * This,
    /* [in] */ METADATA_HANDLE hMDHandle,
    /* [string][in][unique] */ LPCWSTR pszMDPath,
    /* [out][in] */ PMETADATA_RECORD pmdrMDData,
    /* [in] */ DWORD dwMDEnumDataIndex,
    /* [out] */ DWORD __RPC_FAR *pdwMDRequiredDataLen);

/* [local] */ HRESULT ( STDMETHODCALLTYPE __RPC_FAR *GetAllData )(
    IMSAdminBaseW __RPC_FAR * This,
    /* [in] */ METADATA_HANDLE hMDHandle,
    /* [string][in][unique] */ LPCWSTR pszMDPath,
    /* [in] */ DWORD dwMDAttributes,
    /* [in] */ DWORD dwMDUserType,
    /* [in] */ DWORD dwMDDataType,
```

```
        /* [out] */ DWORD __RPC_FAR *pdwMDNumDataEntries,
        /* [out] */ DWORD __RPC_FAR *pdwMDDataSetNumber,
        /* [in]  */ DWORD dwMDBufferSize,
        /* [size_is][out] */ unsigned char __RPC_FAR *pbMDBuffer,
        /* [out] */ DWORD __RPC_FAR *pdwMDRequiredBufferSize);

HRESULT ( STDMETHODCALLTYPE __RPC_FAR *DeleteAllData )(
        IMSAdminBaseW __RPC_FAR * This,
        /* [in] */ METADATA_HANDLE hMDHandle,
        /* [string][in][unique] */ LPCWSTR pszMDPath,
        /* [in] */ DWORD dwMDUserType,
        /* [in] */ DWORD dwMDDataType);

HRESULT ( STDMETHODCALLTYPE __RPC_FAR *CopyData )(
        IMSAdminBaseW __RPC_FAR * This,
        /* [in] */ METADATA_HANDLE hMDSourceHandle,
        /* [string][in][unique] */ LPCWSTR pszMDSourcePath,
        /* [in] */ METADATA_HANDLE hMDDestHandle,
        /* [string][in][unique] */ LPCWSTR pszMDDestPath,
        /* [in] */ DWORD dwMDAttributes,
        /* [in] */ DWORD dwMDUserType,
        /* [in] */ DWORD dwMDDataType,
        /* [in] */ BOOL bMDCopyFlag);

HRESULT ( STDMETHODCALLTYPE __RPC_FAR *GetDataPaths )(
        IMSAdminBaseW __RPC_FAR * This,
        /* [in] */ METADATA_HANDLE hMDHandle,
        /* [string][in][unique] */ LPCWSTR pszMDPath,
        /* [in] */ DWORD dwMDIdentifier,
        /* [in] */ DWORD dwMDDataType,
        /* [in] */ DWORD dwMDBufferSize,
        /* [size_is][out] */ WCHAR __RPC_FAR *pszBuffer,
        /* [out] */ DWORD __RPC_FAR *pdwMDRequiredBufferSize);

HRESULT ( STDMETHODCALLTYPE __RPC_FAR *OpenKey )(
        IMSAdminBaseW __RPC_FAR * This,
        /* [in] */ METADATA_HANDLE hMDHandle,
        /* [string][in][unique] */ LPCWSTR pszMDPath,
        /* [in] */ DWORD dwMDAccessRequested,
        /* [in] */ DWORD dwMDTimeOut,
        /* [out] */ PMETADATA_HANDLE phMDNewHandle);

HRESULT ( STDMETHODCALLTYPE __RPC_FAR *CloseKey )(
        IMSAdminBaseW __RPC_FAR * This,
        /* [in] */ METADATA_HANDLE hMDHandle);

HRESULT ( STDMETHODCALLTYPE __RPC_FAR *ChangePermissions )(
        IMSAdminBaseW __RPC_FAR * This,
        /* [in] */ METADATA_HANDLE hMDHandle,
        /* [in] */ DWORD dwMDTimeOut,
        /* [in] */ DWORD dwMDAccessRequested);

HRESULT ( STDMETHODCALLTYPE __RPC_FAR *SaveData )(
        IMSAdminBaseW __RPC_FAR * This);

HRESULT ( STDMETHODCALLTYPE __RPC_FAR *GetHandleInfo )(
        IMSAdminBaseW __RPC_FAR * This,
        /* [in] */ METADATA_HANDLE hMDHandle,
        /* [out] */ PMETADATA_HANDLE_INFO pmdhiInfo);

HRESULT ( STDMETHODCALLTYPE __RPC_FAR *GetSystemChangeNumber )(
        IMSAdminBaseW __RPC_FAR * This,
        /* [out] */ DWORD __RPC_FAR *pdwSystemChangeNumber);
```

```
        HRESULT ( STDMETHODCALLTYPE __RPC_FAR *GetDataSetNumber )(
            IMSAdminBaseW __RPC_FAR * This,
            /* [in] */ METADATA_HANDLE hMDHandle,
            /* [string][in][unique] */ LPCWSTR pszMDPath,
            /* [out] */ DWORD __RPC_FAR *pdwMDDataSetNumber);

HRESULT ( STDMETHODCALLTYPE __RPC_FAR *SetLastChangeTime )(
            IMSAdminBaseW __RPC_FAR * This,
            /* [in] */ METADATA_HANDLE hMDHandle,
            /* [string][in][unique] */ LPCWSTR pszMDPath,
            /* [in] */ PFILETIME pftMDLastChangeTime,
            /* [in] */ BOOL bLocalTime);

HRESULT ( STDMETHODCALLTYPE __RPC_FAR *GetLastChangeTime )(
            IMSAdminBaseW __RPC_FAR * This,
            /* [in] */ METADATA_HANDLE hMDHandle,
            /* [string][in][unique] */ LPCWSTR pszMDPath,
            /* [out] */ PFILETIME pftMDLastChangeTime,
            /* [in] */ BOOL bLocalTime);

/* [restricted][local] */ HRESULT ( STDMETHODCALLTYPE __RPC_FAR
*KeyExchangePhase1 )(
            IMSAdminBaseW __RPC_FAR * This);

/* [restricted][local] */ HRESULT ( STDMETHODCALLTYPE __RPC_FAR
*KeyExchangePhase2 )(
            IMSAdminBaseW __RPC_FAR * This);

HRESULT ( STDMETHODCALLTYPE __RPC_FAR *Backup )(
            IMSAdminBaseW __RPC_FAR * This,
            /* [string][in][unique] */ LPCWSTR pszMDBackupLocation,
            /* [in] */ DWORD dwMDVersion,
            /* [in] */ DWORD dwMDFlags);

HRESULT ( STDMETHODCALLTYPE __RPC_FAR *Restore )(
            IMSAdminBaseW __RPC_FAR * This,
            /* [string][in][unique] */ LPCWSTR pszMDBackupLocation,
            /* [in] */ DWORD dwMDVersion,
            /* [in] */ DWORD dwMDFlags);

HRESULT ( STDMETHODCALLTYPE __RPC_FAR *EnumBackups )(
            IMSAdminBaseW __RPC_FAR * This,
            /* [size_is][out][in] */ LPWSTR pszMDBackupLocation,
            /* [out] */ DWORD __RPC_FAR *pdwMDVersion,
            /* [out] */ PFILETIME pftMDBackupTime,
            /* [in] */ DWORD dwMDEnumIndex);

HRESULT ( STDMETHODCALLTYPE __RPC_FAR *DeleteBackup )(
            IMSAdminBaseW __RPC_FAR * This,
            /* [string][in][unique] */ LPCWSTR pszMDBackupLocation,
            /* [in] */ DWORD dwMDVersion);

HRESULT ( STDMETHODCALLTYPE __RPC_FAR *UnmarshalInterface )(
            IMSAdminBaseW __RPC_FAR * This,
            /* [out] */ IMSAdminBaseW __RPC_FAR *__RPC_FAR *piadmbwInterface);

END_INTERFACE
} IMSAdminBaseWVtbl;

interface IMSAdminBaseW
{
    CONST_VTBL struct IMSAdminBaseWVtbl __RPC_FAR *lpVtbl;
```

```
};

ifdef COBJMACROS define IMSAdminBaseW_QueryInterface(This,riid,ppvObject)    \
    (This)->lpVtbl -> QueryInterface(This,riid,ppvObject)

#define IMSAdminBaseW_AddRef(This)    \
    (This)->lpVtbl -> AddRef(This)

#define IMSAdminBaseW_Release(This)    \
    (This)->lpVtbl -> Release(This)

#define IMSAdminBaseW_AddKey(This,hMDHandle,pszMDPath)    \
    (This)->lpVtbl -> AddKey(This,hMDHandle,pszMDPath)

#define IMSAdminBaseW_DeleteKey(This,hMDHandle,pszMDPath)    \
    (This)->lpVtbl -> DeleteKey(This,hMDHandle,pszMDPath)

#define IMSAdminBaseW_DeleteChildKeys(This,hMDHandle,pszMDPath)    \
    (This)->lpVtbl -> DeleteChildKeys(This,hMDHandle,pszMDPath)

#define IMSAdminBaseW_EnumKeys(This,hMDHandle,pszMDPath,pszMDName,dwMDEnumObjectIndex)    \
    (This)->lpVtbl -> EnumKeys(This,hMDHandle,pszMDPath,pszMDName,dwMDEnumObjectIndex)

#define IMSAdminBaseW_CopyKey(This,hMDSourceHandle,pszMDSourcePath,hMDDestHandle,pszMDDestPath,bMDOverwriteFlag,bMDCopyFlag)    \
    (This)->lpVtbl -> CopyKey(This,hMDSourceHandle,pszMDSourcePath,hMDDestHandle,pszMDDestPath,bMDOverwriteFlag,bMDCopyFlag)

#define IMSAdminBaseW_RenameKey(This,hMDHandle,pszMDPath,pszMDNewName)    \
    (This)->lpVtbl -> RenameKey(This,hMDHandle,pszMDPath,pszMDNewName)

#define IMSAdminBaseW_SetData(This,hMDHandle,pszMDPath,pmdrMDData) \
    (This)->lpVtbl -> SetData(This,hMDHandle,pszMDPath,pmdrMDData)

#define IMSAdminBaseW_GetData(This,hMDHandle,pszMDPath,pmdrMDData,pdwMDRequiredDataLen)    \
    (This)->lpVtbl -> GetData(This,hMDHandle,pszMDPath,pmdrMDData,pdwMDRequiredDataLen)

#define IMSAdminBaseW_DeleteData(This,hMDHandle,pszMDPath,dwMDIdentifier,dwMDDataType)    \
    (This)->lpVtbl -> DeleteData(This,hMDHandle,pszMDPath,dwMDIdentifier,dwMDDataType)

#define IMSAdminBaseW_EnumData(This,hMDHandle,pszMDPath,pmdrMDData,dwMDEnumDataIndex,pdwMDRequiredDataLen)    \
    (This)->lpVtbl -> EnumData(This,hMDHandle,pszMDPath,pmdrMDData,dwMDEnumDataIndex,pdwMDRequiredDataLen)
```

```
#define
IMSAdminBaseW_GetAllData(This,hMDHandle,pszMDPath,dwMDAttributes,dwMDUserType,d
wMDDataType,pdwMDNumDataEntries,pdwMDDataSetNumber,dwMDBufferSize,pbMDBuffer,pd
wMDRequiredBufferSize)    \
    (This)->lpVtbl ->
GetAllData(This,hMDHandle,pszMDPath,dwMDAttributes,dwMDUserType,dwMDDataType,pd
wMDNumDataEntries,pdwMDDataSetNumber,dwMDBufferSize,pbMDBuffer,pdwMDRequiredBuf
ferSize)

#define
IMSAdminBaseW_DeleteAllData(This,hMDHandle,pszMDPath,dwMDUserType,dwMDDataType)     \
    (This)->lpVtbl ->
DeleteAllData(This,hMDHandle,pszMDPath,dwMDUserType,dwMDDataType)

#define
IMSAdminBaseW_CopyData(This,hMDSourceHandle,pszMDSourcePath,hMDDestHandle,pszMD
DestPath,dwMDAttributes,dwMDUserType,dwMDDataType,bMDCopyFlag)     \
    (This)->lpVtbl ->
CopyData(This,hMDSourceHandle,pszMDSourcePath,hMDDestHandle,pszMDDestPath,dwMDA
ttributes,dwMDUserType,dwMDDataType,bMDCopyFlag)

#define
IMSAdminBaseW_GetDataPaths(This,hMDHandle,pszMDPath,dwMDIdentifier,dwMDDataType
,dwMDBufferSize,pszBuffer,pdwMDRequiredBufferSize)     \
    (This)->lpVtbl ->
GetDataPaths(This,hMDHandle,pszMDPath,dwMDIdentifier,dwMDDataType,dwMDBufferSiz
e,pszBuffer,pdwMDRequiredBufferSize)

#define
IMSAdminBaseW_OpenKey(This,hMDHandle,pszMDPath,dwMDAccessRequested,dwMDTimeOut,
phMDNewHandle)     \
    (This)->lpVtbl ->
OpenKey(This,hMDHandle,pszMDPath,dwMDAccessRequested,dwMDTimeOut,phMDNewHandle)

#define IMSAdminBaseW_CloseKey(This,hMDHandle) \
    (This)->lpVtbl -> CloseKey(This,hMDHandle)

#define
IMSAdminBaseW_ChangePermissions(This,hMDHandle,dwMDTimeOut,dwMDAccessRequested)
    \
    (This)->lpVtbl ->
ChangePermissions(This,hMDHandle,dwMDTimeOut,dwMDAccessRequested)

#define IMSAdminBaseW_SaveData(This)     \
    (This)->lpVtbl -> SaveData(This)

#define IMSAdminBaseW_GetHandleInfo(This,hMDHandle,pmdhiInfo)     \
    (This)->lpVtbl -> GetHandleInfo(This,hMDHandle,pmdhiInfo)

#define IMSAdminBaseW_GetSystemChangeNumber(This,pdwSystemChangeNumber)     \
    (This)->lpVtbl -> GetSystemChangeNumber(This,pdwSystemChangeNumber)

#define
IMSAdminBaseW_GetDataSetNumber(This,hMDHandle,pszMDPath,pdwMDDataSetNumber)
    \
    (This)->lpVtbl ->
GetDataSetNumber(This,hMDHandle,pszMDPath,pdwMDDataSetNumber)

#define
IMSAdminBaseW_SetLastChangeTime(This,hMDHandle,pszMDPath,pftMDLastChangeTime,bL
ocalTime)     \
```

```
    (This)->lpVtbl ->
SetLastChangeTime(This,hMDHandle,pszMDPath,pftMDLastChangeTime,bLocalTime)
#define
IMSAdminBaseW_GetLastChangeTime(This,hMDHandle,pszMDPath,pftMDLastChangeTime,bL
ocalTime)    \
    (This)->lpVtbl ->
GetLastChangeTime(This,hMDHandle,pszMDPath,pftMDLastChangeTime,bLocalTime)

#define IMSAdminBaseW_KeyExchangePhase1(This)    \
    (This)->lpVtbl -> KeyExchangePhase1(This)

#define IMSAdminBaseW_KeyExchangePhase2(This)    \
    (This)->lpVtbl -> KeyExchangePhase2(This)

#define IMSAdminBaseW_Backup(This,pszMDBackupLocation,dwMDVersion,dwMDFlags)
    \
    (This)->lpVtbl -> Backup(This,pszMDBackupLocation,dwMDVersion,dwMDFlags)

#define IMSAdminBaseW_Restore(This,pszMDBackupLocation,dwMDVersion,dwMDFlags)
    \
    (This)->lpVtbl -> Restore(This,pszMDBackupLocation,dwMDVersion,dwMDFlags)

#define
IMSAdminBaseW_EnumBackups(This,pszMDBackupLocation,pdwMDVersion,pftMDBackupTime
,dwMDEnumIndex)    \
    (This)->lpVtbl ->
EnumBackups(This,pszMDBackupLocation,pdwMDVersion,pftMDBackupTime,dwMDEnumIndex
)

#define IMSAdminBaseW_DeleteBackup(This,pszMDBackupLocation,dwMDVersion)  \
    (This)->lpVtbl -> DeleteBackup(This,pszMDBackupLocation,dwMDVersion)

#define IMSAdminBaseW_UnmarshalInterface(This,piadmbwInterface)    \
    (This)->lpVtbl -> UnmarshalInterface(This,piadmbwInterface)

endif /* COBJMACROS */ endif        /* C style interface */

HRESULT STDMETHODCALLTYPE IMSAdminBaseW_AddKey_Proxy(
    IMSAdminBaseW __RPC_FAR * This,
    /* [in] */ METADATA_HANDLE hMDHandle,
    /* [string][in][unique] */ LPCWSTR pszMDPath);

void __RPC_STUB IMSAdminBaseW_AddKey_Stub(
    IRpcStubBuffer *This,
    IRpcChannelBuffer *_pRpcChannelBuffer,
    PRPC_MESSAGE _pRpcMessage,
    DWORD *_pdwStubPhase);

HRESULT STDMETHODCALLTYPE IMSAdminBaseW_DeleteKey_Proxy(
    IMSAdminBaseW __RPC_FAR * This,
    /* [in] */ METADATA_HANDLE hMDHandle,
    /* [string][in][unique] */ LPCWSTR pszMDPath);

void __RPC_STUB IMSAdminBaseW_DeleteKey_Stub(
```

```
    IRpcStubBuffer *This,
    IRpcChannelBuffer *_pRpcChannelBuffer,
    PRPC_MESSAGE _pRpcMessage,
    DWORD *_pdwStubPhase);

HRESULT STDMETHODCALLTYPE IMSAdminBaseW_DeleteChildKeys_Proxy(
    IMSAdminBaseW __RPC_FAR * This,
    /* [in] */ METADATA_HANDLE hMDHandle,
    /* [string][in][unique] */ LPCWSTR pszMDPath);

void __RPC_STUB IMSAdminBaseW_DeleteChildKeys_Stub(
    IRpcStubBuffer *This,
    IRpcChannelBuffer *_pRpcChannelBuffer,
    PRPC_MESSAGE _pRpcMessage,
    DWORD *_pdwStubPhase);

HRESULT STDMETHODCALLTYPE IMSAdminBaseW_EnumKeys_Proxy(
    IMSAdminBaseW __RPC_FAR * This,
    /* [in] */ METADATA_HANDLE hMDHandle,
    /* [string][in][unique] */ LPCWSTR pszMDPath,
    /* [size_is][out] */ LPWSTR pszMDName,
    /* [in] */ DWORD dwMDEnumObjectIndex);

void __RPC_STUB IMSAdminBaseW_EnumKeys_Stub(
    IRpcStubBuffer *This,
    IRpcChannelBuffer *_pRpcChannelBuffer,
    PRPC_MESSAGE _pRpcMessage,
    DWORD *_pdwStubPhase);

HRESULT STDMETHODCALLTYPE IMSAdminBaseW_CopyKey_Proxy(
    IMSAdminBaseW __RPC_FAR * This,
    /* [in] */ METADATA_HANDLE hMDSourceHandle,
    /* [string][in][unique] */ LPCWSTR pszMDSourcePath,
    /* [in] */ METADATA_HANDLE hMDDestHandle,
    /* [string][in][unique] */ LPCWSTR pszMDDestPath,
    /* [in] */ BOOL bMDOverwriteFlag,
    /* [in] */ BOOL bMDCopyFlag);

void __RPC_STUB IMSAdminBaseW_CopyKey_Stub(
    IRpcStubBuffer *This,
    IRpcChannelBuffer *_pRpcChannelBuffer,
    PRPC_MESSAGE _pRpcMessage,
    DWORD *_pdwStubPhase);

HRESULT STDMETHODCALLTYPE IMSAdminBaseW_RenameKey_Proxy(
    IMSAdminBaseW __RPC_FAR * This,
    /* [in] */ METADATA_HANDLE hMDHandle,
    /* [string][in][unique] */ LPCWSTR pszMDPath,
    /* [string][in][unique] */ LPCWSTR pszMDNewName);

void __RPC_STUB IMSAdminBaseW_RenameKey_Stub(
    IRpcStubBuffer *This,
    IRpcChannelBuffer *_pRpcChannelBuffer,
    PRPC_MESSAGE _pRpcMessage,
    DWORD *_pdwStubPhase);
```

```
/* [call_as] */ HRESULT STDMETHODCALLTYPE IMSAdminBaseW_R_SetData_Proxy(
    IMSAdminBaseW __RPC_FAR * This,
    /* [in] */ METADATA_HANDLE hMDHandle,
    /* [string][in][unique] */ LPCWSTR pszMDPath,
    /* [in] */ PMETADATA_RECORD pmdrMDData);

void __RPC_STUB IMSAdminBaseW_R_SetData_Stub(
    IRpcStubBuffer *This,
    IRpcChannelBuffer *_pRpcChannelBuffer,
    PRPC_MESSAGE _pRpcMessage,
    DWORD *_pdwStubPhase);

/* [call_as] */ HRESULT STDMETHODCALLTYPE IMSAdminBaseW_R_GetData_Proxy(
    IMSAdminBaseW __RPC_FAR * This,
    /* [in] */ METADATA_HANDLE hMDHandle,
    /* [string][in][unique] */ LPCWSTR pszMDPath,
    /* [out][in] */ PMETADATA_RECORD pmdrMDData,
    /* [out] */ DWORD __RPC_FAR *pdwMDRequiredDataLen,
    /* [out] */ struct _IIS_CRYPTO_BLOB __RPC_FAR *__RPC_FAR *ppDataBlob);

void __RPC_STUB IMSAdminBaseW_R_GetData_Stub(
    IRpcStubBuffer *This,
    IRpcChannelBuffer *_pRpcChannelBuffer,
    PRPC_MESSAGE _pRpcMessage,
    DWORD *_pdwStubPhase);

HRESULT STDMETHODCALLTYPE IMSAdminBaseW_DeleteData_Proxy(
    IMSAdminBaseW __RPC_FAR * This,
    /* [in] */ METADATA_HANDLE hMDHandle,
    /* [string][in][unique] */ LPCWSTR pszMDPath,
    /* [in] */ DWORD dwMDIdentifier,
    /* [in] */ DWORD dwMDDataType);

void __RPC_STUB IMSAdminBaseW_DeleteData_Stub(
    IRpcStubBuffer *This,
    IRpcChannelBuffer *_pRpcChannelBuffer,
    PRPC_MESSAGE _pRpcMessage,
    DWORD *_pdwStubPhase);

/* [call_as] */ HRESULT STDMETHODCALLTYPE IMSAdminBaseW_R_EnumData_Proxy(
    IMSAdminBaseW __RPC_FAR * This,
    /* [in] */ METADATA_HANDLE hMDHandle,
    /* [string][in][unique] */ LPCWSTR pszMDPath,
    /* [out][in] */ PMETADATA_RECORD pmdrMDData,
    /* [in] */ DWORD dwMDEnumDataIndex,
    /* [out] */ DWORD __RPC_FAR *pdwMDRequiredDataLen,
    /* [out] */ struct _IIS_CRYPTO_BLOB __RPC_FAR *__RPC_FAR *ppDataBlob);

void __RPC_STUB IMSAdminBaseW_R_EnumData_Stub(
    IRpcStubBuffer *This,
    IRpcChannelBuffer *_pRpcChannelBuffer,
    PRPC_MESSAGE _pRpcMessage,
    DWORD *_pdwStubPhase);
```

```
/* [call_as] */ HRESULT STDMETHODCALLTYPE IMSAdminBaseW_R_GetAllData_Proxy(
    IMSAdminBaseW __RPC_FAR * This,
    /* [in] */ METADATA_HANDLE hMDHandle,
    /* [string][in][unique] */ LPCWSTR pszMDPath,
    /* [in] */ DWORD dwMDAttributes,
    /* [in] */ DWORD dwMDUserType,
    /* [in] */ DWORD dwMDDataType,
    /* [out] */ DWORD __RPC_FAR *pdwMDNumDataEntries,
    /* [out] */ DWORD __RPC_FAR *pdwMDDataSetNumber,
    /* [in] */ DWORD dwMDBufferSize,
    /* [out] */ DWORD __RPC_FAR *pdwMDRequiredBufferSize,
    /* [out] */ struct _IIS_CRYPTO_BLOB __RPC_FAR *__RPC_FAR *ppDataBlob);

void __RPC_STUB IMSAdminBaseW_R_GetAllData_Stub(
    IRpcStubBuffer *This,
    IRpcChannelBuffer *_pRpcChannelBuffer,
    PRPC_MESSAGE _pRpcMessage,
    DWORD *_pdwStubPhase);

HRESULT STDMETHODCALLTYPE IMSAdminBaseW_DeleteAllData_Proxy(
    IMSAdminBaseW __RPC_FAR * This,
    /* [in] */ METADATA_HANDLE hMDHandle,
    /* [string][in][unique] */ LPCWSTR pszMDPath,
    /* [in] */ DWORD dwMDUserType,
    /* [in] */ DWORD dwMDDataType);

void __RPC_STUB IMSAdminBaseW_DeleteAllData_Stub(
    IRpcStubBuffer *This,
    IRpcChannelBuffer *_pRpcChannelBuffer,
    PRPC_MESSAGE _pRpcMessage,
    DWORD *_pdwStubPhase);

HRESULT STDMETHODCALLTYPE IMSAdminBaseW_CopyData_Proxy(
    IMSAdminBaseW __RPC_FAR * This,
    /* [in] */ METADATA_HANDLE hMDSourceHandle,
    /* [string][in][unique] */ LPCWSTR pszMDSourcePath,
    /* [in] */ METADATA_HANDLE hMDDestHandle,
    /* [string][in][unique] */ LPCWSTR pszMDDestPath,
    /* [in] */ DWORD dwMDAttributes,
    /* [in] */ DWORD dwMDUserType,
    /* [in] */ DWORD dwMDDataType,
    /* [in] */ BOOL bMDCopyFlag);

void __RPC_STUB IMSAdminBaseW_CopyData_Stub(
    IRpcStubBuffer *This,
    IRpcChannelBuffer *_pRpcChannelBuffer,
    PRPC_MESSAGE _pRpcMessage,
    DWORD *_pdwStubPhase);

HRESULT STDMETHODCALLTYPE IMSAdminBaseW_GetDataPaths_Proxy(
    IMSAdminBaseW __RPC_FAR * This,
    /* [in] */ METADATA_HANDLE hMDHandle,
    /* [string][in][unique] */ LPCWSTR pszMDPath,
    /* [in] */ DWORD dwMDIdentifier,
    /* [in] */ DWORD dwMDDataType,
    /* [in] */ DWORD dwMDBufferSize,
```

```
    /* [size_is][out] */ WCHAR __RPC_FAR *pszBuffer,
    /* [out] */ DWORD __RPC_FAR *pdwMDRequiredBufferSize);

void __RPC_STUB IMSAdminBaseW_GetDataPaths_Stub(
    IRpcStubBuffer *This,
    IRpcChannelBuffer *_pRpcChannelBuffer,
    PRPC_MESSAGE _pRpcMessage,
    DWORD *_pdwStubPhase);

HRESULT STDMETHODCALLTYPE IMSAdminBaseW_OpenKey_Proxy(
    IMSAdminBaseW __RPC_FAR * This,
    /* [in] */ METADATA_HANDLE hMDHandle,
    /* [string][in][unique] */ LPCWSTR pszMDPath,
    /* [in] */ DWORD dwMDAccessRequested,
    /* [in] */ DWORD dwMDTimeOut,
    /* [out] */ PMETADATA_HANDLE phMDNewHandle);

void __RPC_STUB IMSAdminBaseW_OpenKey_Stub(
    IRpcStubBuffer *This,
    IRpcChannelBuffer *_pRpcChannelBuffer,
    PRPC_MESSAGE _pRpcMessage,
    DWORD *_pdwStubPhase);

HRESULT STDMETHODCALLTYPE IMSAdminBaseW_CloseKey_Proxy(
    IMSAdminBaseW __RPC_FAR * This,
    /* [in] */ METADATA_HANDLE hMDHandle);

void __RPC_STUB IMSAdminBaseW_CloseKey_Stub(
    IRpcStubBuffer *This,
    IRpcChannelBuffer *_pRpcChannelBuffer,
    PRPC_MESSAGE _pRpcMessage,
    DWORD *_pdwStubPhase);

HRESULT STDMETHODCALLTYPE IMSAdminBaseW_ChangePermissions_Proxy(
    IMSAdminBaseW __RPC_FAR * This,
    /* [in] */ METADATA_HANDLE hMDHandle,
    /* [in] */ DWORD dwMDTimeOut,
    /* [in] */ DWORD dwMDAccessRequested);

void __RPC_STUB IMSAdminBaseW_ChangePermissions_Stub(
    IRpcStubBuffer *This,
    IRpcChannelBuffer *_pRpcChannelBuffer,
    PRPC_MESSAGE _pRpcMessage,
    DWORD *_pdwStubPhase);

HRESULT STDMETHODCALLTYPE IMSAdminBaseW_SaveData_Proxy(
    IMSAdminBaseW __RPC_FAR * This);

void __RPC_STUB IMSAdminBaseW_SaveData_Stub(
    IRpcStubBuffer *This,
    IRpcChannelBuffer *_pRpcChannelBuffer,
    PRPC_MESSAGE _pRpcMessage,
    DWORD *_pdwStubPhase);
```

```
HRESULT STDMETHODCALLTYPE IMSAdminBaseW_GetHandleInfo_Proxy(
    IMSAdminBaseW __RPC_FAR * This,
    /* [in] */ METADATA_HANDLE hMDHandle,
    /* [out] */ PMETADATA_HANDLE_INFO pmdhiInfo);

void __RPC_STUB IMSAdminBaseW_GetHandleInfo_Stub(
    IRpcStubBuffer *This,
    IRpcChannelBuffer *_pRpcChannelBuffer,
    PRPC_MESSAGE _pRpcMessage,
    DWORD *_pdwStubPhase);

HRESULT STDMETHODCALLTYPE IMSAdminBaseW_GetSystemChangeNumber_Proxy(
    IMSAdminBaseW __RPC_FAR * This,
    /* [out] */ DWORD __RPC_FAR *pdwSystemChangeNumber);

void __RPC_STUB IMSAdminBaseW_GetSystemChangeNumber_Stub(
    IRpcStubBuffer *This,
    IRpcChannelBuffer *_pRpcChannelBuffer,
    PRPC_MESSAGE _pRpcMessage,
    DWORD *_pdwStubPhase);

HRESULT STDMETHODCALLTYPE IMSAdminBaseW_GetDataSetNumber_Proxy(
    IMSAdminBaseW __RPC_FAR * This,
    /* [in] */ METADATA_HANDLE hMDHandle,
    /* [string][in][unique] */ LPCWSTR pszMDPath,
    /* [out] */ DWORD __RPC_FAR *pdwMDDataSetNumber);

void __RPC_STUB IMSAdminBaseW_GetDataSetNumber_Stub(
    IRpcStubBuffer *This,
    IRpcChannelBuffer *_pRpcChannelBuffer,
    PRPC_MESSAGE _pRpcMessage,
    DWORD *_pdwStubPhase);

HRESULT STDMETHODCALLTYPE IMSAdminBaseW_SetLastChangeTime_Proxy(
    IMSAdminBaseW __RPC_FAR * This,
    /* [in] */ METADATA_HANDLE hMDHandle,
    /* [string][in][unique] */ LPCWSTR pszMDPath,
    /* [in] */ PFILETIME pftMDLastChangeTime,
    /* [in] */ BOOL bLocalTime);

void __RPC_STUB IMSAdminBaseW_SetLastChangeTime_Stub(
    IRpcStubBuffer *This,
    IRpcChannelBuffer *_pRpcChannelBuffer,
    PRPC_MESSAGE _pRpcMessage,
    DWORD *_pdwStubPhase);

HRESULT STDMETHODCALLTYPE IMSAdminBaseW_GetLastChangeTime_Proxy(
    IMSAdminBaseW __RPC_FAR * This,
    /* [in] */ METADATA_HANDLE hMDHandle,
    /* [string][in][unique] */ LPCWSTR pszMDPath,
    /* [out] */ PFILETIME pftMDLastChangeTime,
    /* [in] */ BOOL bLocalTime);
```

```
void __RPC_STUB IMSAdminBaseW_GetLastChangeTime_Stub(
    IRpcStubBuffer *This,
    IRpcChannelBuffer *_pRpcChannelBuffer,
    PRPC_MESSAGE _pRpcMessage,
    DWORD *_pdwStubPhase);

/* [call_as] */ HRESULT STDMETHODCALLTYPE
IMSAdminBaseW_R_KeyExchangePhase1_Proxy(
    IMSAdminBaseW __RPC_FAR * This,
    /* [in][unique] */ struct _IIS_CRYPTO_BLOB __RPC_FAR
*pClientKeyExchangeKeyBlob,
    /* [in][unique] */ struct _IIS_CRYPTO_BLOB __RPC_FAR
*pClientSignatureKeyBlob,
    /* [out] */ struct _IIS_CRYPTO_BLOB __RPC_FAR * __RPC_FAR
*ppServerKeyExchangeKeyBlob,
    /* [out] */ struct _IIS_CRYPTO_BLOB __RPC_FAR * __RPC_FAR
*ppServerSignatureKeyBlob,
    /* [out] */ struct _IIS_CRYPTO_BLOB __RPC_FAR * __RPC_FAR
*ppServerSessionKeyBlob);

void __RPC_STUB IMSAdminBaseW_R_KeyExchangePhase1_Stub(
    IRpcStubBuffer *This,
    IRpcChannelBuffer *_pRpcChannelBuffer,
    PRPC_MESSAGE _pRpcMessage,
    DWORD *_pdwStubPhase);

/* [call_as] */ HRESULT STDMETHODCALLTYPE
IMSAdminBaseW_R_KeyExchangePhase2_Proxy(
    IMSAdminBaseW __RPC_FAR * This,
    /* [in][unique] */ struct _IIS_CRYPTO_BLOB __RPC_FAR
*pClientSessionKeyBlob,
    /* [in][unique] */ struct _IIS_CRYPTO_BLOB __RPC_FAR *pClientHashBlob,
    /* [out] */ struct _IIS_CRYPTO_BLOB __RPC_FAR * __RPC_FAR
*ppServerHashBlob);

void __RPC_STUB IMSAdminBaseW_R_KeyExchangePhase2_Stub(
    IRpcStubBuffer *This,
    IRpcChannelBuffer *_pRpcChannelBuffer,
    PRPC_MESSAGE _pRpcMessage,
    DWORD *_pdwStubPhase);

HRESULT STDMETHODCALLTYPE IMSAdminBaseW_Backup_Proxy(
    IMSAdminBaseW __RPC_FAR * This,
    /* [string][in][unique] */ LPCWSTR pszMDBackupLocation,
    /* [in] */ DWORD dwMDVersion,
    /* [in] */ DWORD dwMDFlags);

void __RPC_STUB IMSAdminBaseW_Backup_Stub(
    IRpcStubBuffer *This,
    IRpcChannelBuffer *_pRpcChannelBuffer,
    PRPC_MESSAGE _pRpcMessage,
    DWORD *_pdwStubPhase);

HRESULT STDMETHODCALLTYPE IMSAdminBaseW_Restore_Proxy(
    IMSAdminBaseW __RPC_FAR * This,
    /* [string][in][unique] */ LPCWSTR pszMDBackupLocation,
```

```
    /* [in] */ DWORD dwMDVersion,
    /* [in] */ DWORD dwMDFlags);

void __RPC_STUB IMSAdminBaseW_Restore_Stub(
    IRpcStubBuffer *This,
    IRpcChannelBuffer *_pRpcChannelBuffer,
    PRPC_MESSAGE _pRpcMessage,
    DWORD *_pdwStubPhase);

HRESULT STDMETHODCALLTYPE IMSAdminBaseW_EnumBackups_Proxy(
    IMSAdminBaseW __RPC_FAR * This,
    /* [size_is][out][in] */ LPWSTR pszMDBackupLocation,
    /* [out] */ DWORD __RPC_FAR *pdwMDVersion,
    /* [out] */ PFILETIME pftMDBackupTime,
    /* [in] */ DWORD dwMDEnumIndex);

void __RPC_STUB IMSAdminBaseW_EnumBackups_Stub(
    IRpcStubBuffer *This,
    IRpcChannelBuffer *_pRpcChannelBuffer,
    PRPC_MESSAGE _pRpcMessage,
    DWORD *_pdwStubPhase);

HRESULT STDMETHODCALLTYPE IMSAdminBaseW_DeleteBackup_Proxy(
    IMSAdminBaseW __RPC_FAR * This,
    /* [string][in][unique] */ LPCWSTR pszMDBackupLocation,
    /* [in] */ DWORD dwMDVersion);

void __RPC_STUB IMSAdminBaseW_DeleteBackup_Stub(
    IRpcStubBuffer *This,
    IRpcChannelBuffer *_pRpcChannelBuffer,
    PRPC_MESSAGE _pRpcMessage,
    DWORD *_pdwStubPhase);

HRESULT STDMETHODCALLTYPE IMSAdminBaseW_UnmarshalInterface_Proxy(
    IMSAdminBaseW __RPC_FAR * This,
    /* [out] */ IMSAdminBaseW __RPC_FAR *__RPC_FAR *piadmbwInterface);

void __RPC_STUB IMSAdminBaseW_UnmarshalInterface_Stub(
    IRpcStubBuffer *This,
    IRpcChannelBuffer *_pRpcChannelBuffer,
    PRPC_MESSAGE _pRpcMessage,
    DWORD *_pdwStubPhase);

endif       /* __IMSAdminBaseW_INTERFACE_DEFINED__ */ ifndef __IMSAdminBaseSinkW_INTERFACE_DEFINED__
define __IMSAdminBaseSinkW_INTERFACE_DEFINED__

/*****************************************
 * Generated header for interface: IMSAdminBaseSinkW
 * at Tue Aug 19 11:59:41 1997
 * using MIDL 3.03.0106
 *****************************************/
```

```
/* [unique][uuid][object] */

EXTERN_C const IID IID_IMSAdminBaseSinkW;
#if defined(__cplusplus) && !defined(CINTERFACE)

MIDL_INTERFACE("A9E69612-B80D-11d0-B9B9-00A0C922E750")
    IMSAdminBaseSinkW : public IUnknown
    {
    public:
        virtual HRESULT STDMETHODCALLTYPE SinkNotify(
            /* [in] */ DWORD dwMDNumElements,
            /* [size_is][in] */ MD_CHANGE_OBJECT_W __RPC_FAR pcoChangeList[  ])
= 0;

virtual HRESULT STDMETHODCALLTYPE ShutdownNotify( void) = 0;

};

else   /* C style interface */ typedef struct IMSAdminBaseSinkWVtbl
    {
        BEGIN_INTERFACE

HRESULT ( STDMETHODCALLTYPE __RPC_FAR *QueryInterface )(
            IMSAdminBaseSinkW __RPC_FAR * This,
            /* [in] */ REFIID riid,
            /* [iid_is][out] */ void __RPC_FAR *__RPC_FAR *ppvObject);

ULONG ( STDMETHODCALLTYPE __RPC_FAR *AddRef )(
            IMSAdminBaseSinkW __RPC_FAR * This);

ULONG ( STDMETHODCALLTYPE __RPC_FAR *Release )(
            IMSAdminBaseSinkW __RPC_FAR * This);

HRESULT ( STDMETHODCALLTYPE __RPC_FAR *SinkNotify )(
            IMSAdminBaseSinkW __RPC_FAR * This,
            /* [in] */ DWORD dwMDNumElements,
            /* [size_is][in] */ MD_CHANGE_OBJECT_W __RPC_FAR pcoChangeList[
]);

HRESULT ( STDMETHODCALLTYPE __RPC_FAR *ShutdownNotify )(
            IMSAdminBaseSinkW __RPC_FAR * This);

END_INTERFACE
    } IMSAdminBaseSinkWVtbl;

interface IMSAdminBaseSinkW
    {
        CONST_VTBL struct IMSAdminBaseSinkWVtbl __RPC_FAR *lpVtbl;
    };

ifdef COBJMACROS define IMSAdminBaseSinkW_QueryInterface(This,riid,ppvObject)    \
    (This)->lpVtbl -> QueryInterface(This,riid,ppvObject)
```

```
#define IMSAdminBaseSinkW_AddRef(This)  \
    (This)->lpVtbl -> AddRef(This)

#define IMSAdminBaseSinkW_Release(This) \
    (This)->lpVtbl -> Release(This)

#define IMSAdminBaseSinkW_SinkNotify(This,dwMDNumElements,pcoChangeList) \
    (This)->lpVtbl -> SinkNotify(This,dwMDNumElements,pcoChangeList)

#define IMSAdminBaseSinkW_ShutdownNotify(This) \
    (This)->lpVtbl -> ShutdownNotify(This)

endif /* COBJMACROS */ endif      /* C style interface */

HRESULT STDMETHODCALLTYPE IMSAdminBaseSinkW_SinkNotify_Proxy(
    IMSAdminBaseSinkW __RPC_FAR * This,
    /* [in] */ DWORD dwMDNumElements,
    /* [size_is][in] */ MD_CHANGE_OBJECT_W __RPC_FAR pcoChangeList[  ]);

void __RPC_STUB IMSAdminBaseSinkW_SinkNotify_Stub(
    IRpcStubBuffer *This,
    IRpcChannelBuffer *_pRpcChannelBuffer,
    PRPC_MESSAGE _pRpcMessage,
    DWORD *_pdwStubPhase);

HRESULT STDMETHODCALLTYPE IMSAdminBaseSinkW_ShutdownNotify_Proxy(
    IMSAdminBaseSinkW __RPC_FAR * This);

void __RPC_STUB IMSAdminBaseSinkW_ShutdownNotify_Stub(
    IRpcStubBuffer *This,
    IRpcChannelBuffer *_pRpcChannelBuffer,
    PRPC_MESSAGE _pRpcMessage,
    DWORD *_pdwStubPhase);

#endif       /* __IMSAdminBaseSinkW_INTERFACE_DEFINED__ */

/*****************************************
 * Generated header for interface: __MIDL_itf_iadmw_0166
 * at Tue Aug 19 11:59:41 1997
 * using MIDL 3.03.0106
 ****************************************/
/* [local] */ endif extern RPC_IF_HANDLE __MIDL_itf_iadmw_0166_v0_0_c_ifspec;
extern RPC_IF_HANDLE __MIDL_itf_iadmw_0166_v0_0_s_ifspec;

/* Additional Prototypes for ALL interfaces */
```

```
/* [local] */ HRESULT STDMETHODCALLTYPE IMSAdminBaseW_SetData_Proxy(
    IMSAdminBaseW __RPC_FAR * This,
    /* [in] */ METADATA_HANDLE hMDHandle,
    /* [string][in][unique] */ LPCWSTR pszMDPath,
    /* [in] */ PMETADATA_RECORD pmdrMDData);

/* [call_as] */ HRESULT STDMETHODCALLTYPE IMSAdminBaseW_SetData_Stub(
    IMSAdminBaseW __RPC_FAR * This,
    /* [in] */ METADATA_HANDLE hMDHandle,
    /* [string][in][unique] */ LPCWSTR pszMDPath,
    /* [in] */ PMETADATA_RECORD pmdrMDData);

/* [local] */ HRESULT STDMETHODCALLTYPE IMSAdminBaseW_GetData_Proxy(
    IMSAdminBaseW __RPC_FAR * This,
    /* [in] */ METADATA_HANDLE hMDHandle,
    /* [string][in][unique] */ LPCWSTR pszMDPath,
    /* [out][in] */ PMETADATA_RECORD pmdrMDData,
    /* [out] */ DWORD __RPC_FAR *pdwMDRequiredDataLen);

/* [call_as] */ HRESULT STDMETHODCALLTYPE IMSAdminBaseW_GetData_Stub(
    IMSAdminBaseW __RPC_FAR * This,
    /* [in] */ METADATA_HANDLE hMDHandle,
    /* [string][in][unique] */ LPCWSTR pszMDPath,
    /* [out][in] */ PMETADATA_RECORD pmdrMDData,
    /* [out] */ DWORD __RPC_FAR *pdwMDRequiredDataLen,
    /* [out] */ struct _IIS_CRYPTO_BLOB __RPC_FAR *__RPC_FAR *ppDataBlob);

/* [local] */ HRESULT STDMETHODCALLTYPE IMSAdminBaseW_EnumData_Proxy(
    IMSAdminBaseW __RPC_FAR * This,
    /* [in] */ METADATA_HANDLE hMDHandle,
    /* [string][in][unique] */ LPCWSTR pszMDPath,
    /* [out][in] */ PMETADATA_RECORD pmdrMDData,
    /* [in] */ DWORD dwMDEnumDataIndex,
    /* [out] */ DWORD __RPC_FAR *pdwMDRequiredDataLen);

/* [call_as] */ HRESULT STDMETHODCALLTYPE IMSAdminBaseW_EnumData_Stub(
    IMSAdminBaseW __RPC_FAR * This,
    /* [in] */ METADATA_HANDLE hMDHandle,
    /* [string][in][unique] */ LPCWSTR pszMDPath,
    /* [out][in] */ PMETADATA_RECORD pmdrMDData,
    /* [in] */ DWORD dwMDEnumDataIndex,
    /* [out] */ DWORD __RPC_FAR *pdwMDRequiredDataLen,
    /* [out] */ struct _IIS_CRYPTO_BLOB __RPC_FAR *__RPC_FAR *ppDataBlob);

/* [local] */ HRESULT STDMETHODCALLTYPE IMSAdminBaseW_GetAllData_Proxy(
    IMSAdminBaseW __RPC_FAR * This,
    /* [in] */ METADATA_HANDLE hMDHandle,
    /* [string][in][unique] */ LPCWSTR pszMDPath,
    /* [in] */ DWORD dwMDAttributes,
    /* [in] */ DWORD dwMDUserType,
    /* [in] */ DWORD dwMDDataType,
    /* [out] */ DWORD __RPC_FAR *pdwMDNumDataEntries,
    /* [out] */ DWORD __RPC_FAR *pdwMDDataSetNumber,
    /* [in] */ DWORD dwMDBufferSize,
    /* [size_is][out] */ unsigned char __RPC_FAR *pbMDBuffer,
    /* [out] */ DWORD __RPC_FAR *pdwMDRequiredBufferSize);

/* [call_as] */ HRESULT STDMETHODCALLTYPE IMSAdminBaseW_GetAllData_Stub(
```

```
    IMSAdminBaseW __RPC_FAR * This,
    /* [in] */ METADATA_HANDLE hMDHandle,
    /* [string][in][unique] */ LPCWSTR pszMDPath,
    /* [in] */ DWORD dwMDAttributes,
    /* [in] */ DWORD dwMDUserType,
    /* [in] */ DWORD dwMDDataType,
    /* [out] */ DWORD __RPC_FAR *pdwMDNumDataEntries,
    /* [out] */ DWORD __RPC_FAR *pdwMDDataSetNumber,
    /* [in] */ DWORD dwMDBufferSize,
    /* [out] */ DWORD __RPC_FAR *pdwMDRequiredBufferSize,
    /* [out] */ struct _IIS_CRYPTO_BLOB __RPC_FAR *__RPC_FAR *ppDataBlob);

/* [restricted][local] */ HRESULT STDMETHODCALLTYPE
IMSAdminBaseW_KeyExchangePhase1_Proxy(
    IMSAdminBaseW __RPC_FAR * This);

/* [call_as] */ HRESULT STDMETHODCALLTYPE IMSAdminBaseW_KeyExchangePhase1_Stub(
    IMSAdminBaseW __RPC_FAR * This,
    /* [in][unique] */ struct _IIS_CRYPTO_BLOB __RPC_FAR
*pClientKeyExchangeKeyBlob,
    /* [in][unique] */ struct _IIS_CRYPTO_BLOB __RPC_FAR
*pClientSignatureKeyBlob,
    /* [out] */ struct _IIS_CRYPTO_BLOB __RPC_FAR *__RPC_FAR
*ppServerKeyExchangeKeyBlob,
    /* [out] */ struct _IIS_CRYPTO_BLOB __RPC_FAR *__RPC_FAR
*ppServerSignatureKeyBlob,
    /* [out] */ struct _IIS_CRYPTO_BLOB __RPC_FAR *__RPC_FAR
*ppServerSessionKeyBlob);

/* [restricted][local] */ HRESULT STDMETHODCALLTYPE
IMSAdminBaseW_KeyExchangePhase2_Proxy(
    IMSAdminBaseW __RPC_FAR * This);

/* [call_as] */ HRESULT STDMETHODCALLTYPE IMSAdminBaseW_KeyExchangePhase2_Stub(
    IMSAdminBaseW __RPC_FAR * This,
    /* [in][unique] */ struct _IIS_CRYPTO_BLOB __RPC_FAR
*pClientSessionKeyBlob,
    /* [in][unique] */ struct _IIS_CRYPTO_BLOB __RPC_FAR *pClientHashBlob,
    /* [out] */ struct _IIS_CRYPTO_BLOB __RPC_FAR *__RPC_FAR
*ppServerHashBlob);

/* end of Additional Prototypes */ ifdef __cplusplus
}
endif endif

/* this ALWAYS GENERATED file contains the definitions for the interfaces */

/* File created by MIDL compiler version 3.03.0106 */
/* at Thu Jul 31 10:58:59 1997
 */
/* Compiler settings for .\mddefw.idl:
```

```
    Oi (OptLev=i0), W1, Zp8, env=Win32, ms_ext, c_ext
    error checks: allocation ref
*/
//@@MIDL_FILE_HEADING(  )

/* verify that the <rpcndr.h> version is high enough to compile this file*/
#ifndef __REQUIRED_RPCNDR_H_VERSION__
#define __REQUIRED_RPCNDR_H_VERSION__ 440
endif include "rpc.h"
include "rpcndr.h"

#ifndef __mddefw_h__
define __mddefw_h__ ifdef __cplusplus
extern "C"{
#endif

/* Forward Declarations */

/* header files for imported files */
#include "unknwn.h"

void __RPC_FAR * __RPC_USER MIDL_user_allocate(size_t);
void __RPC_USER MIDL_user_free( void __RPC_FAR * );

/******************************************
 * Generated header for interface: __MIDL_itf_mddefw_0000
 * at Thu Jul 31 10:58:59 1997
 * using MIDL 3.03.0106
 ******************************************/
/* [local] */

/*++

Copyright (c) 1997 Microsoft Corporation

Module Name: mddef.h

Definitions for Admin Objects and Metadata

--*/
#ifndef _MD_DEFW_
#define _MD_DEFW_
#include <mdmsg.h>
#include <mdcommsg.h>
/*
    Error Codes Metadata api's all return HRESULTS. Since internal results are either
        winerrors or Metadata specific return codes (see mdmsg.h), they are
        converted to HRESULTS using the RETURNCODETOHRESULT macro (see
        commsg.h).
*/
/*
    Max Name Length
        The maximum number of characters in the length of a metaobject name,
        including the terminating NULL. This refers to each node in the tree,
```

```
            not the entire path.
            eg. strlen("Root") < METADATA_MAX_NAME_LEN
*/
#define METADATA_MAX_NAME_LEN          256
/*
    Access Permissons
        Permissions associated with handles of type METADATA_HANDLE METADATA_PERMISSION_READ - Allows reading metadata.
        METADATA_PERMISSION_WRITE - Allows writing metadata.
*/
#define METADATA_PERMISSION_READ        0x00000001
#define METADATA_PERMISSION_WRITE       0x00000002
/*
    Data Types ALL_METADATA - Used on Get/Enum/Getall api's (ComMDGetMetaData,
            ComMDEnumMetaData, and ComMDGetAllMetaData), api's to allow getting
            all data. Not valid on the Set api.

DWORD_METADATA - The data is an unsigned 32 bit value.

STRING_METADATA - The data is a null terminated ASCII string.

BINARY_METADATA - The data is any binary value.

EXPANDSZ_METADATA - The data is a null terminated ASCII string.
            Clients are expected to treat this as an expandsz string.

MULTISZ_METADATA - A series of NULL terminated ASCII strings. ending
            with 2 NULL's.
*/
enum METADATATYPES
    { ALL_METADATA     = 0,
      DWORD_METADATA   = ALL_METADATA + 1,
      STRING_METADATA  = DWORD_METADATA + 1,
      BINARY_METADATA  = STRING_METADATA + 1,
      EXPANDSZ_METADATA = BINARY_METADATA + 1,
      MULTISZ_METADATA = EXPANDSZ_METADATA + 1,
      INVALID_END_METADATA   = MULTISZ_METADATA + 1
    };
/*
    Attributes - The flags for the data.

METADATA_INHERIT - If set for a data item, the data item can be
            inherited. If set on input to the Get/Enum/Getall api's,
            (ComMDGetMetaData, ComMDEnumMetaData, and ComMDGetAllMetaData),
            inheritable data will be returned. If not set on input to the
            Get/Enum/Getall, inheritable data will not be returned.

METADATA_PARTIAL_PATH - If set on input to Get/Enum/Getall api's, this
            routine will return ERROR_SUCCESS and the inherited data even if
            the entire path is not present. Only valid if METADATA_INHERIT is
            also set. Should not be set for data items on input the the Set api
            (ComMDSetMetaData).

METADATA_SECURE - If set for a data item, the data is stored in a
            secure fasion. Should not be set on input to Get/Enum api's.

METADATA_REFERENCE - If set for a data item, the data item may be
            gotten by reference. If set on input to Get/Enum/GetAll api's and
            set on a the data item being returned, the data is returned by
```

```
            reference. A pointer to the metadata server's copy of the data is
                placed in the Data field of the METADATA_RECORD or
                METADATA_GETALL_RECORD, and the DataTag field is set. This data
must
                be freed by calling ComMDReleaseReferenceData. The client must not
                change this data. This flag must not be set on input to
                Get/Enum/Getall api's from remote clients.

METADATA_VOLATILE - If set for a data item, the data item will not be
                saved to long term storage.

METADATA_ISINHERITED - If specified on input to one of the get api's,
                the flag will be set on return if the data was inherited.

METADATA_INSERT_PATH - If specified on input to one of the get api's,
                and on a string data item, the path relative to handle will replaced
the
                string MD_INSERT_PATH_STRING in the string data.
*/
#define METADATA_NO_ATTRIBUTES          0
#define METADATA_INHERIT                0x00000001
#define METADATA_PARTIAL_PATH           0x00000002
#define METADATA_SECURE                 0x00000004
#define METADATA_REFERENCE              0x00000008
#define METADATA_VOLATILE               0x00000010
#define METADATA_ISINHERITED            0x00000020
#define METADATA_INSERT_PATH            0x00000040

/*
    Backup Flags.

MD_BACKUP_OVERWRITE - If set, the metabase will be backed up even if
                a backupe with the same name and version already exists. The
                existing backup will be overwritten.

MD_BACKUP_SAVE_FIRST - If set backup will save the metabase prior to
                making the backup. If the save fails, backup behavior is dependent
                on the value of MD_BACKUP_FORCE_BACKUP.

MD_BACKUP_FORCE_BACKUP - If set backup will proceed even if the save
                failed. Only valid if MD_BACKUP_SAVE_FIRST is set. If the save
                but the backup succeeds, a warning will be returned.
*/
#define MD_BACKUP_OVERWRITE             0x00000001
#define MD_BACKUP_SAVE_FIRST            0x00000002
#define MD_BACKUP_FORCE_BACKUP          0x00000004
/*
    Backup Version Defines.

MD_BACKUP_NEXT_VERSION - For Backup, indicates use the next available
                backup version of the BackupLocation specified, ie. one higher than
                the highest existing version.
                Not valid for Restore or DeleteBackup.

MD_BACKUP_HIGHEST_VERSION - For Backup, Restore, and DeleteBackup, will
                use the highest existing backup version of the BackupLocation
                specified.

MD_BACKUP_MAX_VERSION - The highest allowed backup version number.
```

```
            MD_BACKUP_MAX_LEN - The maximup length, in UNICODE characters, of the
                BackupLocation.
*/ define MD_BACKUP_NEXT_VERSION          0xffffffff
define MD_BACKUP_HIGHEST_VERSION       0xfffffffe
#define MD_BACKUP_MAX_VERSION           9999
#define MD_BACKUP_MAX_LEN               (100)

/*
    Backup Location Defines.

MD_DEFAULT_BACKUP_LOCATION - The default location to backup from or
            restore to if no location is specified.
*/ define MD_DEFAULT_BACKUP_LOCATION TEXT("MDBackUp")

/*
    Insert Path Defines.
*/ define MD_INSERT_PATH_STRINGA      "<%INSERT_PATH%>"
define MD_INSERT_PATH_STRINGW      L##"<%INSERT_PATH%>"
#define MD_INSERT_PATH_STRING       TEXT("<%INSERT_PATH%>")

/*
    Handle Defines.
*/ define METADATA_MASTER_ROOT_HANDLE     0

/*
    METADATA_RECORD is the basic input/output parameter for the set and get
        metadata api's. The Set api (ComMDSetMetaData) takes all fields as
        input, except DataTag. The Get/Enum api's (ComMDGetMetadata and
        ComMDEnumMetaData) take some of the fields as input, and fill in all
        fields as output.

Identifier - The identifier of the data.

Attributes - The flags for the data.

UserType - The User Type for the data. This is a user defined field to allow
        users to group data. If set to anything other than ALL_METADATA on input
        to Get/Set apis, only metadata of the specified User Type will be
        returned.

ALL_METADATA

User Defined Values

DataType - The Type of the data. Must be set to a valid value other than
        ALL_METADATA for each data item. If set to anything other than
        ALL_METADATA on input to Get/Set api's, only metadata of the
        specified Data Type will be returned.
            ALL_METADATA
            DWORD_METADATA
            STRING_METADATA
            BINARY_METADATA
```

```
            EXPANDSZ_METADATA

DataLen - On input to the Set api, specifies the length of Data, in
        bytes. Inprocess clients only need to specify this for binary data.
        Remote clients need to specify this for all data types. For strings,
        this must include the trailing '\0', eg. strlen(string) + 1.
        On input to Get/Enum apis, specifies the size of the buffer pointed to
        by Data. On successful output from Get/Enum API's, specifies the size of
        Data in bytes.

Data - On input to the Set api, points to the data. On input to the
        Get/Enum api's, points to a buffer to return the data in. On output
        from the Get/Enum api's, points to the data. If the data is not
        gotten by reference, the  pointer will be unchanged.

DataTag - A tag for reference data. Not used in the Set api. Not used on
        input to the Get/Enum api's. On successful return from the Get/Enum
        api's, this is set to a nonzero tag if the data was gotten by reference,
        and set to 0 if the data was not gotten by reference.
*/
typedef struct  _METADATA_RECORD
    {
    DWORD dwMDIdentifier;
    DWORD dwMDAttributes;
    DWORD dwMDUserType;
    DWORD dwMDDataType;
    DWORD dwMDDataLen;
    /* [size_is][unique] */ unsigned char __RPC_FAR *pbMDData;
    DWORD dwMDDataTag;
    } METADATA_RECORD;

typedef struct _METADATA_RECORD __RPC_FAR *PMETADATA_RECORD;
/*
    METADATA_GETALL_RECORD, is essentially the same as METADATA_RECORD, but is
        used by MDGetAllMetaData. It is used the same as the corresponding
        METADATA_RECORD values for the MDGetMetaData, with the following
        exceptions:

MDGetAllMetadata does not take the structure as input, but takes parameters
        equivalent to Attributes, UserType, and DataType.

On output, MDGetAllMetadata returns an array of METADATA_GETALL_RECORD.

DataOffset/Data - If the data is not returned by reference, DataOffset
        contains the byte offset into the buffer provided. If the data is
        returned by reference, Data contains a pointer to the data.
*/
typedef struct  _METADATA_GETALL_RECORD
    {
    DWORD dwMDIdentifier;
    DWORD dwMDAttributes;
    DWORD dwMDUserType;
    DWORD dwMDDataType;
    DWORD dwMDDataLen;
    union
        {
        DWORD dwMDDataOffset;
        unsigned char __RPC_FAR *pbMDData;
        }   ;
    DWORD dwMDDataTag;
```

```
    } METADATA_GETALL_RECORD;

typedef struct _METADATA_GETALL_RECORD __RPC_FAR *PMETADATA_GETALL_RECORD;

typedef DWORD METADATA_HANDLE;

typedef DWORD __RPC_FAR *PMETADATA_HANDLE;
/*
Handle Information

Permissions - The permissions associated with the handle.
        METADATA_PERMISSION_READ
        METADATA_PERMISSION_WRITE SystemChangeNumber - The system change number at the time the handle was
        allocated.
*/
typedef struct _METADATA_HANDLE_INFO
    {
    DWORD dwMDPermissions;
    DWORD dwMDSystemChangeNumber;
    } METADATA_HANDLE_INFO;

typedef struct _METADATA_HANDLE_INFO __RPC_FAR *PMETADATA_HANDLE_INFO;
/*
    Change Object - The structure passed to ComMDSinkNotify.

Path - The path of the MetaObject modified.

ChangeType - The types of changes made, from the flags below.

NumDataIDs - The number of data id's changed.

DataIDs - An array of the data id's changed.
*/
#define MD_CHANGE_OBJECT      MD_CHANGE_OBJECT_W
#define PMD_CHANGE_OBJECT     PMD_CHANGE_OBJECT_W
typedef struct _MD_CHANGE_OBJECT_W
    {
    /* [string] */ LPWSTR pszMDPath;
    DWORD dwMDChangeType;
    DWORD dwMDNumDataIDs;
    /* [size_is][unique] */ DWORD __RPC_FAR *pdwMDDataIDs;
    } MD_CHANGE_OBJECT_W;

typedef struct _MD_CHANGE_OBJECT_W __RPC_FAR *PMD_CHANGE_OBJECT_W;
/*
Change Types MD_CHANGE_TYPE_DELETE_OBJECT - The Meta Object was deleted.

MD_CHANGE_TYPE_ADD_OBJECT - The Meta Object was added.

MD_CHANGE_TYPE_SET_DATA - A data item was set.

MD_CHANGE_TYPE_DELETE_DATA - A data item was deleted.

MD_CHANGE_TYPE_RENAME_OBJECT - The Meta Object was renamed.
```

```
*/
#define MD_CHANGE_TYPE_DELETE_OBJECT    0x00000001
#define MD_CHANGE_TYPE_ADD_OBJECT       0x00000002
#define MD_CHANGE_TYPE_SET_DATA         0x00000004
#define MD_CHANGE_TYPE_DELETE_DATA      0x00000008
#define MD_CHANGE_TYPE_RENAME_OBJECT    0x00000010
/*
Max Change Entries - The maximum number of change entries that will be sent on
    a single call to IMDCOMSINK::ComMDSinkNotify. If more notifications are
    required, IMDCOMSINK::ComMDSinkNotify will be called multiple times.
*/
#define MD_MAX_CHANGE_ENTRIES           100
endif extern RPC_IF_HANDLE __MIDL_itf_mddefw_0000_v0_0_c_ifspec;
extern RPC_IF_HANDLE __MIDL_itf_mddefw_0000_v0_0_s_ifspec;

/* Additional Prototypes for ALL interfaces */

/* end of Additional Prototypes */ ifdef __cplusplus
}
endif endif
```

SUMMARY

In summary, the present invention provides a novel information server that includes an integral database for storing metadata. The metadata is retrieved as part of the process that retrieves information objects accessed by clients of the information server. The database, sometimes referred to as a metabase, provides unique advantages that are not available in prior art information servers. The metabase allows simplified administration of the information server through various features of the present invention including inheritance of property information stored in the metabase. The metabase may be provided with a programatic interface, although this is not required. Such an approach, however, has several advantages. The metabase also has the ability to notify registered clients of the occurrence of specified events. This notification ability can be used, for example, to notify registered clients of changes in the metabase. Unique read and write locking mechanisms may be implemented that allow simultaneous administration of the metabase by multiple administrators. Full remote administration of the metabase is available if the metabase is implemented using remotely accessible technology such as Microsoft's COM technology or an equivalent.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United Stated Letters Patent is:

1. In an information server that has access to a storage medium wherein information objects are stored according to a storage hierarchy and further has access to a database comprising a plurality of key locations that are arranged hierarchically and store metadata, a method for retrieving an information object and metadata associated with the information object, said method comprising the steps of:

obtaining a path name comprising a hierarchy of constituent names;

resolving said path name into its constituent names;

while proceeding from parent to child through the constituent names, performing the steps of:

identifying a key location in said database that corresponds to one of the constituent names and retrieving metadata from said identified key location;

identifying a storage location in the storage hierarchy of the storage medium that corresponds to another of the constituent names; and resolving a physical location of the information object at the storage medium by using said other of the constituent names and any children constituent names thereof; and retrieving the information object from the physical location.

2. A method as recited in claim 1 further comprising the steps of:

checking for an indication that the retrieved metadata should be inherited; and if such indication exists then applying said retrieved metadata to subsequent constituent names that are part of said path name.

3. A method as recited in claim 1 further comprising the step of storing in at least one of said plurality of key locations an access control list that identifies the type of access that clients may be granted.

4. A method as recited in claim 3 further comprising the step of prior to retrieving said metadata first checking said access control list to determine if a client requesting the information object is authorized for the requested access.

5. A method as recited in claim 1 further comprising the step of attempting to obtain a read lock prior to retrieving said metadata.

6. A method as recited in claim 5 wherein said plurality of key locations of said database are arranged in a hierarchical relationship and when said read lock is obtained, all key locations in a child relationship and all key locations in a parent relationship to said identified key location are also locked for reading.

7. A method as recited in claim 5 wherein said plurality of key locations of said database are arranged in a hierarchical relationship and said read lock is not granted if any other client has a write lock on said identified key location.

8. A method as recited in claim 1 wherein said database comprises a programmatic interface through which access to said database is allowed and wherein said metadata is retrieved from said identified key location by making an appropriate call into said programmatic interface and receiving the requested metadata through said programmatic interface.

9. A method as recited in claim 1 wherein at least one of the constituent names corresponds both to at least one of said plurality of key locations and to at least one of either a storage location in the storage hierarchy of the storage medium or the information object.

10. A method as recited in claim 1 further comprising the step of synchronizing the information in said database with a second copy of said database.

11. A method as recited in claim 1 wherein at least some of the metadata comprises an indication that the metadata is secure, the method further comprising the steps of:

encrypting said secure metadata if said secure metadata is written to disk; and encrypting said secure metadata if said secure metadata is sent outside a trusted environment.

12. A method as recited in claim 11 further comprising the step of storing in at least one of said plurality of key locations an access control list that identifies the type of access that clients may be granted to said database.

13. A method as recited in claim 1 further comprising the step of checking said retrieved metadata and based on said retrieved metadata performing at least one of two possible actions such that the action performed is determined at least in part by said retrieved metadata.

14. In an information server that has access to a storage medium wherein information objects are stored according to a storage hierarchy and further has access to a database comprising a plurality of key locations that are arranged hierarchically and store metadata, a method for responding to a request from a client for retrieval of an information object, said method comprising the steps of:

at said information server, receiving from said client said request for said information object, said request including a path name comprising a hierarchy of constituent names;

resolving said path name into its constituent names;

while proceeding from parent to child through the constituent names, performing the steps of:

identifying a key location in said database that corresponds to one of the constituent names and retrieving metadata from said identified key location;

identifying a storage location in the storage hierarchy of the storage medium that corresponds to another of the constituent names; and resolving a physical location of the information object at the storage medium by using said other of the constituent names and any children constituent names thereof; and retrieving the information object from the physical location.

15. A method as recited in claim 14 further comprising the steps of:

checking for an indication that the retrieved metadata should be inherited; and if such indication exists then applying said retrieved metadata to subsequent constituent names that are part of said path name.

16. A method as recited in claim 14 further comprising the step of storing in at least one of said plurality of key locations an access control list that identifies the type of access that clients may be granted.

17. A method as recited in claim 16 further comprising the step of prior to retrieving said metadata first checking said access control list to determine if a client requesting the information object is authorized for the requested access.

18. A method as recited in claim 14 further comprising the step attempting to obtain a read lock prior to retrieving said metadata.

19. A method as recited in claim 18 wherein said plurality of key locations of said database are arranged in a hierarchical relationship and when said read lock is obtained, all key locations in a child relationship and all key locations in a parent relationship to said identified key location are also locked for reading.

20. A method as recited in claim 18 wherein said read lock is not granted if any other client has a write lock on said identified key location.

21. A method as recited in claim 14 wherein said database comprises a programmatic interface through which access to said database is allowed and wherein said metadata is retrieved from said identified key location by making an appropriate call into said programmatic interface and receiving the requested metadata through said programmatic interface.

22. A method as recited in claim 14 wherein at least one of the constituent names corresponds both to at least one of said plurality of key locations and to at least one of either a storage location in the storage hierarchy of the storage medium or the information object.

23. A method as recited in claim 14 further comprising the step of synchronizing the information in said database with a second copy of said database.

24. A method as recited in claim 14 wherein at least some of the metadata comprises an indication that the metadata is secure, the method further comprising the steps of:

encrypting said secure metadata if said secure metadata is written to disk; and encrypting said secure metadata if said secure metadata is sent outside a trusted environment.

25. A method as recited in claim 24 further comprising the step of checking said retrieved metadata and based on said retrieved metadata performing at least one of two possible actions such that the action performed is determined at least in part by said retrieved metadata.

26. In an information server that has access to a storage medium wherein information objects are stored according to a storage hierarchy and further has access to a database comprising a plurality of key locations that are arranged hierarchically and store metadata, a method for retrieving information objects and metadata associated with the information objects, said method comprising the steps of:

obtaining a first path name comprising a first hierarchy of constituent names;

obtaining a second path name comprising a second hierarchy of constituent names;

resolving said first path name and said second path name into their constituent names;

for each of the first path name and the second path name, while proceeding from parent to child through the constituent names of the particular path name, performing the steps of:

identifying a key location in said database that corresponds to one of the constituent names of the particular path name and retrieving metadata from said identified key location;

identifying a storage location in the storage hierarchy of the storage medium that corresponds to another of the constituent names of the particular path name; and resolving a physical location of the information object at the storage medium by using said other of the constituent names and any children constituent names thereof; and retrieving the information objects from the physical locations.

27. A computer system comprising:

a database comprising a plurality of key locations arranged in a hierarchical relationship, said plurality of key locations representing storage locations where metadata may be stored;

a plurality of information objects that can be accessed and returned to a requesting client; and a computer-readable medium having computer-executable instructions that include:

means for receiving a path name comprising a hierarchy of constituent names from a client;

means for resolving said path name into its constituent names;

means for retrieving said metadata from said database using a first constituent name of the path name and for accessing and returning an information object using a second constituent name of the path name in response the path name being received from the client, said means for retrieving comprising means for interpreting properties included in the metadata retrieved from said database such that said means for retrieving can perform actions based on the properties; and means for providing a programmatic interface to said database such that access to said database in obtained through said programmatic interface.

28. A computer system as recited in claim 27 wherein said database further comprises access control means for identifying the type of access to at least one of either said database or an information object that is to be granted certain clients.

29. A computer system as recited in claim 27 wherein said computer-executable instructions further include means for placing read locks at key locations, said read locks comprising at least a first type of read lock and a second type of read lock, said first type of read lock being placed on an identified key location and key locations in a child relationship thereto and said second type of read lock being placed on key locations in a parent relationship to said identified key location.

30. A computer system as recited in claim 27 wherein said computer-executable instructions further include means for placing write locks at key locations, said write locks comprising at least a first type of write lock and a second type of write lock, said first type of write lock being placed on an identified key location and key locations in a child relationship thereto and said second type of write lock being placed on key locations in a parent relationship to said identified key location, said first type of write lock granting the right to write data and said second type of write lock not granting the right to write data.

31. A computer system as recited in claim 27 wherein said metadata comprise an indicator that allows said metadata to be inherited by key locations in a child relationship to the key location where said metadata is stored.

32. A computer system as recited in claim 31 wherein metadata stored in a designated key location can override metadata inherited from key locations in a parent relationship with said designated key location.

33. A computer system as recited in claim 27 wherein said computer-executable instructions further include means for synchronizing said database with a second copy of said database.

34. A computer system as recited in claim 27 wherein said computer-executable instructions further include means for storing secure data in said database, said secure data being encrypted whenever said secure data is written outside of system memory and said secure data being encrypted whenever said secure data is sent outside a trusted environment.

35. A computer system as recited in claim 27 wherein said computer-executable instructions further include means for allowing write access to said database by a first administrator and a second administrator simultaneously.

36. A computer system as recited in claim 35 wherein said computer-executable instructions further include means for sending notification to said first administrator when said second administrator releases write access and means for second notification to said second administrator when said first administrator releases write access.

37. A computer system as recited in claim 27 wherein said computer-executable instructions further include means for allowing remote administration of said database.

38. A computer system as recited in claim 27 wherein said computer-executable instructions further include means for sending notification to identified clients when designated events occur.

* * * * *

UNITED STATES PATENT AND TRADEMARK OFFICE
CERTIFICATE OF CORRECTION

PATENT NO. : 6,061,692
DATED : May 9, 2000
INVENTOR(S) : Thomas, et al.

It is certified that error appears in the above-identified patent and that said Letters Patent is hereby corrected as shown below:

Title page,
Line 10, before "Redmond" change "Henbenthal" to -- Hebenthal --

Column 1,
Line 16, after "puter" change "of" to -- or --
Line 18, After "numbers," change "business" to -- businesses --
Line 44, before "the Internet" change "if" to -- of --

Column 3,
Line 66, after "metadata is" change "sometime" to -- sometimes --

Column 4,
Line 31, after "also" change "sometime" to -- sometimes --

Column 5,
Line 43, after "the use" change "in" to -- of --

Column 7,
Line 1, after "a" change "components" to -- component --

Column 8,
Line 37, after "can" and before "accessed" insert -- be --

Column 14,
Line 1, after "copy" and before "a" insert -- of --
Line 5, after "reside" and before "a" insert -- in --
Line 16, before "to store" change "6" to -- 3 --
Line 43, after "metadata" change "are" to -- is --

Column 16,
Line 18, after "returned." delete [Is]

UNITED STATES PATENT AND TRADEMARK OFFICE
CERTIFICATE OF CORRECTION

PATENT NO. : 6,061,692
DATED : May 9, 2000
INVENTOR(S) : Thomas, et al.

It is certified that error appears in the above-identified patent and that said Letters Patent is hereby corrected as shown below:

Column 18,
Line 43, after "The" change "sever" to -- server --
Line 47, after "retrieved" change "form" to -- from --

Column 26,
Line 52, after "may" and before "be" insert -- not --

Column 27,
Line 53, after "To" change "compliment" to -- complement --

Column 30,
Line 27, after "well" change "know" to -- known --

Column 36,
Line 24, after "#include" change ""iscnfg.b"" to -- "iiscnfg.h" --
Line 29, after "WCHAR" change "SubKeyMame" to -- SubKeyName --

Column 37,
Line 5, after "#include" change ""atiBase.h"" to "atlBase.h" --
Line 28, before "dwMDDataType" change "NyRecord" to -- MyRecord --

Column 53,
Line 22, after "DeleteAllData" insert -- ( --
Line 26, before "user type" insert -- // --
Line 28, insert -- ); --

Column 54,
Line 13, after "any" change "erro" to -- error --

Column 60,
Line 58, after "of the" change "specifies" to -- specified --

UNITED STATES PATENT AND TRADEMARK OFFICE
CERTIFICATE OF CORRECTION

PATENT NO.    : 6,061,692
DATED         : May 9, 2000
INVENTOR(S)   : Thomas, et al.

It is certified that error appears in the above-identified patent and that said Letters Patent is hereby corrected as shown below:

Column 69,
Line 52, after "The" change "IMSMAdminBase" to -- IMSAdminBase --

Column 145,
Line 21, after "step" and before "attempting" insert -- of --

Column 146,
Line 45, after "database" change "in" to -- is --

Column 148,
Line 9, before "notification" change "second" to -- sending --

Signed and Sealed this

Second Day of October, 2001

Attest:

*Nicholas P. Godici*

NICHOLAS P. GODICI
*Attesting Officer*    *Acting Director of the United States Patent and Trademark Office*